United States Patent
Shimo

(10) Patent No.: US 7,483,225 B2
(45) Date of Patent: Jan. 27, 2009

(54) TAKING OPTICAL SYSTEM

(75) Inventor: Mitsuaki Shimo, Osaka (JP)

(73) Assignee: Konica Minolta Opto, Inc., Hachioji-Shi (JP)

( * ) Notice: Subject to any disclaimer, the term of this patent is extended or adjusted under 35 U.S.C. 154(b) by 0 days.

(21) Appl. No.: 11/377,496

(22) Filed: Mar. 16, 2006

(65) Prior Publication Data

US 2006/0209424 A1     Sep. 21, 2006

(30) Foreign Application Priority Data

| Mar. 18, 2005 | (JP) | ............................. 2005-078867 |
| Mar. 18, 2005 | (JP) | ............................. 2005-078918 |
| Mar. 22, 2005 | (JP) | ............................. 2005-080907 |

(51) Int. Cl.
  *G02B 5/04*     (2006.01)
(52) U.S. Cl. ..................................... 359/833; 359/678
(58) Field of Classification Search ......... 359/833–837, 359/678, 720
  See application file for complete search history.

(56) References Cited

U.S. PATENT DOCUMENTS

2005/0018321 A1 *  1/2005  Takahashi ................... 359/833

FOREIGN PATENT DOCUMENTS

| JP | 11-23971 A | 1/1999 |
| JP | 2003-84200 A | 3/2003 |

* cited by examiner

*Primary Examiner*—Euncha P Cherry
(74) *Attorney, Agent, or Firm*—Sidley Austin LLP

(57) ABSTRACT

A taking optical system for forming an optical image of an object on the light-receiving surface of an image sensor has at least one optical prism that has an entrance surface, at least three reflective surfaces each curved, and an exit surface, and that receives rays from the object side through the entrance surface, then reflects the rays on the at least three reflective surfaces, and then lets out the rays through the exit surface. The optical prism is formed of a medium having a refractive index of 1.2 or more. An optical aperture is disposed on or near one of the at least three reflective surfaces. At least one of the at least three reflective surfaces is an eccentrically disposed rotation-asymmetric surface. Let the ray traveling from the center of the object through the center of the optical aperture to the center of the image surface be called a base ray, then the intersections of the base ray with the entrance surface, each of the reflective surfaces, and the exit surface all lie approximately on the same plane.

32 Claims, 12 Drawing Sheets

TAKING OPTICAL SYSTEM

This application is based on Japanese Patent Application No. 2005-78867 filed on Mar. 18, 2005, Japanese Patent Application No. 2005-78918 filed on Mar. 18, 2005, and Japanese Patent Application No. 2005-80907 filed on Mar. 22, 2005, the contents of which are hereby incorporated by reference.

BACKGROUND OF THE INVENTION

1. Field of the Invention

The present invention relates to a taking optical system, and more particularly to a slim taking optical system suitable for use in a digital device equipped with an image input capability so as to be capable of capturing an image of a subject by means of an image sensor.

2. Description of Related Art

In recent years, more and more cellular phones and personal digital assistants (PDAs) have been becoming equipped with a digital still camera or digital video unit for capturing images. These digital devices are required to be compact so as to be easily portable, and are simultaneously required to capture images with high performance. For high-performance image capturing, image sensors for capturing images have been made increasingly high-definition and, with this trend, the image sensing element that forms each pixel has been made increasingly small. Even then, image sensors themselves have inevitably been becoming increasingly large, requiring increasingly large image sizes, and moreover, as increasingly high definition is sought, accordingly high resolution has been sought in image sensors. Conventionally used as taking optical systems are coaxial optical systems of a so-called straight type. Seeking larger image sizes and higher resolution in this type of optical system, however, leads to an increased number of lens elements and an increased total length. This is contrary to the trend for compactness in cellular phones and PDAs. Thus, compactness and slimness need to be pursued with optical systems of an other-than-straight type.

As taking optical systems of an other-than-straight type, there have conventionally been known optical systems that employ a prism having a reflective surface. In this type of optical system, compactness and slimness are pursued by bending the optical path with a reflective surface. The optical path is bent, for example, by bending it a plurality of times within a single prism, or by bending it a plurality of times with a plurality of prisms. For example, Patent Publication 1 listed below proposes a taking optical system that pursues overall slimness by using two prisms, and Patent Publication 2 listed below proposes a taking optical system that pursues cost reduction by using a single prism.

Patent Publication 1: JP-A-2003-084200

Patent Publication 2: JP-A-H11-023971

The taking optical system disclosed in Patent Publication 1 uses two prisms, resulting in high cost. Moreover, an aperture stop is disposed between the two prisms, increasing the number of components and thus further increasing the cost. Furthermore, inaccurately positioning the aperture stop leads to poor optical performance. The taking optical system disclosed in Patent Publication 2 uses only one prism, advantageously in terms of cost reduction. Moreover, an aperture stop is disposed inside the prism, promising further cost reduction. However, although slimness is achieved to some extent, higher definition and wider angles of view cannot satisfactorily be coped with. Specifically, unless the prism is properly designed and arranged, it is not possible to achieve satisfactory slimness, nor to obtain high performance.

SUMMARY OF THE INVENTION

In view of the conventionally encountered inconveniences mentioned above, it is an object of the present invention to provide a taking optical system that, despite being inexpensive and slim, offers performance so high that higher definition and wider angles of view can be coped with.

To achieve the above object, according to one aspect of the present invention, a taking optical system for forming an optical image of an object on the light-receiving surface of an image sensor is provided with: at least one optical prism that has an entrance surface, at least three reflective surfaces each curved, and an exit surface, and that receives rays from the object side through the entrance surface, then reflects the rays on the at least three reflective surfaces, and then lets out the rays through the exit surface. Here, the optical prism is formed of a medium having a refractive index of 1.2 or more. Moreover, an optical aperture is disposed on or near one of the at least three reflective surfaces. Moreover, at least one of the at least three reflective surfaces is an eccentrically disposed rotation-asymmetric surface. Moreover, let the ray traveling from the center of the object through the center of the optical aperture to the center of the image surface be called a base ray, then the intersections of the base ray with the entrance surface, each of the reflective surfaces, and the exit surface all lie approximately on the same plane.

According to another aspect of the present invention, a taking optical system for forming an optical image of an object on the light-receiving surface of an image sensor is provided with: at least one optical prism that has an entrance surface, at least three reflective surfaces each curved, and an exit surface, and that receives rays from the object side through the entrance surface, then reflects the rays on the at least three reflective surfaces, and then lets out the rays through the exit surface. Here, the optical prism is formed of a medium having a refractive index of 1.2 or more. Moreover, an optical aperture is disposed on or near one of the at least three reflective surfaces. Moreover, at least one of the at least three reflective surfaces is an eccentrically disposed rotation-asymmetric surface. Moreover, let the ray traveling from the center of the object through the center of the optical aperture to the center of an image surface be called a base ray, then the base ray incident on the entrance surface is approximately parallel to the base ray leaving the exit surface.

According to still another aspect of the present invention, a taking optical system for forming an optical image of an object on the light-receiving surface of an image sensor is provided with: at least one optical prism that has an entrance surface, at least three reflective surfaces each curved, and an exit surface, and that receives rays from the object side through the entrance surface, then reflects the rays on the at least three reflective surfaces, and then lets out the rays through the exit surface. Here, the optical prism is formed of a medium having a refractive index of 1.2 or more. Moreover, an optical aperture is disposed on or near one of the at least three reflective surfaces. Moreover, at least one of the at least three reflective surfaces is an eccentrically disposed rotation-asymmetric surface. Moreover, let the entrance surface be called the first surface, and let the at least three reflective surfaces that reflect rays incident thereon from the first surface be called the second, the third, and the fourth surface in order of arrangement thereof from the first surface, then the rays incident on the third surface cross the rays reflected from the fourth surface.

Thus, according to the present invention, it is possible to provide a taking optical system that, despite being inexpensive and extremely slim, offers performance so high that higher definition and wider angles of view can be coped with. By employing a taking optical system according to the present invention in a device such as a digital camera, cellular phone, or personal digital assistant, it is possible to make the device high-performance, versatile, slim and compact, low-cost, and otherwise improved.

DETAILED DESCRIPTION OF PREFERRED EMBODIMENTS

Figure 1:
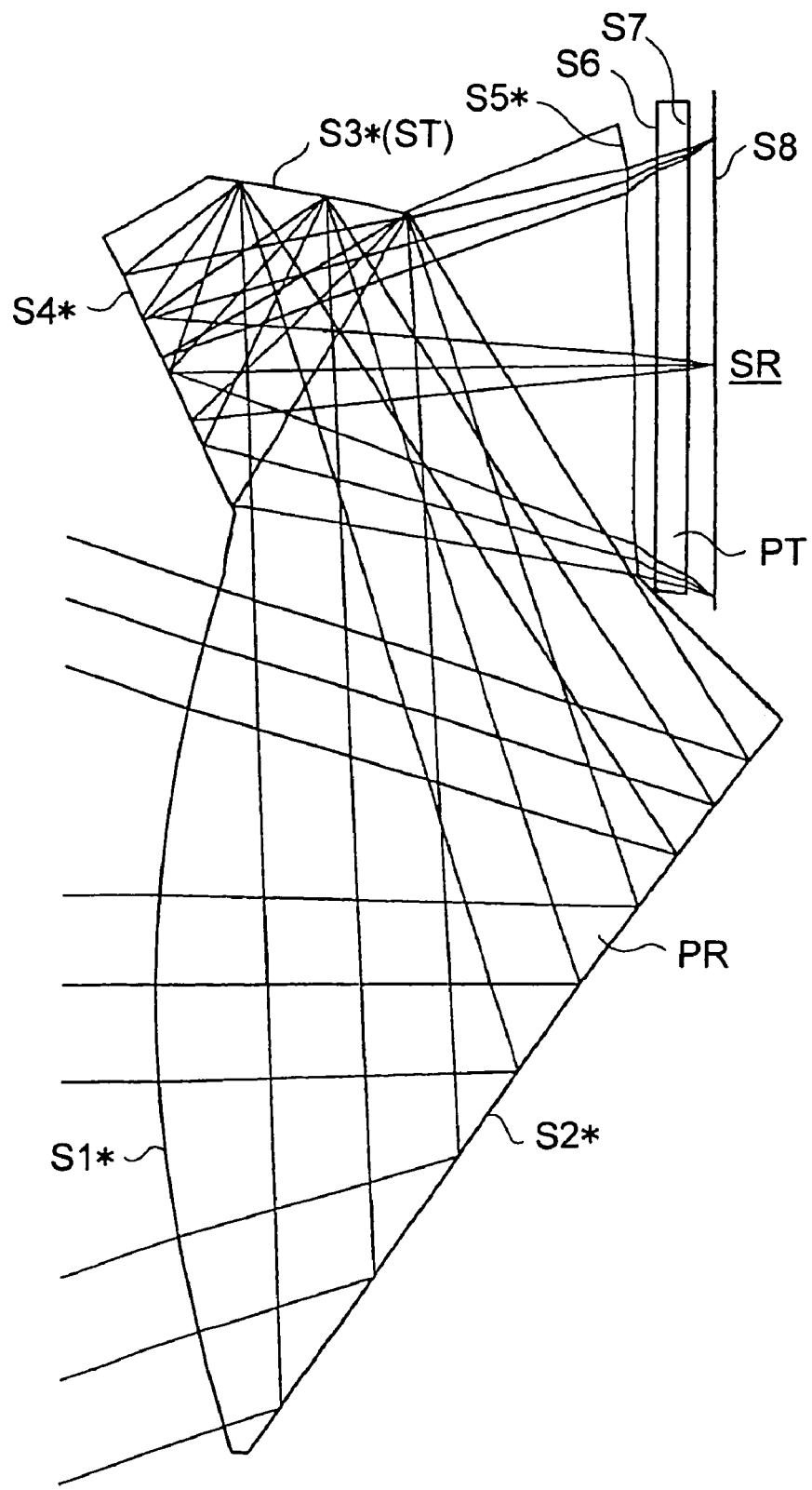
FIG. 1 is an optical path diagram of a first embodiment (Example 1) of the present invention.
Figure 2:
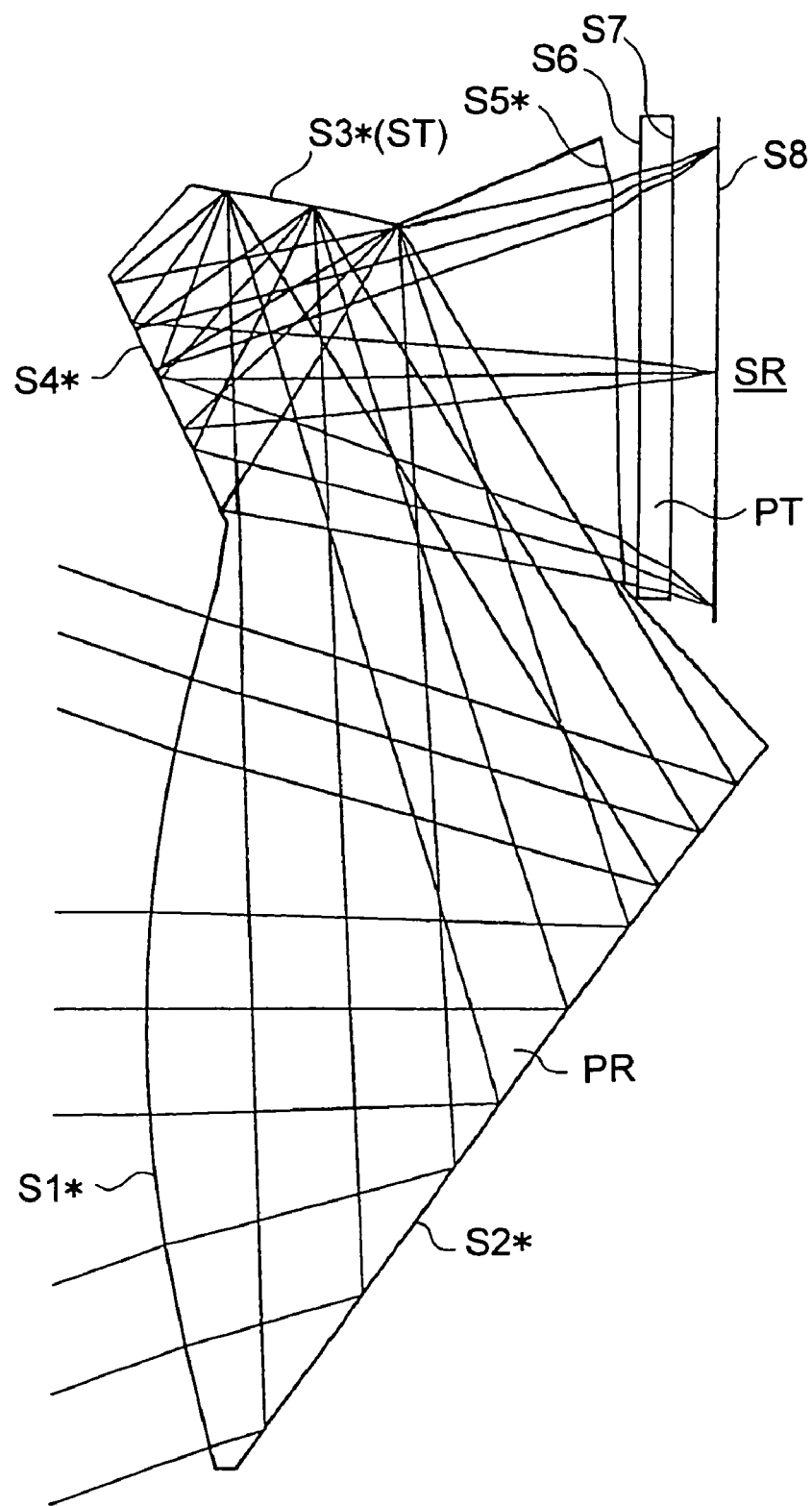
FIG. 2 is an optical path diagram of a second embodiment (Example 2) of the present invention.
Figure 3:
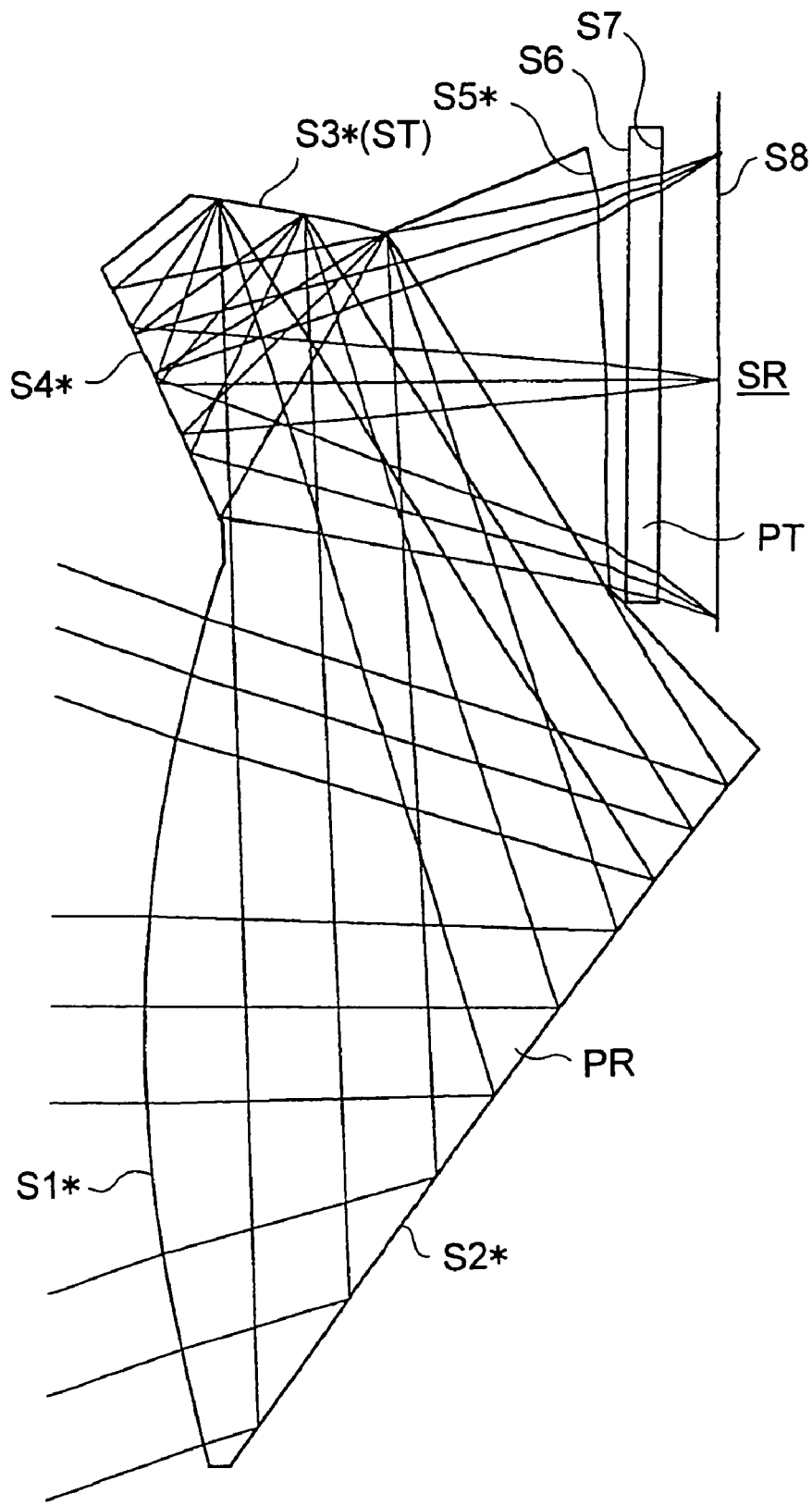
FIG. 3 is an optical path diagram of a third embodiment (Example 3) of the present invention.
Figure 4A:
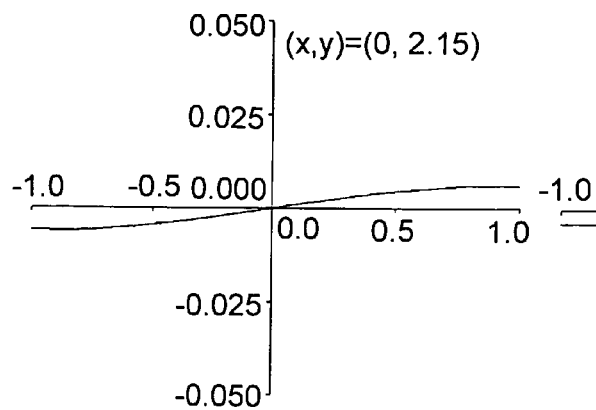
FIGS. 4A to 4F are X-direction lateral aberration diagrams of Example 1.
Figure 4B:
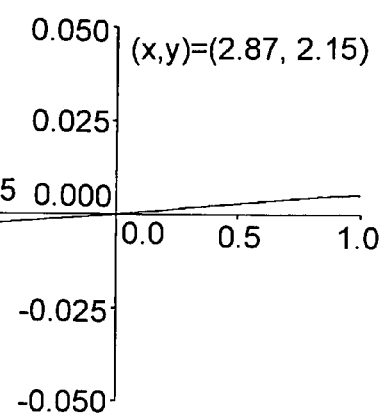
Figure 4C:
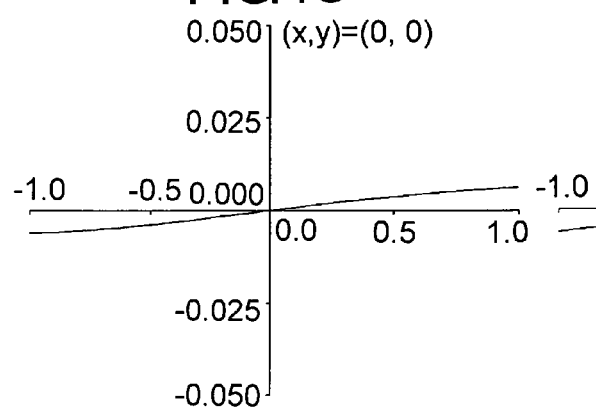
Figure 4D:
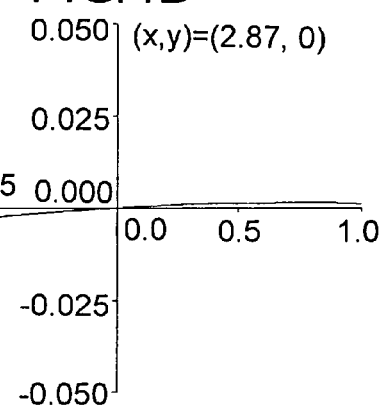
Figure 4E:
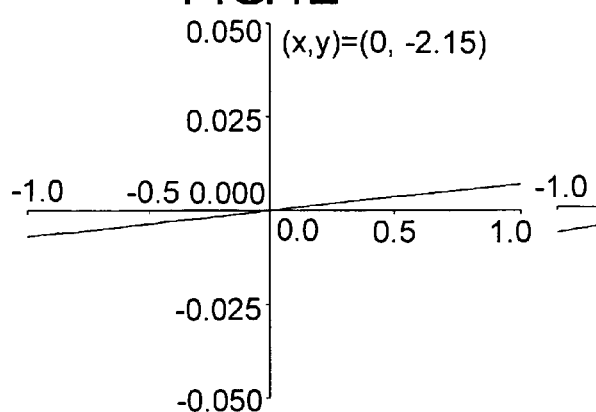
Figure 4F:
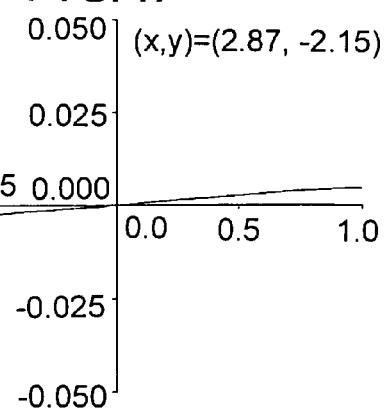
Figure 5A:
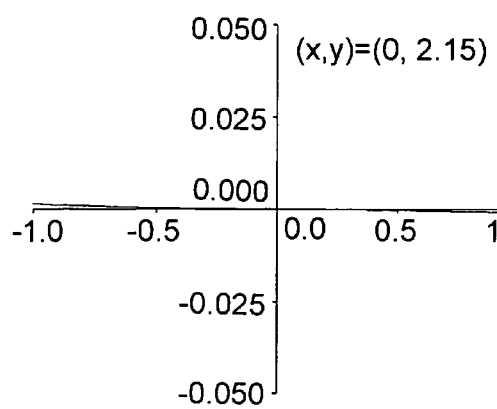
FIGS. 5A to 5F are Y-direction lateral aberration diagrams of Example 1.
Figure 5B:
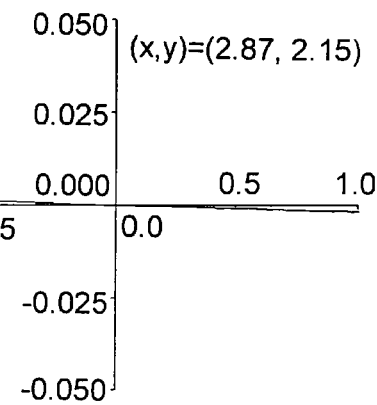
Figure 5C:
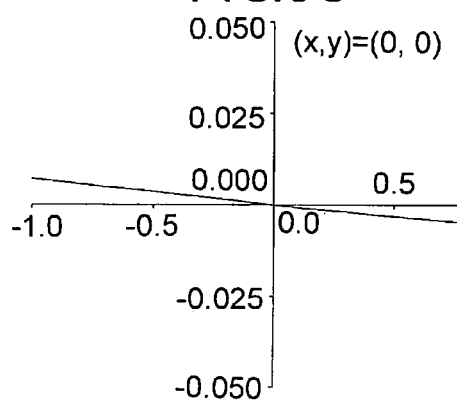
Figure 5D:
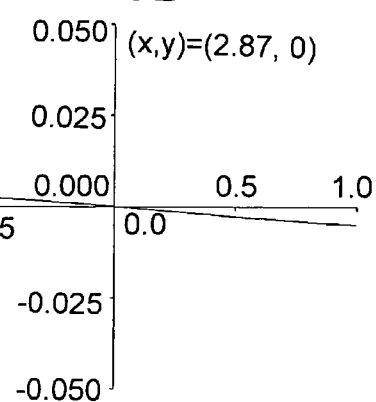
Figure 5E:
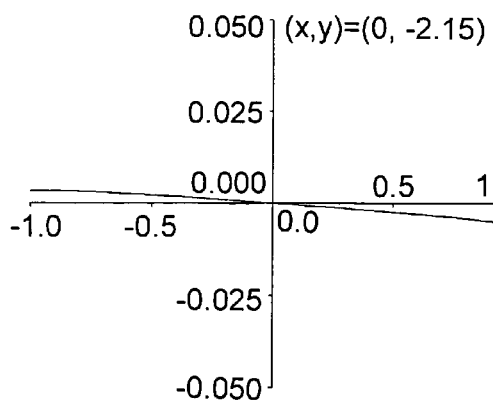
Figure 5F:
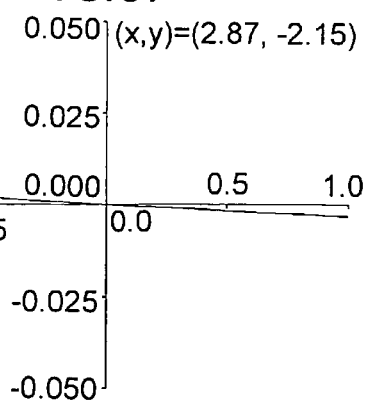
Figure 6A:
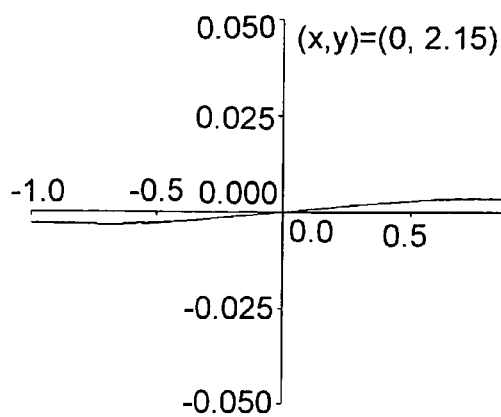
FIGS. 6A to 6F are X-direction lateral aberration diagrams of Example 2.
Figure 6B:
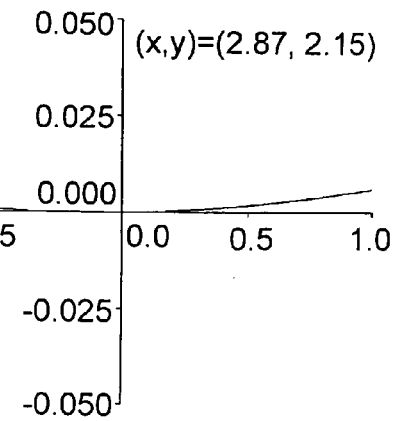
Figure 6C:
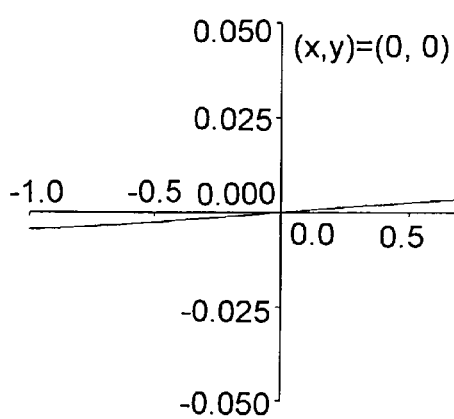
Figure 6D:
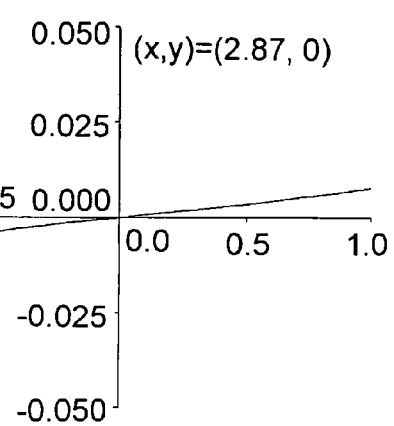
Figure 6E:
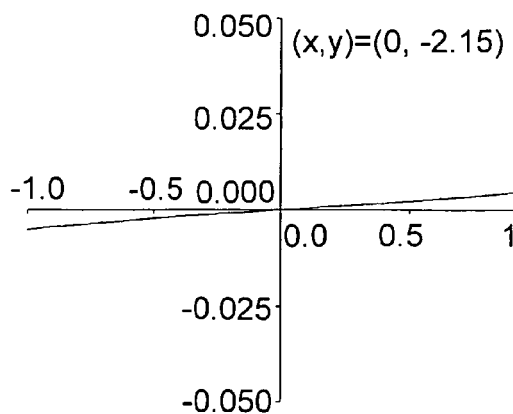
Figure 6F:
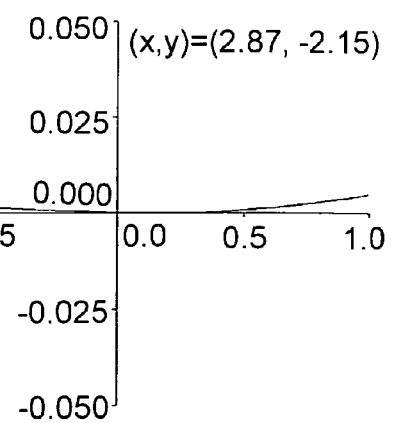
Figure 7A:
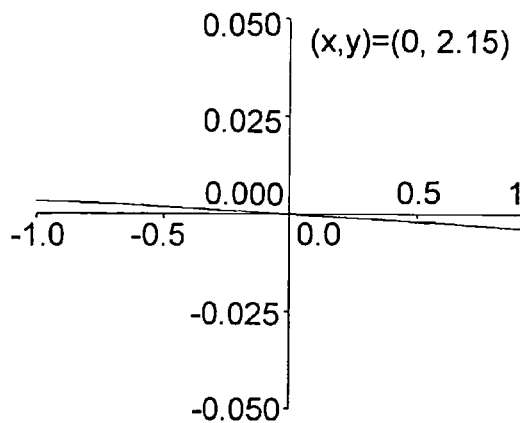
FIGS. 7A to 7F are Y-direction lateral aberration diagrams of Example 2.
Figure 7B:
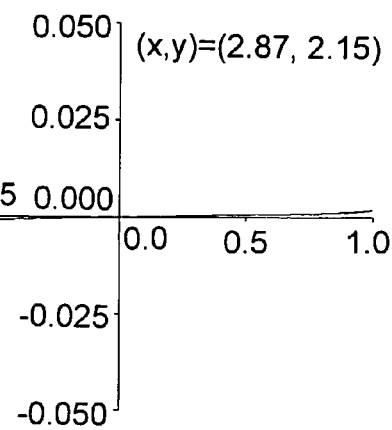
Figure 7C:
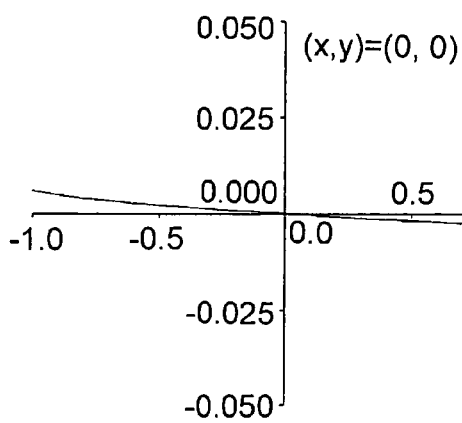
Figure 7D:
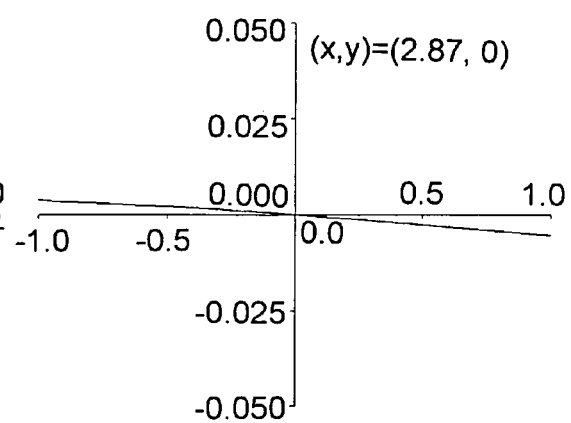
Figure 7E:
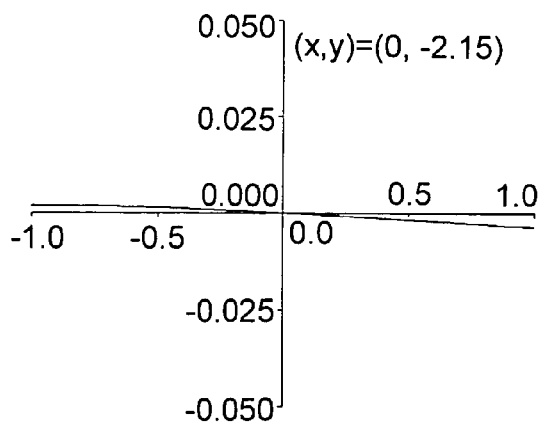
Figure 7F:
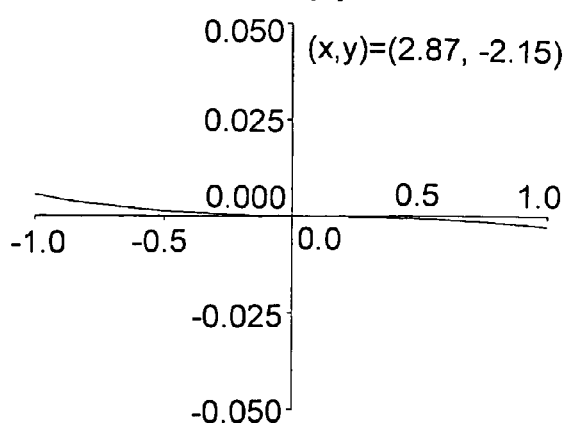
Figure 8A:
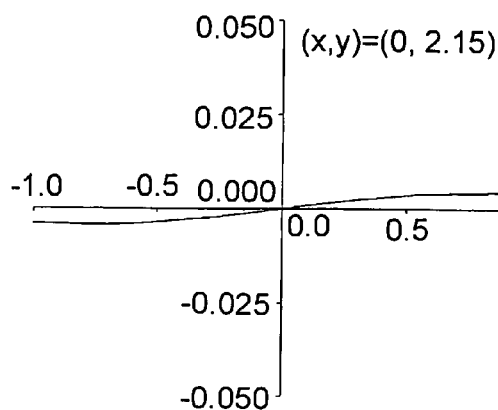
FIGS. 8A to 8F are X-direction lateral aberration diagrams of Example 3.
Figure 8B:
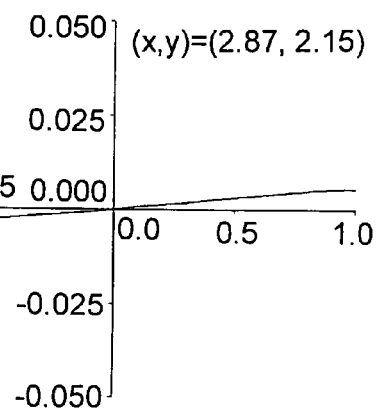
Figure 8C:
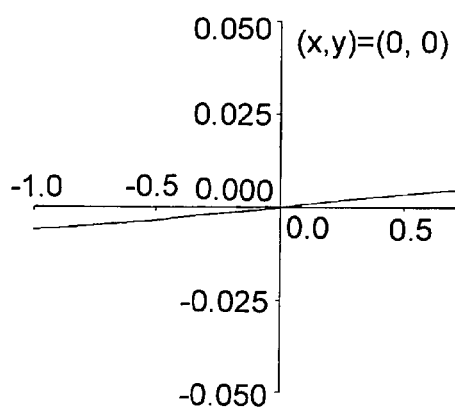
Figure 8D:
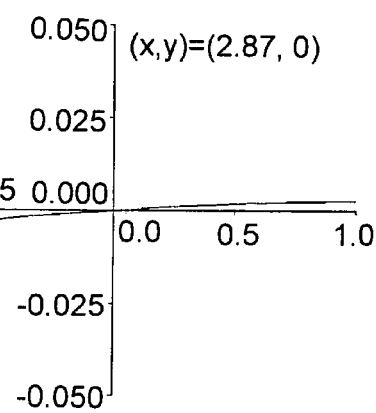
Figure 8E:
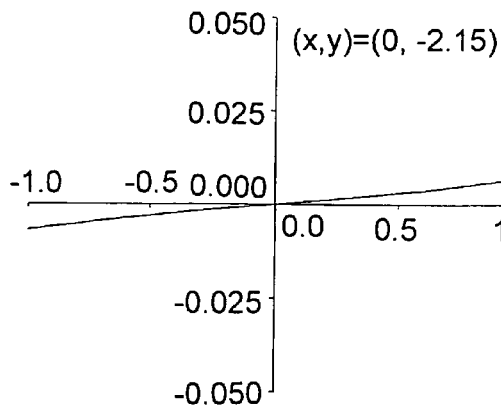
Figure 8F:
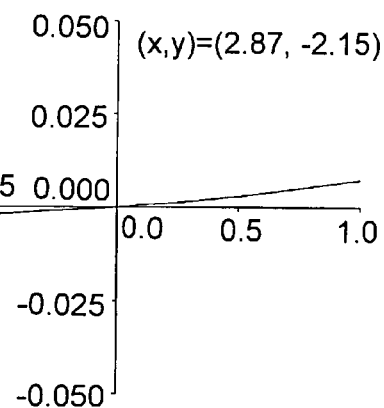
Figure 9A:
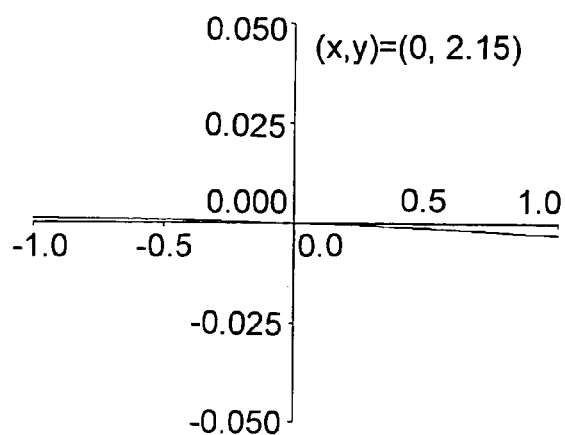
FIGS. 9A to 9F are Y-direction lateral aberration diagrams of Example 3.
Figure 9B:
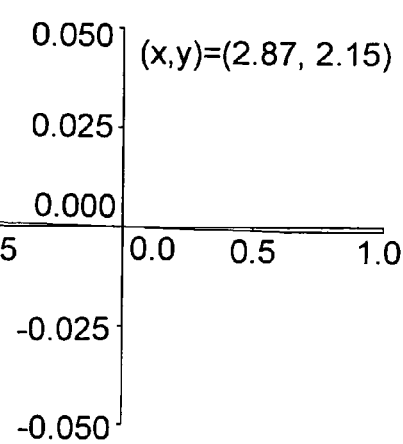
Figure 9C:
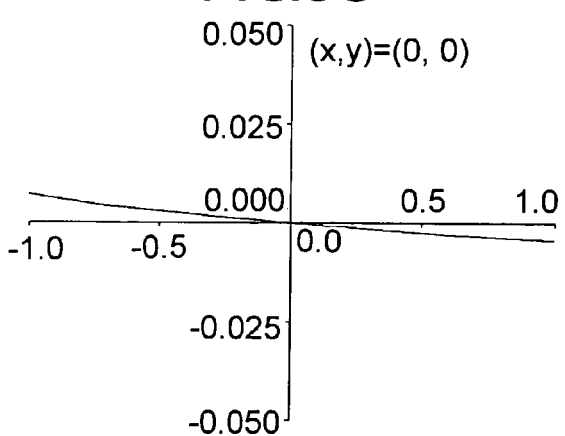
Figure 9D:
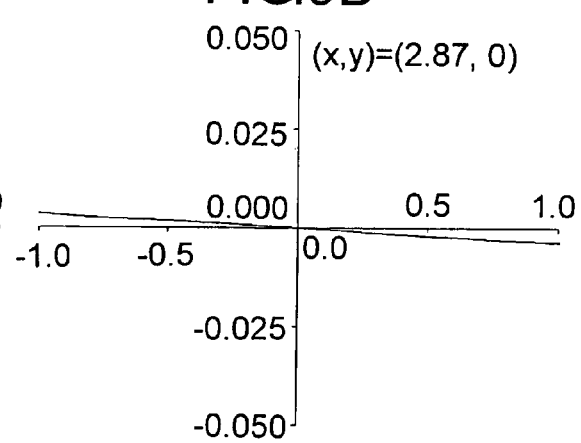
Figure 9E:
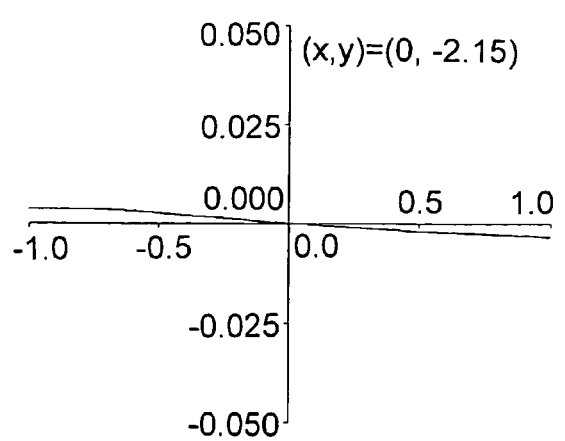
Figure 9F:
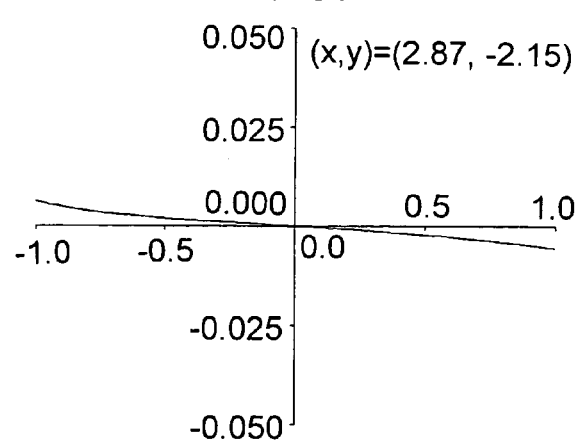

Hereinafter, taking optical systems embodying the present invention will be described with reference to the accompanying drawings. FIGS. 1 to 3 show the optical constructions of a first to a third embodiment, respectively, of the present invention, each in an optical section thereof. In FIGS. 1 to 3, a surface indicated by a symbol in the form of Si is the i-th surface as counted from the object side, and a surface of which the symbol Si is marked with an asterisk (*) is a free-form curved surface. The taking optical systems of the embodiments are all provided with one optical prism PR that functions as a single-focal-length lens for forming an optical image of an object (that is, a shooting subject) on the light-receiving surface of an image sensor SR, for example a solid-state image sensor such as a CCD (charge-coupled device). On the third surface S3 of the optical prism PR, an optical aperture ST is disposed. On the image side of the optical prism PR, a plane-parallel plate PT (corresponding to an optical filter disposed as necessary, such as an optical low-pass filter or an infrared cut filter, and the cover glass or the like of the image sensor SR) is disposed. In the following description, when the focal length, optical power, or the like of an optical surface is discussed, the horizontal direction (the direction of the longer sides of the image) is referred to as the x-direction, and the vertical direction (the direction of the shorter sides of the image) is referred to as the y-direction; unless otherwise indicated, for an anamorphic optical surface, the focal length, optical power, or the like thereof is given as the average of the values observed in the x- and y-directions.

Now, the optical construction common to the embodiments will be described along the optical path. The most object-side surface of the taking optical system is referred to as the first surface S1, and is the entrance surface of the optical prism PR. Rays that have entered the optical prism PR through the first surface S1 are then reflected on a reflective surface referred to as the second surface S2 (the first reflective surface), and are thereby directed to the third surface S3. The third surface S3 is a reflective surface (the second reflective surface) that also serves as an optical aperture ST, and the optical aperture ST has an aperture in the shape of a circle. The rays reflected on the third surface S3 travel toward the fourth surface S4 (the third reflective surface), and are then reflected on the fourth surface S4. The rays reflected on the fourth surface S4 exits from the optical prism PR through the fifth surface S5, which is the exit surface of the optical prism PR. The first through fifth surfaces S1 to S5 are all free-form curved surfaces. The rays that have left the fifth surface S5 are then transmitted through the sixth surface S6 and the seventh surface S7, which are the surfaces of the plane-parallel plate PT, and then reach the image surface (the fifth surface) S8 to form an optical image of a shooting subject on the light-receiving surface of the image sensor SR. The optical image thus formed is then converted into an electrical signal by the image sensor SR. The "image sensor" here is of a two-dimensional type having a flat light-receiving surface. A two-dimensional image sensor extends in both the horizontal and vertical directions, and thus requires the use of a complicated taking optical system, which tends to produce complicated aberrations leading to poor optical performance. To correct for these aberrations, as will be described later, rotation-asymmetric surfaces need to be properly designed.

Twistless Eccentric Construction

What characterizes the embodiments is the provision of at least one optical prism that has an entrance surface, at least three reflective surfaces each curved, and an exit surface, and that receives rays from the object side through the entrance surface, then reflects the rays on those at least three reflective surfaces, and then lets out the rays through the exit surface. This optical prism is formed of a medium having a refractive index of 1.2 or more (that is, an optical material, other than air, having a refractive index of 1.2 or more for the d-lines). The optical aperture is disposed on or near one of the at least three reflective surfaces. One of the at least three reflective surfaces is an eccentrically disposed rotation-asymmetric surface. Let the ray traveling from the center of the object through the center of the optical aperture to the center of the image surface be called the base ray (BL in FIG. 10), then the intersections of the base ray with the entrance surface, each of the reflective surfaces, and the exit surface all lie approximately on the same plane.

Seeking higher performance and higher definition by the use of a conventional straight-type taking optical system requires an increased number of optical elements, and this makes the taking optical system accordingly thick. An effective way to make the taking optical system slim is to bend the optical path. To bend the optical path, it is preferable to use a reflective surface in an optical prism, and, by eccentrically disposing a reflective surface of an optical prism to bend the optical path, it is possible to realize a slimmer taking optical system. Here, the concept meant by the term "eccentric" is not a construction involving only a 45-degree reflective surface as provided in a rectangular prism but one involving optically acting surfaces having varying angles. In particular, with a construction employing only a reflective surface having 45 degrees, it is difficult to make a taking optical system compact by bending the optical path. It is by the use of reflective surfaces disposed eccentrically at varying angles that a taking optical system can be made compact. Such eccentricity produces more complicated aberrations (for example, eccentric coma, eccentric astigmatism, etc.) than does a 45-degree mirror, and these aberrations are more difficult to correct for.

To seek higher definition (that is, larger image-sensing size) with the same angle of view, it is necessary to increase the focal length. Increasing the focal length, however, results in unduly large chromatic aberration in particular. Whereas a reflective surface produces no chromatic aberration, a refractive surface does. To reduce chromatic aberration, it is necessary to reduce the optical power of a refractive surface and increase the optical power of a reflective surface. Disadvantageously, an eccentrically disposed reflective surface produces aberrations alien to a straight-type optical system and peculiar to an eccentrically disposed optical surface. Aberrations peculiar to an eccentrically disposed optical surface include distortion, coma, astigmatism, etc. resulting from eccentricity.

Aberrations can be corrected for, for example, by one of the following methods. The aberrations produced by a surface having a positive optical power may be corrected for with the aberrations produced by a surface having a negative optical power. Aberrations may be designed to occur symmetrically with respect to an optical aperture so as to be canceled out. If the method of correcting for the aberrations produced by a surface having a positive optical power with the aberrations produced by a surface having a negative optical power is adopted, since a taking optical system intrinsically has a positive optical power, aberrations cannot be corrected for satisfactorily with two reflective surfaces alone. In particular, for the purpose of correcting for aberrations peculiar to an eccentric optical surface, two reflective surfaces alone produce large coma due to the positive optical power, and thus make it impossible to obtain high performance. The method of producing aberrations symmetrically with respect to an optical aperture is effective in correcting aberrations. With two reflective surfaces alone, however, aberration comparable with spherical aberration cannot be corrected for satisfactorily. That is, providing at least three reflective surfaces makes it possible to achieve high performance.

It is preferable, as in the embodiments, to use one of the reflective surfaces as an optical aperture, or to dispose an optical aperture near it, and to arrange the reflective surfaces symmetrical with respect to the optical aperture. By giving one of the reflective surfaces the function of an optical aperture, or disposing an optical aperture near it, it is possible to obtain high performance without making the taking optical system unduly large. Moreover, giving a reflective surface the function of an optical aperture helps omit components for an optical aperture, and thus helps effectively achieve low cost and slimness.

As described previously, eccentrically disposing a reflective surface produces aberrations peculiar to eccentricity. Here, with regard to the direction of eccentricity, arranging the reflective surfaces in twisted eccentricity produces further complicated aberrations, and correcting for these aberrations needs reflective surfaces arranged in reversely twisted eccentricity. This makes the taking optical system unduly large. To avoid this, it is necessary to use only reflective surfaces arranged in untwisted eccentricity. To achieve this, let the ray traveling from the center of an object through the center of the optical aperture to the center of the image surface be called the "base ray", then it is preferable that the intersections of the base ray with the entrance surface, each of the reflective surfaces, and the exit surface all lie approximately on the same plane. If there is a twist, the vertical direction in which the focal length has its maximum value rotates in a plane perpendicular to rays. This makes difficult not only aberration correction but also evaluation during manufacture. This, it is important to design a twistless construction. Adopting such a construction makes it possible to realize a slim, high-performance taking optical system. Thus, it is possible to make a taking optical system low-cost and slim while simultaneously achieving high performance that can cope with high definition and wider angles of view It is preferable, as in the embodiments, that the taking optical system have only one optical prism. Building a taking optical system with only one optical prism gives the taking optical system the simplest construction. Advantageously, this helps greatly reduce the cost and thickness of the taking optical system. By giving the single optical prism at least three reflective surfaces, it is possible to make one reflective surface exert an optical power and make the other two correct for the aberrations resulting from eccentricity. This gives the taking optical system a high ability to correct aberrations. Moreover, disposing an optical aperture on or near a reflective surface of the single optical prism helps reduce the aberrations produced by that reflective surface even if it is given a strong optical power. Thus, this reflective surface can be made responsible for much of the optical power of the taking optical system. Moreover, giving a reflective surface an optical power produces no chromatic aberration. This helps minimize degradation in performance. Thus, with these features, it is possible, with only one optical prism, to realize a high-performance taking optical system that boasts of a high aberration correcting ability.

With regard to the optical power of the most object-side reflective surface (the first reflective surface S2 in the embodiments) as counted in order of incidence of the rays from the object side, it is preferable that conditional formula (A1) below be fulfilled.

$$0.1 < |fREFL1/fall| < 30.0 \tag{A1}$$

where
 fREFL1 represents the focal length of the most object-side reflective surface as counted in order of incidence of the rays from the object side; and
 fall represents the focal length of the entire system.

Conditional formula (A1) defines a conditional range that should preferably be fulfilled with regard to the optical power of the first reflective surface (that is, the most object-side reflective surface as counted in order of incidence of the rays from the object side). The first reflective surface serves to bend the light that has entered the taking optical system, and thus influences the size of the taking optical system. Moreover, since the first reflective surface is an optical surface disposed to the object side of the optical aperture, it greatly influences distortion. For these reasons, unless the first reflective surface is given a proper optical power, it is difficult to achieve slimness and high performance (in particular, well-corrected image distortion) in the taking optical system.

If the first reflective surface is given so high an optical power as to disregard the lower limit of conditional formula (A1), it produces too large distortion to be corrected for by the other surfaces. This makes it impossible to achieve high performance. If the first reflective surface is an eccentric surface, it produces too large eccentric distortion. This makes it impossible to achieve high performance. By contrast, if the upper limit of conditional formula (A1) is disregarded, the first reflective surface is responsible for too low an optical power to achieve slimness. Moreover, the first reflective surface does not satisfactorily correct for distortion, nor does it effectively cancel the aberrations produced by the other surfaces. Thus, out of the conditional range defined by conditional formula (A1), it is impossible to achieve high performance and slimness in the taking optical system.

It is preferable that conditional formula (A1a) below be fulfilled, and it is further preferable that conditional formula (A1b) below be fulfilled.

$$1.0 < |fREFL1/fall| < 20.0 \quad \text{(A1a)}$$

$$5.0 < |fREFL1/fall| < 15.0 \quad \text{(A1b)}$$

These conditional formulae (A1a) and (A1b) define, within the conditional range defined by conditional formula (A1) above, further preferable conditional ranges out of the above-stated and other considerations.

It is preferable that the most object-side reflective surface as counted in order of incidence of the rays from the object side (that is, the first reflective surface) have a negative optical power. Image distortion, like imaging performance, is an important factor in performance; that is, distortion makes it impossible to obtain an exact image. Moreover, in a case where the reflective surface is eccentric, eccentric distortion is produced. Giving the first reflective surface a negative optical power is particularly effective in correcting for negative distortion, that is, distortion in the negative direction.

With regard to the optical power of the most image-surface-side reflective surface (the third reflective surface S4 in the embodiments) as counted in order of incidence of the rays from the object side, it is preferable that conditional formula (A2) below be fulfilled.

$$0.1 < |fREFL3/fall| < 30.0 \quad \text{(A2)}$$

where fREFL3 represents the focal length of the most image-surface-side reflective surface as counted in order of incidence of the rays from the object side; and fall represents the focal length of the entire system.

Conditional formula (A2) defines a conditional range that should preferably be fulfilled with regard to the optical power of the last reflective surface (that is, the most image-surface-side reflective surface as counted in order of incidence of the rays from the object side). The last reflective surface serves to bend the rays from the previous reflective surface so as to direct them to the exit surface, and thus it greatly influences the image surface. It particularly greatly influences astigmatism, and therefore, unless the last reflective surface is given a proper optical power, it is difficult to achieve high performance.

If the last reflective surface is given so high an optical power as to disregard the lower limit of conditional formula (A2), it produces too large astigmatism to be corrected for by the other surfaces (in particular, the exit surface). This makes it impossible to achieve high performance. If the last reflective surface is an eccentric surface, it produces too large eccentric astigmatism. This makes it impossible to achieve high performance. By contrast, if the upper limit of conditional formula (A2) is disregarded, the last reflective surface is responsible for too low an optical power to achieve slimness. Thus, out of the conditional range defined by conditional formula (A2), it is impossible to achieve high performance and slimness in the taking optical system.

It is preferable that conditional formula (A2a) below be fulfilled, and it is further preferable that conditional formula (A2b) below be fulfilled.

$$0.5 < |fREFL3/fall| < 20.0 \quad \text{(A2a)}$$

$$1.0 < |fREFL3/fall| < 5.0 \quad \text{(A2b)}$$

These conditional formulae (A2a) and (A2b) define, within the conditional range defined by conditional formula (A2) above, further preferable conditional ranges out of the above-stated and other considerations.

It is preferable that the most image-surface-side reflective surface as counted in order of incidence of the rays from the object side (that is, the last reflective surface) have a negative optical power. If astigmatism is present, it deteriorates imaging performance on the image surface. By giving the last reflective surface (the third reflective surface S4 in the embodiments) a negative optical power, it is usually possible to correct for the tendency of the image surface inclining in the negative direction.

With regard to the arrangement of the optical aperture, it is preferable to dispose it on the second reflective surface as counted in order of incidence of the rays from the object side (the second reflective surface S3 in the embodiments), that is, to give that reflective surface the function of an optical aperture. Disposing the optical aperture on the reflective surface permits the reflective surface to serve also as an optical aperture. This eliminates the need for separate components to build an optical aperture, and thus helps achieve cost reduction. Disposing an optical aperture on the first reflective surface makes it impossible to cancel out aberrations between reflective surfaces disposed in front of and behind the optical aperture, and thus makes it difficult to achieve high performance. Disposing at least one reflective surface in front of a reflective surface that also serves as an optical aperture makes it possible to correct for aberrations between reflective surfaces disposed in front of and behind the optical aperture, and thus makes it possible to achieve high performance.

With regard to the optical power of the optical aperture surface, it is preferable that the optical aperture is disposed on one of the at least three reflective surfaces and that conditional formula (A3) below be fulfilled.

$$0.1 < |fREFL2/fall| < 30.0 \quad \text{(A3)}$$

where fREFL2 represents the focal length of the reflective surface on which the optical aperture is disposed; and fall represents the focal length of the entire system.

Conditional formula (A3) defines a conditional range that should preferably be fulfilled with regard to the optical power of the reflective surface that also serves as the optical aperture (the second reflective surface S3 in the embodiments). Giving an optical power to the reflective surface that also serves as the optical aperture increases flexibility in the correction of the aberrations produced by the taking optical system, and is therefore advantageous in terms of design. The optical power of this surface increases the differences in angle of incidence between upper and lower rays, and consequently influences coma. Thus, unless this reflective surface is given a proper optical power, it is impossible to realize a high-performance taking optical system.

If the reflective surface is given so high an optical power as to disregard the lower limit of conditional formula (A3), it produces too large coma to be corrected for by the other surfaces. This makes it impossible to achieve high performance. If the reflective surface is eccentric, it produces too large eccentric coma. This makes it impossible to achieve high performance. By contrast, if the reflective surface is made responsible for so low an optical power as to disregard the upper limit of conditional formula (A3), it is possible to reduce coma, but it is difficult to achieve slimness. Thus, out of the conditional range defined by conditional formula (A3), it is impossible to achieve high performance and slimness in the taking optical system.

It is preferable that conditional formula (A3a) below be fulfilled, and it is further preferable that conditional formula (A3b) below be fulfilled.

$$0.5 < |fREFL2/fall| < 20.0 \quad (A3a)$$

$$1 < |fREFL2/fall| < 5.0 \quad (A3b)$$

These conditional formulae (A3a) and (A3b) define, within the conditional range defined by conditional formula (A3) above, further preferable conditional ranges out of the above-stated and other considerations.

Moreover, with regard to the optical power of the optical aperture surface, it is preferable that the optical aperture be disposed on one of the at least three reflective surfaces and that the reflective surface on which the optical aperture is disposed have a positive optical power. On the optical aperture surface, the ray height is the smallest, and thus the influence of the aberrations produced by this surface is small. Thus, giving a positive optical power to the reflective surface on which the optical aperture is disposed makes it possible to reduce the optical power distributed to the other surfaces while maintaining the optical power of the entire system.

It is preferable that the optical aperture be disposed on or near the second reflective surface as counted in order of incidence of the rays from the object side (the second reflective surface S3 in the embodiments). A surface responsible for much of the optical power of the entire system has a sharp curvature, and this sharp curvature causes the reflective surface large aberrations. If the reflective surface is eccentric, it also produces large aberrations peculiar thereto. To reduce such aberrations, it is preferable to dispose such a sharp-curvature surface near the optical aperture. This helps reduce the ray height and thereby reduce the aberrations produced even with a strong optical power. The second reflective surface produces, in particular, large coma. In particular, if eccentric coma occurs, it greatly degrades imaging performance, and is difficult to correct for with the other surfaces. Thus, to reduce coma while giving the second reflective surface a sharp curvature, it is preferable, for high performance, that the optical aperture be disposed on or near the second reflective surface.

With regard to the entrance surface (the first surface S1 in the embodiments), it is preferable that conditional formula (A4) be fulfilled.

$$0.1 < |fREFR1/fall| < 30.0 \quad (A4)$$

where fREFR1 represents the focal length of the entrance surface; and fall represents the focal length of the entire system.

Conditional formula (A4) defines a conditional range that should preferably be fulfilled with regard to the optical power of the entrance surface. A refractive surface, unlike a reflective surface, produces, in particular, chromatic aberration. If a refractive surface is used as the entrance surface, it greatly influences lateral chromatic aberration. If lateral chromatic aberration occurs, color bleeding or the like occurs on the image surface; that is, different wavelengths are imaged at different positions, and this makes it impossible to obtain a clean image. Moreover, since the entrance surface is located farthest from the optical aperture on the object side thereof, and thus it also influences distortion. If distortion occurs, it deforms the image. By giving the entrance surface a proper optical power, it is possible to realize a taking optical system in which lateral chromatic aberration and distortion are satisfactorily corrected for.

If the entrance surface is given so high an optical power as to disregard the lower limit of conditional formula (A4), the reflective surface produces too large lateral chromatic aberration to be properly corrected for by the exit surface (the last prism surface S5 in the embodiments). This makes it impossible to obtain high performance. Moreover, distortion is overcorrected, and this deforms the image obtained. By contrast, if the upper limit of conditional formula (A4) is disregarded, the entrance surface has too low an optical power to properly refract rays. This makes the taking optical system as a whole too large to be made slim. Thus, out of the conditional range defined by conditional formula (A4), it is impossible to achieve high performance and slimness in the taking optical system.

It is preferable that conditional formula (A4a) below be fulfilled, and it is further preferable that conditional formula (A4b) below be fulfilled.

$$0.5 < |fREFR1/fall| < 20.0 \quad (A4a)$$

$$1.0 < |fREFR1/fall| < 5.0 \quad (A4b)$$

These conditional formulae (A4a) and (A4b) define, within the conditional range defined by conditional formula (A4) above, further preferable conditional ranges out of the above-stated and other considerations.

It is preferable that the entrance surface (the first surface S1 in the embodiments) have a positive optical power. This permits the entrance surface to make rays converge, and is therefore advantageous for making the taking optical system slim. It is advantageous also in terms of the optical power through the entire system, because it helps reduce the optical power distributed to the reflective surfaces. Thus, it is possible to reduce the eccentric astigmatism, eccentric coma, eccentric distortion, etc. produced by an eccentric reflective surface, and thereby to achieve high performance. It should be noted that, in the numerical examples presented later, the reference curvature of the first surface S1 has a negative value, but the free-form curved surface coefficients are given assuming that the first surface S1 has a positive optical power.

In the embodiments, the first to fifth surfaces S1 to S5 are free-form curved surfaces. In this way, in an optical prism having a plurality of reflective surfaces, it is preferable to use, as its prism surfaces, free-form curved surfaces, and it is further preferable that the curved surfaces that form the reflective surfaces of the optical prism be free-form curved surfaces. An eccentric curved surface produces aberrations peculiar to eccentricity, for example eccentric distortion, eccentric coma, and eccentric astigmatism. These aberrations can be corrected for only with a surface that has an asymmetric curvature with respect to the direction of eccentricity of the eccentric curved surface. Moreover, by setting different curvatures (including the sign thereof) in the direction of eccentricity and in the direction perpendicular thereto, it is possible to correct for aberrations attributable to eccentricity.

Let the most object-side reflective surface as counted in order of incidence of the rays from the object side be called the first reflective surface (the second surface S2 in the embodiments), then it is preferable that the first reflective surface have a negative optical power and fulfill conditional formula (A5) below.

$$0.05 < |\phi REFL1y/\phi REFL1x| < 20.0 \quad (A5)$$

where

φREFL1x represents the optical power that the first reflective surface has in the horizontal direction at the intersection thereof with the base ray; and φREFL1y represents the optical power that the first reflective surface has in the vertical direction at the intersection thereof with the base ray.

Conditional formula (A5) defines a conditional range that should preferably be fulfilled with regard to the power anamorphic ratio (the ratio between the optical powers in the x- and y-directions) of the first reflective surface. In a taking optical system including eccentric optically acting surfaces, the optically acting surfaces often have different optical powers between in two directions (for example, the x- and y-directions). Even then, it is preferable that the optical power through the entire system be approximately equal between in the two directions. This helps properly locate imaging points on the image surface, and helps make the magnification equal in the different directions. However, since the individual optically acting surfaces are eccentric, they exert different aberration-correcting effects. The first reflective surface is more eccentric in the y-direction than in x-direction, and thus produces larger eccentric astigmatism and eccentric distortion in the y-direction. However, if the optical powers are set with attention paid only to the eccentric aberrations in the y-direction, the optical power through the entire system becomes anamorphic, which is undesirable for the taking optical system as a whole. Thus, it is preferable to properly set the relationship between the optical powers in the x- and y-directions. This makes it possible, while correcting for eccentric astigmatism and eccentric distortion, to prevent the optical power of the entire system from becoming anamorphic.

If the lower limit of conditional formula (A5) is disregarded, the optical powers in the x- and y-directions differ so much as to result in undercorrection of eccentric astigmatism and eccentric distortion. By contrast, disregarding the upper limit of the conditional formula (A5) results in overcorrection. Moreover, out of the conditional range defined by conditional formula (A5), the optical powers of the entire system between in the horizontal (x-) and vertical (y-) directions differ so much as to be anamorphic. This makes it impossible to build the taking optical system. Thus, out of the conditional range defined by conditional formula (A5), it is impossible to achieve high performance in the taking optical system, and it is thus impossible to realize the taking optical system as a whole.

It is preferable that conditional formula (A5a) below be fulfilled, and it is further preferable that conditional formula (A5b) below be fulfilled.

$$0.1 < |\phi REFL1y/\phi REFL1x| < 10.0 \tag{A5a}$$

$$0.5 < |\phi REFL1y/\phi REFL1x| < 5.0 \tag{A5b}$$

These conditional formulae (A5a) and (A5b) define, within the conditional range defined by conditional formula (A5) above, further preferable conditional ranges out of the above-stated and other considerations.

Let the second reflective surface as counted in order of incidence of the rays from the object side be called the second reflective surface (the third surface S3 in the embodiments), then it is preferable that the second reflective surface have a positive optical power and fulfill conditional formula (A6) below.

$$0.05 < |\phi REFL2y/\phi REFL2x| < 20.0 \tag{A6}$$

where

φREFL2x represents the optical power that the second reflective surface has in the horizontal direction at an intersection thereof with the base ray; and φREFL2y represents the optical power that the second reflective surface has in the vertical direction at the intersection thereof with the base ray.

Conditional formula (A6) defines a conditional range that should preferably be fulfilled with regard to the power anamorphic ratio (the ratio between the optical powers in the x- and y-directions) of the second reflective surface. The second reflective surface produces large eccentric coma in the y-direction. On the other hand, if the optical powers are defined with attention paid only to the eccentric aberrations in the y-direction, the optical power through the entire system becomes anamorphic, giving an undesirable optical power to the taking optical system as a whole. Thus, it is preferable to properly set the relationship between the optical powers in the x- and y-directions. This makes it possible, while correcting for eccentric astigmatism, to prevent the optical power of the entire system from becoming anamorphic.

If the lower limit of conditional formula (A6) is disregarded, the optical powers in the x- and y-directions differ so much as to result in undercorrection of coma. By contrast, disregarding the upper limit of the conditional formula (A6) results in overcorrection. Moreover, out of the conditional range defined by conditional formula (A6), the optical powers of the entire system between in the horizontal (x-) and vertical (y-) directions differ so much as to be anamorphic. This makes it impossible to build the taking optical system. Thus, out of the conditional range defined by conditional formula (A6), it is impossible to achieve high performance in the taking optical system, and it is thus impossible to realize the taking optical system as a whole.

It is preferable that conditional formula (A6a) below be fulfilled, and it is further preferable that conditional formula (A6b) below be fulfilled.

$$0.1 < |\phi REFL2y/\phi REFL2x| < 10.0 \tag{A6a}$$

$$0.1 < |\phi REFL2y/\phi REFL2x| < 3.0 \tag{A6b}$$

These conditional formulae (A6a) and (A6b) define, within the conditional range defined by conditional formula (A6) above, further preferable conditional ranges out of the above-stated and other considerations.

Let the third reflective surface as counted in order of incidence of the rays from the object side be called the third reflective surface (the fourth surface S4 in the embodiments), then it is preferable that the third reflective surface have a negative optical power and fulfill conditional formula (A7) below.

$$0.05 < |\phi REFL3y/\phi REFL3x| < 20.0 \tag{A7}$$

where

φREFL3x represents the optical power that the third reflective surface has in the horizontal direction at an intersection thereof with the base ray; and φREFL3y represents the optical power that the third reflective surface has in the vertical direction at the intersection thereof with the base ray.

Conditional formula (A7) defines a conditional range that should preferably be fulfilled with regard to the power anamorphic ratio (the ratio between the optical powers in the x- and y-directions) of the third reflective surface. The third reflective surface produces large eccentric astigmatism in the y-direction. On the other hand, if the optical powers are defined with attention paid only to the eccentric aberrations in the y-direction, the optical power through the entire system becomes anamorphic, giving an undesirable optical power to the taking optical system as a whole. Thus, it is preferable to properly set the relationship between the optical powers in the x- and y-directions. This makes it possible, while correcting for eccentric astigmatism, to prevent the optical power of the entire system from becoming anamorphic.

If the lower limit of conditional formula (A7) is disregarded, the optical powers in the x- and y-directions differ so much as to result in undercorrection of eccentric astigmatism. By contrast, disregarding the upper limit of the conditional formula (A7) results in overcorrection. Moreover, out of the conditional range defined by conditional formula (A7), the optical powers of the entire system between in the horizontal (x-) and vertical (y-) directions differ so much as to be anamorphic. This makes it impossible to build the taking optical system. Thus, out of the conditional range defined by conditional formula (A7), it is impossible to achieve high performance in the taking optical system, and it is thus impossible to realize the taking optical system as a whole.

It is preferable that conditional formula (A7a) below be fulfilled, and it is further preferable that conditional formula (A7b) below be fulfilled.

$$0.1 < |\phi REFL3y/\phi REFL3x| < 10.0 \quad (A7a)$$

$$0.5 < |\phi REFL3y/\phi REFL3x| < 5.0 \quad (A7b)$$

These conditional formulae (A7a) and (A7b) define, within the conditional range defined by conditional formula (A7) above, further preferable conditional ranges out of the above-stated and other considerations.

It is preferable that the entrance surface (the first surface S1 in the embodiments) have a positive optical power and fulfills conditional formula (A8) below.

$$0.05 < |\phi REFR1y/\phi REFR1x| < 20.0 \quad (A8)$$

where
  $\phi REFR1x$ represents the optical power that the entrance surface has in the horizontal direction at the intersection thereof with the base ray; and
  $\phi REFR1y$ represents the optical power that the entrance surface has in the vertical direction at the intersection thereof with the base ray.

Conditional formula (A8) defines a conditional range that should preferably be fulfilled with regard to the power anamorphic ratio (the ratio between the optical powers in the x- and y-directions) of the entrance surface (the first surface S1), which is a transmissive surface. The entrance surface produces distortion and lateral chromatic aberration. In particular, the distortion here relates to the correction by the optically acting surfaces disposed behind. In particular, in the y-direction, eccentricity produces eccentric distortion, and, to achieve a proper balance therewith, it is necessary to set proper optical powers. However, if the optical powers are defined with attention paid only to the distortion in the y-direction, the optical power through the entire system becomes anamorphic, giving an undesirable optical power to the taking optical system as a whole. Thus, it is preferable to properly set the relationship between the optical powers in the x- and y-directions. This makes it possible, while correcting for eccentric distortion, to prevent the optical power of the entire system from becoming anamorphic.

If the lower limit of conditional formula (A8) is disregarded, the optical powers in the x- and y-directions differ so much as to result in undercorrection of eccentric distortion. By contrast, disregarding the upper limit of the conditional formula (A8) results in overcorrection. Moreover, out of the conditional range defined by conditional formula (A8), the optical powers of the entire system between in the horizontal (x-) and vertical (y-) directions differ so much as to be anamorphic. This makes it impossible to build the taking optical system. Thus, out of the conditional range defined by conditional formula (A8), a deformed image is produced, and moreover it is impossible to realize the taking optical system as a whole.

It is preferable that conditional formula (A8a) below be fulfilled, and it is further preferable that conditional formula (A8b) below be fulfilled.

$$0.1 < |\phi REFR1y/\phi REFR1x| < 10.0 \quad (A8a)$$

$$0.5 < |\phi REFR1y/\phi REFR1x| < 5.0 \quad (A8b)$$

These conditional formulae (A8a) and (A8b) define, within the conditional range defined by conditional formula (A8) above, further preferable conditional ranges out of the above-stated and other considerations.

It is preferable that conditional formula (A9) below be fulfilled.

$$0.5 < NAy(+)/NAy(-) < 1.5 \quad (A9)$$

where
  $NAy(+)$ represents the numerical aperture (NA) on the positive side in the vertical direction (y-direction) at the center of the image surface; and
  $NAy(-)$ represents the numerical aperture (NA) on the negative side in the vertical direction (y-direction) at the center of the image surface.

Conditional formula (A9) defines a conditional range that should preferably be fulfilled with regard to the ratio of brightness in the y-direction on the image surface. An optical system including an eccentric curved surface is asymmetric with respect to the direction of eccentricity. In an optical system eccentric in the vertical direction, how rays converge on the image surface is asymmetric between in the positive and negative directions. As this asymmetry increases, the brightness of the image becomes uneven, making it impossible to obtain a clean image. Thus, by defining the ratio of brightness between those two directions, it is possible to form a clean image. Out of the conditional range defined by conditional formula (A9), the unevenness of brightness is so great that it is impossible to form a clean image.

It is preferable that conditional formula (A9a) below be fulfilled, and it is further preferable that conditional formula (A9b) below be fulfilled.

$$0.7 < NAy(+)/NAy(-) < 1.3 \quad (A9a)$$

$$0.8 < NAy(+)/NAy(-) < 1.2 \quad (A9b)$$

These conditional formulae (A9a) and (A9b) define, within the conditional range defined by conditional formula (A9) above, further preferable conditional ranges out of the above-stated and other considerations.

It is preferable that conditional formula (A10) below be fulfilled.

$$0.5 < NAx/NAy < 1.8 \quad (A10)$$

where
  $NAx$ represents the average of the numerical apertures on the positive and negative sides in the horizontal (x-) direction at the center of the image surface; and NAy represents the average of the numerical apertures on the positive and negative sides in the vertical (y-) direction at the center of the image surface.

Conditional formula (A10) defines a conditional range that should preferably be fulfilled with regard to the ratio of brightness between in the x- and y-directions on the image surface. In an eccentric optical system, rays have different brightness between in the horizontal and vertical directions. As this difference increases, the brightness of the image becomes uneven, leading to degraded image quality. Thus, by defining the ratio of brightness between those directions, it is possible to form a clean image. Out of the conditional range defined by conditional formula (A10), the unevenness of brightness is so conspicuous that it is impossible to obtain an acceptable image.

It is further preferable that conditional formula (A10a) below be fulfilled.

$$0.7 < NAx/NAy < 1.5 \quad (A10a)$$

This conditional formula and (A10a) defines, within the conditional range defined by conditional formula (A10) above, a further preferable conditional range out of the above-stated and other considerations.

It is preferable that the reflective surfaces include a reflective surface that does not totally reflect, and it is further preferable that the reflective surfaces include no reflective surface that totally reflects. The embodiments all include a reflective surface that does not totally reflect. Designing a reflective surface to totally reflect light is advantageous in terms of cost, because doing so eliminates the need to lay a reflective coat for that reflective surface. However, for a reflective surface to totally reflect light, the light needs to be shone on it at a large angle of incidence. The larger the angle of incidence, the larger the aberrations produced. To correct these aberrations, an additional optical surface becomes necessary. This is rather disadvantageous in terms of cost. Thus, to realize a high-performance taking optical system at low cost, it is necessary to use a reflective surface that is not a total-reflection surface that requires a large angle of incidence.

It is preferable that the surfaces forming the optical prism include no surface that both transmits and reflects (for example a TIR—total internal reflection—surface). The embodiments all include no surface that both transmits and reflects. To make a surface both transmit and reflect, it is necessary, for example, to use a louver optical element or to exploit the total reflection effect. Using a louver optical element or the like leads to higher cost and reduces the overall amount of light. Exploiting the total reflection effect leads to higher cost as described above and makes it difficult to achieve high performance. Thus, to achieve high performance and low cost, it is necessary not to use a surface that both transmits and reflects.

Let the second reflective surface as counted in order of incidence of the rays from the object side be called the second reflective surface (the third surface S3 in the embodiments), and let the third reflective surface as counted in order of incidence of the rays from the object side be called the third reflective surface (the fourth surface S4 in the embodiments), then it is preferable, as in the embodiments, that the rays incident on the second reflective surface cross the rays leaving the third reflective surface. For example, it is preferable, as in the embodiments, that the base ray BL incident on the second reflective surface crosses the base ray BL leaving the third reflective surface (see FIG. 10).

An effective way to make the taking optical system slim is to bend the optical path and, in addition, make the rays incident on the second reflective surface and the rays leaving the third reflective surface cross each other somewhere along their path. Making the rays cross each other somewhere on the object side of the taking optical system leads to a large beam diameter, and thus makes the taking optical system rather large, disadvantageously in terms of slimness. Thus, a further effective way to make the taking optical system slim is to make the rays cross each other on a reflective surface close to the image side.

It is preferable that the angle at which the base ray crosses itself fulfill conditional formula (A11) below (see FIG. 10).

$$30 < \theta < 80 \quad (A11)$$

where
$\theta$ represents the smaller angle (degrees) at which the base ray crosses itself.

As described above, by bending rays and making them cross themselves, it is possible to make the taking optical system slim. However, making the rays cross themselves perpendicularly requires a wide space, and is therefore disadvantageous in terms of slimness. To make the taking optical system slim, it is necessary to design the reflective surfaces such that the angle at which the base ray crosses itself fulfills conditional formula (A11). By properly setting this crossing angle, it is possible to realize a slim taking optical system that offers high performance.

If the upper limit of conditional formula (A11) is disregarded, the reflective surfaces that permit the base ray to cross itself need to be arranged at right angles. This makes the taking optical system unduly large. By contrast, disregarding the lower limit of conditional formula (A11) is advantageous in terms of slimness, but results in so large an angle of incidence with respect to the reflective surface as to produce large aberration. This makes it difficult to achieve high performance in the taking optical system. Moreover, for the correction of aberrations, an additional optical surface becomes necessary, making the taking optical system larger.

It is preferable, as in the embodiments, that the optical prism have only three reflective surfaces. To make the optical prism slim inexpensively and efficiently, it is advantageous to give it as few reflective surfaces as possible. However, too few reflective surfaces require a strong optical power to be distributed to each surface. This causes each surface to produce large aberrations, and thus makes it impossible to achieve high performance. Increasing the number of reflective surfaces is advantageous in terms of performance, but leads to higher cost and a larger size. By providing three reflective surfaces and using them as main elements, it is possible to achieve slimness while maintaining high performance.

Figure 10:
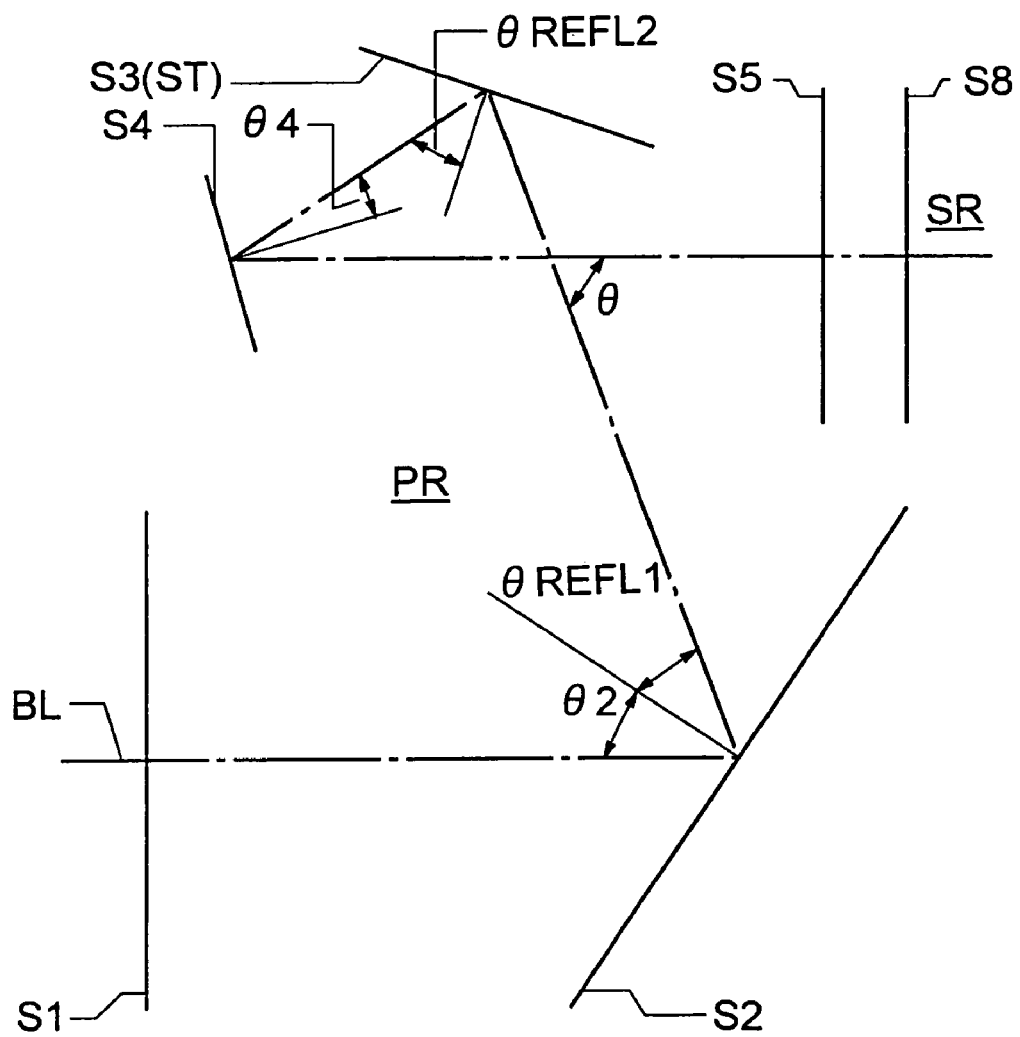
FIGS. 10 to 12 are optical path diagrams showing the angle between the base ray and each of the first to third reflective surfaces.

In a case where, as in the embodiments, the optical prism has only three reflective surfaces, let the first reflective surface as counted in order of incidence of the rays from the object side be called the first reflective surface (the second surface S2 in the embodiments), and let the third reflective surface as counted in order of incidence of the rays from the object side be called the third reflective surface (the fourth surface S4 in the embodiments), then it is preferable that conditional formula (A12) below be fulfilled (see FIG. 10).

$$0.1 < \theta 2/\theta 4 < 10.0 \quad (A12)$$

where
$\theta 2$ represents the angle (degrees) between the base ray and the normal to the first reflective surface at the intersection therebetween; and θ4 represents the angle (degrees) between the base ray and the normal to the third reflective surface at the intersection therebetween.

Conditional formula (A12) defines a conditional range that should preferably be fulfilled with regard to the relative angle between the first and third reflective surfaces. In a case where there are provided only three prism surfaces, the first reflective surface reflects the rays that have just passed through the entrance surface (the first surface S1), and the third reflective surface reflects the rays toward the exit surface (the fifth surface S5). These optical surfaces are disposed in positions eccentric relative to each other, and their being so arranged provides an effect of canceling the aberrations resulting from eccentricity (in particular, eccentric distortion and eccentric coma) between themselves. Setting a proper angular relationship to fulfill conditional formula (A12) makes it possible to realize a taking optical system in which eccentric distortion and eccentric coma are satisfactorily corrected. Out of the conditional range defined by conditional formula (A12), eccentric distortion is large, and so is coma resulting from eccentricity.

It is preferable that conditional formula (A12a) below be fulfilled, and it is further preferable that conditional formula (A12b) below be fulfilled.

$$0.5 < \theta2/\theta4 < 5.0 \quad (A12a)$$

$$1.0 < \theta2/\theta4 < 3.0 \quad (A12b)$$

These conditional formulae (A12a) and (A12b) define, within the conditional range defined by conditional formula (A12) above, further preferable conditional ranges out of the above-stated and other considerations.

It is preferable that conditional formula (A13) below be fulfilled.

$$Tall/fall < 2.0 \quad (A13)$$

where

Tall represents the thickness from the entrance surface to the light-receiving surface of the image sensor (for example, the distance from the intersection between the entrance surface and the base ray to the image-sensing surface); and fall represents the focal length of the entire system (the average of the focal lengths in the horizontal and vertical directions).

Conditional formula (A13) indicates the degree of slimness brought by the bending effect as observed in the focal length. The degree of slimness achieved in the taking optical system is evaluated in terms of the focal length thereof. The longer the focal length, the larger the total length. Thus, it is impossible, simply by evaluating the thickness, to evaluate the degree of slimness achieved; it should better be evaluated in terms of the ratio between the thickness and the focal length. If the upper limit of conditional formula (A13) is disregarded, the bending effect is too small to make the taking optical system satisfactorily slim.

It is preferable that conditional formula (A13a) below be fulfilled, and it is further preferable that conditional formula (A13b) below be fulfilled.

$$Tall/fall < 1.5 \quad (A13a)$$

$$Tall/fall < 1.0 \quad (A13b)$$

These conditional formulae (A13a) and (A13b) define, within the conditional range defined by conditional formula (A13) above, further preferable conditional ranges out of the above-stated and other considerations.

It is preferable, as in the embodiments, that the optical prism have an odd number of reflective surfaces. In a case where the optical aperture is disposed on or near a reflective surface, disposing other reflective surfaces symmetrically with respect to that reflective surface permits the coma, distortion, etc. produced by the other reflective surfaces to be canceled out. This makes it possible to achieve high performance in the taking optical system. For this purpose, it is preferable that there be provided an odd number of reflective surfaces. Incidentally, reflecting an image an odd number of times produces a mirror image of the original. The mirror image can easily be reversed wherever an image sensor is used.

In a case where the optical prism has only three reflective surfaces, let the most object-side reflective surface as counted in order of incidence of the rays from the object side be called the first reflective surface (the second surface S2 in the embodiments), then it is preferable that the first reflective surface have a negative optical power and fulfills conditional formula (A14) below (see FIG. 10).

$$5.0 < \theta REFL1 < 70.0 \quad (A14)$$

where

θREFL1 represents the angle (degrees) of reflection at which the base ray is reflected on the first reflective surface.

Conditional formula (A14) defines a conditional range that should preferably be fulfilled with regard to the angle of reflection on the first reflective surface. The first reflective surface plays an important role in greatly bending the direction of the incident rays and thereby producing an effect of folding the optical path. To increase the folding effect, it is preferable to bend the optical path as close to perpendicularly as possible. This, however, produces large eccentric distortion and eccentric astigmatism, and makes it impossible to improve imaging performance. Thus, it is difficult to achieve high performance. On the other hand, too small a bending angle makes it impossible to make the taking optical system slim. To achieve slimness while realizing high imaging performance, it is preferable to set the angle of reflection on the first reflective surface to fulfill conditional formula (A14).

If the angle of reflection is so small as to disregard the lower limit of the conditional formula (A14), the optical path up to the next reflective surface is too short for making the taking optical system slim, and thus diminishes the folding effect. By contrast, if the angle of reflection is so large as to disregard the upper limit of the conditional formula (A14), the first reflective surface produces so large eccentric aberrations as to make it difficult to correct for, in particular, the eccentric distortion and eccentric astigmatism. This makes it impossible to achieve high performance.

It is preferable that conditional formula (A14a) below be fulfilled, and it is further preferable that conditional formula (A14b) below be fulfilled.

$$10.0 < \theta REFL1 < 60.0 \quad (A14a)$$

$$20.0 < \theta REFL1 < 40.0 \quad (A14b)$$

These conditional formulae (A14a) and (A14b) define, within the conditional range defined by conditional formula (A14) above, further preferable conditional ranges out of the above-stated and other considerations.

In a case where the optical prism has only three reflective surfaces, let the second reflective surface as counted in order of incidence of the rays from the object side be called the second reflective surface (the third surface S3 in the embodiments), then it is preferable, as in the embodiments, that the optical aperture be disposed on the second reflective surface, and that no part of the base ray is approximately parallel to the base ray incident on the second reflective surface.

In a case where the optical prism is composed of three reflective surfaces, and the second reflective surface serves also as the optical aperture, it is effective for slimness to set the angle of the base ray from the first reflective surface to the second reflective surface close to perpendicular to the base ray incident on the entrance surface from the object side. By lengthening the optical path in the direction of this base ray, it is possible to realize a slim taking optical system while securing a satisfactory focal length. However, adding further rays in that direction with a view to lengthening the optical path eventually requires that reflective surfaces be disposed parallel to each other, and thus make it difficult to make the taking optical system slim. Thus, to make the taking optical system slim, it is necessary that only one bunch of rays be approximately parallel to the rays incident on the second reflective surface.

In a case where the optical prism has only three reflective surfaces, let the second reflective surface as counted in order of incidence of the rays from the object side be called the second reflective surface (the third surface S3 in the embodiments), then it is preferable, as in the embodiments, that the optical aperture be disposed on the second reflective surface, and that no part of the base ray be approximately parallel to the base ray leaving the second reflective surface.

In a case where the optical prism is composed of three reflective surfaces, and the second reflective surface serves also as the optical aperture, the base ray leaving the second reflective surface has an angle close to 45 degrees relative to the base ray incident on the entrance surface from the object side. Lengthening the optical path of those rays is naturally disadvantageous in terms of slimness. Thus, having more than one part of the base ray running approximately parallel to those rays is disadvantageous in terms of slimness.

In a case where the optical prism has only three reflective surfaces, let the second reflective surface as counted in order of incidence of the rays from the object side be called the second reflective surface, then it is preferable that conditional formula (A15) below be fulfilled (see FIG. 10).

$$5.0 < \theta REFL2 < 70.0 \quad (A15)$$

where $\theta REFL2$ represents the angle (degrees) of reflection at which the base ray is reflected on the second reflective surface.

Conditional formula (A15) defines a conditional range that should preferably be fulfilled with regard to the angle of reflection on the second reflective surface located at or near the optical aperture surface. The second reflective surface is responsible for much of the optical power of the entire system. A large angle of reflection here contributes to the taking optical system exerting a folding effect, and thus makes it possible to achieve further slimness. However, a large angle of reflection produces large aberrations. In particular, this surface produces so large eccentric distortion and eccentric astigmatism, and therefore a large angle of reflection here degrades imaging performance and makes it impossible to achieve high performance in the taking optical system. Setting the angle of reflection on the second reflective surface to fulfill conditional formula (A15) makes it possible to realize a slim taking optical system that offers high performance.

If the angle of reflection is so large as to disregard the upper limit of the conditional formula (A15), the eccentric distortion and eccentric astigmatism produced are too large to be corrected for by the other optical surfaces. By contrast, if the angle of reflection is so small as to disregard the lower limit of the conditional formula (A15), the first and third reflective surfaces are so close to each other that it is necessary to secure a space accordingly. This makes it impossible to make the taking optical system slim.

It is preferable that conditional formula (A15a) below be fulfilled, and it is further preferable that conditional formula (A15b) below be fulfilled.

$$10.0 < \theta REFL2 < 60.0 \quad (A15a)$$

$$20.0 < \theta REFL2 < 40.0 \quad (A15b)$$

These conditional formulae (A15a) and (A15b) define, within the conditional range defined by conditional formula (A15) above, further preferable conditional ranges out of the above-stated and other considerations.

It is preferable, as in the embodiments, that the entrance surface not be eccentric relative to the base ray. The rays from the object side are refracted by the entrance surface when they enter the optical prism, and thus chromatic aberration occurs in the rays. An eccentric surface also produces, as chromatic aberration, eccentric lateral chromatic aberration, which cannot be corrected for with an eccentric reflective surface, since a reflective surface produces no chromatic aberration. For this reason, it is necessary to minimize eccentric lateral chromatic aberration. Thus, to achieve high performance in the taking optical system, it is necessary that the entrance surface not be eccentric.

It is preferable that the optical prism have only three surfaces and fulfill conditional formula (A16) below.

$$0.1 < Sfront/Srear < 10.0 \quad (A16)$$

where

Sfront represents the optical distance from the entrance surface of the optical prism to the optical aperture surface along the base ray; and Srear represents the optical distance from the optical aperture surface to the exit surface of the optical prism along the base ray.

Conditional formula (A16) defines a conditional range that should preferably be fulfilled with regard to the ratio between the optical distances in front of and behind the optical aperture. To realize a high-performance optical system, it is necessary to correct for aberrations as much as possible. One way of correcting for aberrations is to cancel the aberrations occurring at the surfaces located on the object side of the optical aperture with the aberrations occurring at the surfaces located on the image side of the optical aperture. Conditional formula (A16) provides a guideline on what optical distance ratio achieves how high performance in the taking optical system employing the optical prism. Out of the conditional range defined by conditional formula (A16), either the optical distance in front of the optical aperture is too large or the optical distance behind the optical aperture is too large to satisfactorily correct for distortion and coma. This makes it impossible to achieve high performance.

It is preferable that conditional formula (A16a) below be fulfilled, and it is further preferable that conditional formula (A16b) below be fulfilled.

$$0.3 < Sfront/Srear < 5.0 \quad (A16a)$$

$$0.5 < Sfront/Srear < 3.0 \quad (A16b)$$

These conditional formulae (A16a) and (A16b) define, within the conditional range defined by conditional formula (A16) above, further preferable conditional ranges out of the above-stated and other considerations.

It is preferable that a surface of the optical prism on which a reflective surface is formed have a reflective region and a transmissive region. When a prism surface is fabricated, if it is made reflective all over, it produces stray light at the edge, and moreover it leaves no area at which to hold the optical prism. Designing a prism surface to transmit light elsewhere than in a reflective region thereof makes it possible to use only the effective area, and is thus preferable as a measure against stray light. The transmissive region also serves as where the prism is held, and designing the holding portion to cut or absorb light serves as a measure against stray light.

It is preferable that a surface of the optical prism on which a reflective surface is formed have a reflective region and an absorptive region. When a prism surface is fabricated, if it is made reflective all over, it produces stray light at the edge, and moreover it leaves no area at which to hold the optical prism. Designing a prism surface to absorb light elsewhere than in a reflective region thereof makes it possible to use only the effective area, and is thus preferable as a measure against stray light. The absorptive region also serves as where the prism is held.

It is preferable that a surface of the optical prism on which a reflective surface is formed have a reflective region and a light-shielding region. When a prism surface is fabricated, if it is made reflective all over, it produces stray light at the edge, and moreover it leaves no area at which to hold the optical prism. Designing a prism surface to shield light elsewhere than in a reflective region thereof makes it possible to use only the effective area, and is thus preferable as a measure against stray light. The light-shielding region also serves as where the prism is held.

It is preferable that the reflective region be coated with a reflective coat. Coating the reflective region with a reflective coat permits efficient reflection of light. For example, it is preferable that the reflective surface on which the optical aperture is disposed be coated with a reflective coat only within the effective diameter of the optical aperture. This makes it possible to cut light outside the effective diameter of the optical aperture, and thus makes it possible to realize an inexpensive construction without increasing the number of component.

It is preferable that the absorptive or light-shielding region be treated by blackening surface treatment. Blackening surface treatment helps prevent deformation of the surface on which that region is located. Using this surface as a holding portion or measurement reference surface helps keep high accuracy.

It is preferable that the absorptive or light-shielding region is formed by rough grinding. Roughly grinding a surface to make it scatter light makes it possible to reflect light only inside the effective diameter. Moreover, rough grinding permits the target region to be changed easily, and permits inexpensive processing.

It is preferable that the absorptive or light-shielding region be formed into a rough surface. Roughly grinding a surface to make it scatter light makes it possible to reflect light only inside the effective diameter. When a surface is fabricated by polishing or pressing, it is not finished by polishing. Pressing with a die having the relevant portion thereof formed rough permits inexpensive and easy formation of the absorptive or light-shielding region.

It is preferable that the absorptive or light-shielding region have fine pyramid-shaped light-scattering projections. Fabricating fine pyramid-shaped light-scattering projections in the absorptive or light-shielding region makes it possible to attenuate light in that region, and this serves, in particular, as a measure against stray light. If this regions is left transmissive, the light regularly or irregularly reflected on a lens barrel and the like becomes stray light. This makes it necessary to give the region a special shape, or use an additional component. By contrast, fine pyramid-shaped light-scattering projections can be formed inexpensively, for example, by pressing.

It is preferable that the absorptive or light-shielding region be formed by a chemical reaction caused by an organic solvent. It is possible to form the absorptive or light-shielding region by using an organic solvent so that a chemical reaction it causes changes the properties of the region. This can be achieved simply by applying the organic solvent to the region, or by dipping the region in the organic solvent. This permits mass production.

It is preferable that the reflective region be mirror-finished. To reflect light efficiently, it is preferable that the reflective region be mirror-finished. In particular, fine surface irregularities such as ripples lower reflection efficiency and produce stray light. To avoid this, mirror-finishing is preferable.

It is preferable that the reflective surfaces be coated with a aluminum vapor deposition coat. A coat of aluminum vapor deposition offers high reflectivity, and is easy to process. It is preferable that the reflective surfaces be coated with a aluminum reflection enhancement coat. A aluminum reflection enhancement coat can be formed to offer reflectivity higher than that of an ordinary aluminum vapor deposition coat.

To obtain higher reflectivity, it is preferable that the reflective surfaces be coated with a dielectric coat. A dielectric coat offers extremely high reflectivity. In particular, in a case where there are a plurality of reflective surfaces, it is necessary to minimize the loss of light and, in such a case, a dielectric coat is effective. It is preferable that the reflective surfaces be coated with a silver vapor deposition coat. A silver vapor deposition coat offers extremely high reflectivity. In particular, in a case where there are a plurality of reflective surfaces, it is necessary to minimize the loss of light and, in such a case, a silver vapor deposition coat is effective.

It is preferable that the reflective surfaces of the optical prism mixedly include a surface coated with a aluminum vapor deposition coat, a surface coated with a aluminum reflection enhancement coat, a surface coated with a dielectric coat, and a surface coated with silver vapor deposition coat. In a case where a single optical prism includes a plurality of reflective surfaces, coating all the reflective surfaces with an aluminum vapor deposition coat permits inexpensive fabrication, but may lead to lowered reflectivity. By contrast, coating all the reflective surfaces with an aluminum reflection enhancement coat, a silver vapor deposition coat, or a dielectric coat helps avoid lowered reflectivity, but turns out to be expensive. To achieve low cost while minimizing the lowering of reflectivity, it is preferable to use the four types of coating in a proper balance. It is possible to use only two or three of the four types.

It is preferable that, of the at least three reflective surfaces, at least one has a reflectivity of 80% or more. The reflectivity of the entire system is the multiple of the reflectivities of the individual reflective surfaces. To increase the reflectivity of the entire system, it is necessary to increase the reflectivities of the individual reflective surfaces, and the presence of a single surface with low reflectivity greatly reduces the reflectivity of the entire system. For this reason, it is preferable that at least one reflective surface has a reflectivity of 80% or more.

It is preferable that at least one of the transmissive and reflective surfaces of the optical prism is coated with a coat that absorbs light of a long-wavelength range. The wavelength-dependent imaging performance of the taking optical system is adversely affected by light in a long-wavelength range. Thus, a plane-parallel plate coated with a coat that absorbs light of a long-wavelength range is often disposed in front of the image sensor. Light in a long-wavelength range, however, can be eliminated by absorbing it with a reflective surface of the optical prism. This eliminates the need for a separate member for absorbing light in a long-wavelength range, and thus helps reduce cost.

It is preferable that the optical prism be formed of a plastic material. Using a plastic material makes it possible to build the optical prism inexpensively, and permits mass production thereof by pressing. From different perspectives, it is preferable that the optical prism be formed of a glass material. Using a glass material to form the optical prism permits selection of a material with a high refractive index, and is thus advantageous in terms of slimness and high performance.

In the embodiments, the taking optical system includes refractive lens surfaces, that is, lens surfaces that deflect the rays incident thereon by refraction (that is, lens surfaces in which light is deflected at the interface between two media having different refractive indices). Any of those lens surfaces, however, may be replaced with a lens surface of any other type, for example: a diffractive lens surface, which deflects the rays incident thereon by diffraction; or a refractive-diffractive hybrid lens surface, which deflects the rays incident thereon by the combined effect of refraction and diffraction.

In the embodiments, the taking optical system is designed to be suitable for use as a slim taking optical system in a digital device equipped with an image input capability (for example, a camera-equipped cellular phone). By combining this with an image sensor and other components, it is possible to build a taking lens device that optically captures an image of a subject and then outputs it in the form of an electrical signal. A taking lens device is an optical device used as a main component of a camera used to take a still picture or a moving picture of a subject, and is composed of, from the object (subject) side, for example, a taking optical system that forms an optical image of the object and an image sensor that converts the optical image formed by the taking optical system into an electrical signal.

Used as the image sensor is, for example, a solid-state image sensor such as a CCD (charge-coupled device) or CMOS (complementary metal oxide semiconductor) sensor having a plurality of pixels. The optical image formed by the taking optical system is converted into an electrical signal by the image sensor. The signal produced by the image sensor is subjected to predetermined digital image processing, image compression processing, and the like as required, and is recorded in a memory (such as a semiconductor memory or an optical disk) as a digital video signal; in some cases, the signal is transferred to another apparatus through a cable or after being converted into an infrared signal. Between the taking optical system and the image sensor, an optical filter (such as an optical low-pass filter or an infrared cut filter) is disposed as necessary.

Examples of such cameras include: digital cameras; video cameras; surveillance cameras; vehicle-mounted cameras; cameras for videophones; cameras for intercoms; and cameras incorporated in or externally fitted to digital devices and the like, such as personal computers, mobile computers, cellular phones, personal digital assistants, and peripheral devices for them (such as mouses, scanners, and printers). As these examples tell, it is possible not only to build cameras by the use of taking lens devices, but also to add camera capabilities to various devices by incorporating taking lens devices in them. The camera capability can be realized in a desired form. For example, the taking lens device may be built as a unit so as to be detachably or rotatably attached to the body of a camera, or may be built as a unit so as to be detachably or rotatably attached to a portable data device (such as a cellular phone or PDA).

As will be understood from what has been described hereinbefore, the embodiments described above and the numerical examples presented later include the constructions described below. With these constructions, it is possible to realize low-cost, slim, compact taking optical systems that offer satisfactory optical performance. By applying these taking optical systems to cameras, digital devices, and the like, it is possible to make them high-performance, versatile, low-cost, and compact.

(U1) A taking lens device comprising a taking optical system for forming an optical image and an image sensor for converting the optical image formed by the taking optical system into an electrical signal, the taking optical system comprising: at least one optical prism having an entrance surface, at least three reflective surfaces each curved, and an exit surface, the optical prism receiving rays from the object side through the entrance surface, then reflecting the rays on the at least three reflective surfaces, and then letting out the rays through the exit surface, wherein the optical prism is formed of a medium having a refractive index of 1.2 or more, an optical aperture is disposed on or near one of the at least three reflective surfaces, at least one of the at least three reflective surfaces is an eccentrically disposed rotation-asymmetric surface, and, let the ray traveling from the center of the object through the center of the optical aperture to the center of an image surface be called a base ray, then the intersections of the base ray with the entrance surface, each of the reflective surfaces, and the exit surface all lie approximately on the same plane.

(U2) The taking lens device described at (U1) above, wherein, as the optical prism, there is provided only one optical prism.

(U3) The taking lens device described at (U1) or (U2) above, wherein the most object-side reflective surface as counted in order of incidence of the rays from the object side has a negative optical power.

(U4) The taking lens device described at one of (U1) to (U3) above, wherein the curved surfaces are free-form curved surfaces.

(U5) The taking lens device described at one of (U1) to (U4) above, wherein the most image-surface-side reflective surface as counted in order of incidence of the rays from the object side has a negative optical power.

(U6) The taking lens device described at one of (U1) to (U5) above, wherein the optical aperture is disposed on the second reflective surface as counted in order of incidence of the rays from the object side.

(U7) The taking lens device described at one of (U1) to (U6) above, wherein at least one of conditional formulae (A1) to (A16) and the narrowed versions thereof is fulfilled.

(P1) A camera that includes the taking lens device described at one of (U1) to (U7) above and that is used to take at least either a still picture or a moving picture of a subject.

(P2) The camera described at (P1) above, wherein the camera is a digital camera, a video camera, or a camera incorporated in or externally fitted to a cellular phone, a personal digital assistant, a personal computer, a mobile computer, or a peripheral device therefor.

(D1) A digital device that includes the taking lens device described at one of (U1) to (U7) above so as to be furnished with a capability of taking at least either a still picture or a moving picture of a subject.

(D2) The digital device described at (D1) above, wherein the digital device is a cellular phone, a personal digital assistant, a personal computer, a mobile computer, or a peripheral device therefor.

Construction with Different Parts of the Base Ray Approximately Parallel

What characterizes the embodiments is the provision of at least one optical prism that has an entrance surface, at least three reflective surfaces each curved, and an exit surface, and that receives rays from the object side through the entrance surface, then reflects the rays on those at least three reflective surfaces, and then lets out the rays through the exit surface. This optical prism is formed of a medium having a refractive index of 1.2 or more (that is, an optical material, other than air, having a refractive index of 1.2 or more for the d-lines). The optical aperture is disposed on or near one of the at least three reflective surfaces. One of the at least three reflective surfaces is an eccentrically disposed rotation-asymmetric surface. Let the ray traveling from the center of the object through the center of the optical aperture to the center of the image surface be called the base ray (BL in FIG. 11), then the base ray incident on the entrance surface is approximately parallel to the base ray leaving the exit surface.

Seeking higher performance and higher definition by the use of a conventional straight-type taking optical system requires an increased number of optical elements, and this makes the taking optical system accordingly thick. An effective way to make the taking optical system slim is to bend the optical path. To bend the optical path, it is preferable to use a reflective surface in an optical prism, and, by eccentrically disposing a reflective surface of an optical prism to bend the optical path, it is possible to realize a slimmer taking optical system. Here, the concept meant by the term "eccentric" is not a construction involving only a 45-degree reflective surface as provided in a rectangular prism but one involving optically acting surfaces having varying angles. In particular, with a construction employing only a reflective surface having 45 degrees, it is difficult to make a taking optical system compact by bending the optical path. It is by the use of reflective surfaces disposed eccentrically at varying angles that a taking optical system can be made compact. Such eccentricity produces more complicated aberrations (for example, eccentric coma, eccentric astigmatism, etc.) than does a 45-degree mirror, and these aberrations are more difficult to correct for.

To seek higher definition (that is, larger image-sensing size) with the same angle of view, it is necessary to increase the focal length. Increasing the focal length, however, results in unduly large chromatic aberration in particular. Whereas a reflective surface produces no chromatic aberration, a refractive surface does. To reduce chromatic aberration, it is necessary to reduce the optical power of a refractive surface and increase the optical power of a reflective surface. Disadvantageously, an eccentrically disposed reflective surface produces aberrations alien to a straight-type optical system and peculiar to an eccentrically disposed optical surface. Aberrations peculiar to an eccentrically disposed optical surface include distortion, coma, astigmatism, etc. resulting from eccentricity.

Aberrations can be corrected for, for example, by one of the following methods. The aberrations produced by a surface having a positive optical power may be corrected for with the aberrations produced by a surface having a negative optical power. Aberrations may be designed to occur symmetrically with respect to an optical aperture so as to be canceled out. If the method of correcting for the aberrations produced by a surface having a positive optical power with the aberrations produced by a surface having a negative optical power is adopted, since a taking optical system intrinsically has a positive optical power, aberrations cannot be corrected for satisfactorily with two reflective surfaces alone. In particular, for the purpose of correcting for aberrations peculiar to an eccentric optical surface, two reflective surfaces alone produce large coma due to the positive optical power, and thus make it impossible to obtain high performance. The method of producing aberrations symmetrically with respect to an optical aperture is effective in correcting aberrations. With two reflective surfaces alone, however, aberration comparable with spherical aberration cannot be corrected for satisfactorily. That is, providing at least three reflective surfaces makes it possible to achieve high performance.

It is preferable, as in the embodiments, to use one of the reflective surfaces as an optical aperture, or to dispose an optical aperture near it, and to arrange the reflective surfaces symmetrical with respect to the optical aperture. By giving one of the reflective surfaces the function of an optical aperture, or disposing an optical aperture near it, it is possible to obtain high performance without making the taking optical system unduly large. Moreover, giving a reflective surface the function of an optical aperture helps omit components for an optical aperture, and thus helps effectively achieve low cost and slimness.

Usually, the light-receiving surface of the image sensor is arranged perpendicular to the base ray leaving the exit surface of the taking optical system. To make the taking optical system slim, it is advantageous to arrange the light-receiving surface of the image sensor inclined relative to the incident base ray. Adopting such a construction, however, results in a complicated arrangement of the image sensor during assembly. This is particularly true in an eccentric optical system employing a rotation-asymmetric surface where there is no definite axis like the optical axis of a non-eccentric, so-called coaxial, optical system employing a rotation-symmetric surface. In the taking optical system, by making the base ray incident on the entrance surface and the base ray leaving the exit surface approximately parallel to each other, it is possible to arrange the image sensor relative to the base ray. This helps avoid complicating the arrangement. Accordingly, with manufacturing taken into consideration, it is preferable, as in the embodiments, that the incident and leaving parts of the base ray are approximately parallel. It is with this construction that it is possible to realize a slim, high-performance taking optical system, and to make a taking optical system low-cost and slim while simultaneously achieving high performance that can cope with high definition and wider angles of view.

With regard to the directions of incidence and emergence of the base ray, it is preferable that conditional formula (B1) below be fulfilled (see FIG. 11).

$$|\theta ie| < 5.0 \quad (B1)$$

where $\theta ie$ represents the angle between the base ray incident on the entrance surface and the base ray leaving the exit surface.

Conditional formula (B1) defines a conditional range that should preferably be fulfilled with regard to the angle between the base ray incident on the entrance surface and the base ray leaving the exit surface in the taking optical system.

Out of the conditional range defined by conditional formula (B1), the angle is too large to permit the rays to be used as a reference, and thus makes assembly unduly complicated. Incidentally, in the embodiments, θie≈0 degrees, making the arrangement of the image sensor during assembly easy.

It is preferable that conditional formula (B1a) below be fulfilled, and it is further preferable that conditional formula (B1b) below be fulfilled.

$$|θie|<1.0 \tag{B1a}$$

$$|θie|<0.5 \tag{B1b}$$

These conditional formulae (B1a) and (B1b) define, within the conditional range defined by conditional formula (B1) above, further preferable conditional ranges out of the above-stated and other considerations.

Figure 11:
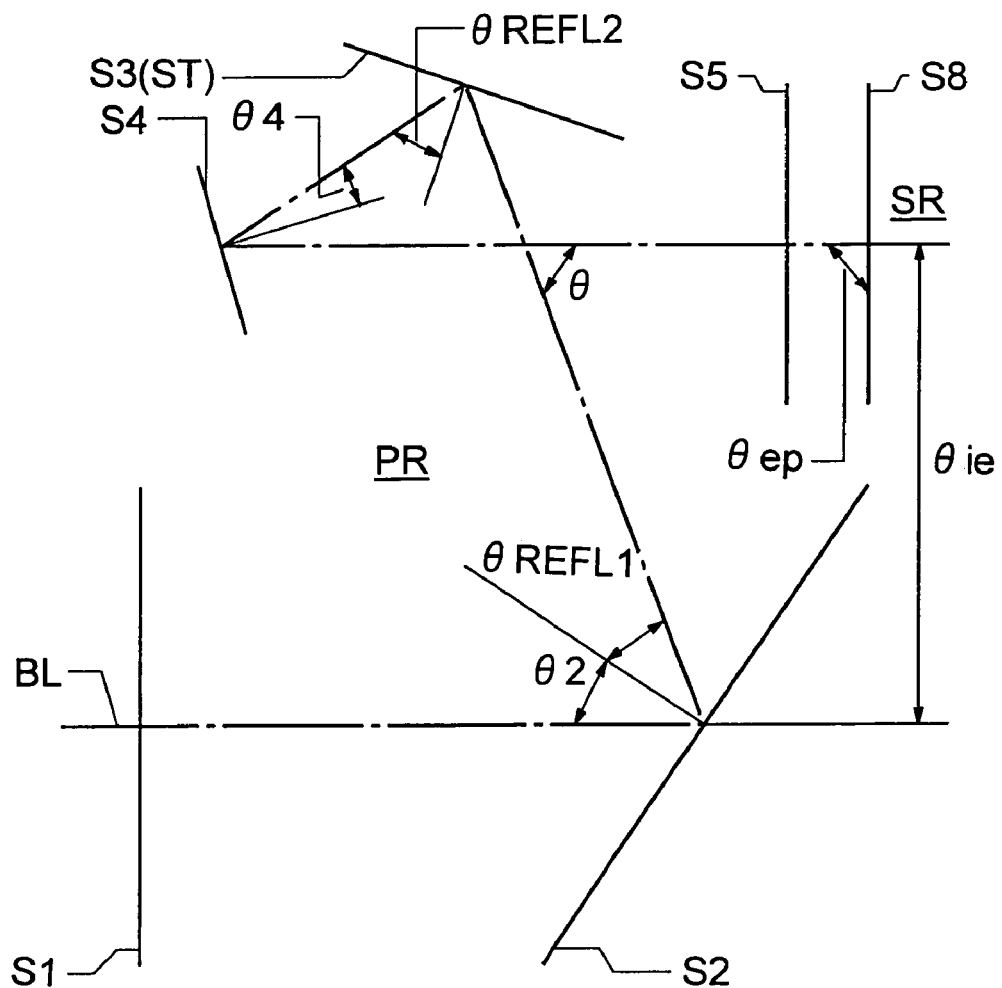

With regard to the direction of incidence of the base ray with respect to the light-receiving surface of the image sensor, it is preferable that conditional formula (B2) be fulfilled (see FIG. 11).

$$80.0<|θep|<100.0 \tag{B2}$$

where

θep represents the angle between the base ray leaving the exit surface and the light-receiving surface of the image sensor.

Conditional formula (B2) defines a conditional range that should preferably be fulfilled with regard to the angle between the base ray leaving the exit surface of the taking optical system and the light-receiving surface of the image sensor. Out of the conditional range defined by conditional formula (B2), the arrangement of the image sensor relative to the optical prism is complicated. Incidentally, in the embodiments, θep≈90 degrees, making the arrangement of the image sensor during assembly easy.

It is preferable that conditional formula (B2a) below be fulfilled, and it is further preferable that conditional formula (B2b) below be fulfilled.

$$85.0<|θep|<95.0 \tag{B2a}$$

$$87.0<|θep|<93.0 \tag{B2b}$$

These conditional formulae (B2a) and (B2b) define, within the conditional range defined by conditional formula (B2) above, further preferable conditional ranges out of the above-stated and other considerations.

It is preferable, as in the embodiments, that the taking optical system have only one optical prism. Building a taking optical system with only one optical prism gives the taking optical system the simplest construction. Advantageously, this helps greatly reduce the cost and thickness of the taking optical system. By giving the single optical prism at least three reflective surfaces, it is possible to make one reflective surface exert an optical power and make the other two correct for the aberrations resulting from eccentricity. This gives the taking optical system a high ability to correct aberrations. Moreover, disposing an optical aperture on or near a reflective surface of the single optical prism helps reduce the aberrations produced by that reflective surface even if it is given a strong optical power. Thus, this reflective surface can be made responsible for much of the optical power of the taking optical system. Moreover, giving a reflective surface an optical power produces no chromatic aberration. This helps minimize degradation in performance. Thus, with these features, it is possible, with only one optical prism, to realize a high-performance taking optical system that boasts of a high aberration correcting ability.

With regard to the optical power of the most object-side reflective surface (the first reflective surface S2 in the embodiments) as counted in order of incidence of the rays from the object side, it is preferable that conditional formula (B3) below be fulfilled.

$$0.1<|fREFL1/fall|<30.0 \tag{B3}$$

where fREFL1 represents the focal length of the most object-side reflective surface as counted in order of incidence of the rays from the object side; and fall represents the focal length of the entire system.

Conditional formula (B3) defines a conditional range that should preferably be fulfilled with regard to the optical power of the first reflective surface (that is, the most object-side reflective surface as counted in order of incidence of the rays from the object side). The first reflective surface serves to bend the light that has entered the taking optical system, and thus influences the size of the taking optical system. Moreover, since the first reflective surface is an optical surface disposed to the object side of the optical aperture, it greatly influences distortion. For these reasons, unless the first reflective surface is given a proper optical power, it is difficult to achieve slimness and high performance (in particular, well-corrected image distortion) in the taking optical system.

If the first reflective surface is given so high an optical power as to disregard the lower limit of conditional formula (B3), it produces too large distortion to be corrected for by the other surfaces. This makes it impossible to achieve high performance. If the first reflective surface is an eccentric surface, it produces too large eccentric distortion. This makes it impossible to achieve high performance. By contrast, if the upper limit of conditional formula (B3) is disregarded, the first reflective surface is responsible for too low an optical power to achieve slimness. Moreover, the first reflective surface does not satisfactorily correct for distortion, nor does it effectively cancel the aberrations produced by the other surfaces. Thus, out of the conditional range defined by conditional formula (B3), it is impossible to achieve high performance and slimness in the taking optical system.

It is preferable that conditional formula (B3a) below be fulfilled, and it is further preferable that conditional formula (B3b) below be fulfilled.

$$1.0<|fREFL1/fall|<20.0 \tag{B3a}$$

$$5.0<|fREFL1/fall|<15.0 \tag{B3b}$$

These conditional formulae (B3a) and (B3b) define, within the conditional range defined by conditional formula (B3) above, further preferable conditional ranges out of the above-stated and other considerations.

It is preferable that the most object-side reflective surface as counted in order of incidence of the rays from the object side (that is, the first reflective surface) have a negative optical power. Image distortion, like imaging performance, is an important factor in performance; that is, distortion makes it impossible to obtain an exact image. Moreover, in a case where the reflective surface is eccentric, eccentric distortion is produced. Giving the first reflective surface a negative optical power is particularly effective in correcting for negative distortion, that is, distortion in the negative direction.

With regard to the optical power of the most image-surface-side reflective surface (the third reflective surface S4 in the embodiments) as counted in order of incidence of the rays from the object side, it is preferable that conditional formula (B4) below be fulfilled.

$$0.1<|fREFL3/fall|<30.0 \qquad (B4)$$

where
fREFL3 represents the focal length of the most image-surface-side reflective surface as counted in order of incidence of the rays from the object side; and
fall represents the focal length of the entire system.

Conditional formula (B4) defines a conditional range that should preferably be fulfilled with regard to the optical power of the last reflective surface (that is, the most image-surface-side reflective surface as counted in order of incidence of the rays from the object side). The last reflective surface serves to bend the rays from the previous reflective surface so as to direct them to the exit surface, and thus it greatly influences the image surface. It particularly greatly influences astigmatism, and therefore, unless the last reflective surface is given a proper optical power, it is difficult to achieve high performance.

If the last reflective surface is given so high an optical power as to disregard the lower limit of conditional formula (B4), it produces too large astigmatism to be corrected for by the other surfaces (in particular, the exit surface). This makes it impossible to achieve high performance. If the last reflective surface is an eccentric surface, it produces too large eccentric astigmatism. This makes it impossible to achieve high performance. By contrast, if the upper limit of conditional formula (B4) is disregarded, the last reflective surface is responsible for too low an optical power to achieve slimness. Thus, out of the conditional range defined by conditional formula (B4), it is impossible to achieve high performance and slimness in the taking optical system.

It is preferable that conditional formula (B4a) below be fulfilled, and it is further preferable that conditional formula (B4b) below be fulfilled.

$$0.5<|fREFL3/fall|<20.0 \qquad (B4a)$$

$$1.0<|fREFL3/fall|<5.0 \qquad (B4b)$$

These conditional formulae (B4a) and (B4b) define, within the conditional range defined by conditional formula (B4) above, further preferable conditional ranges out of the above-stated and other considerations.

It is preferable that the most image-surface-side reflective surface as counted in order of incidence of the rays from the object side (that is, the last reflective surface) have a negative optical power. If astigmatism is present, it deteriorates imaging performance on the image surface. By giving the last reflective surface (the third reflective surface S4 in the embodiments) a negative optical power, it is usually possible to correct for the tendency of the image surface inclining in the negative direction.

With regard to the arrangement of the optical aperture, it is preferable to dispose it on the second reflective surface as counted in order of incidence of the rays from the object side (the second reflective surface S3 in the embodiments), that is, to give that reflective surface the function of an optical aperture. Disposing the optical aperture on the reflective surface permits the reflective surface to serve also as an optical aperture. This eliminates the need for separate components to build an optical aperture, and thus helps achieve cost reduction. Disposing an optical aperture on the first reflective surface makes it impossible to cancel out aberrations between reflective surfaces disposed in front of and behind the optical aperture, and thus makes it difficult to achieve high performance. Disposing at least one reflective surface in front of a reflective surface that also serves as an optical aperture makes it possible to correct for aberrations between reflective surfaces disposed in front of and behind the optical aperture, and thus makes it possible to achieve high performance.

With regard to the optical power of the optical aperture surface, it is preferable that the optical aperture is disposed on one of the at least three reflective surfaces and that conditional formula (B5) below be fulfilled.

$$0.1<|fREFL2/fall|<30.0 \qquad (B5)$$

where
fREFL2 represents the focal length of the reflective surface on which the optical aperture is disposed; and
fall represents the focal length of the entire system.

Conditional formula (B5) defines a conditional range that should preferably be fulfilled with regard to the optical power of the reflective surface that also serves as the optical aperture (the second reflective surface S3 in the embodiments). Giving an optical power to the reflective surface that also serves as the optical aperture increases flexibility in the correction of the aberrations produced by the taking optical system, and is therefore advantageous in terms of design. The optical power of this surface increases the differences in angle of incidence between upper and lower rays, and consequently influences coma. Thus, unless this reflective surface is given a proper optical power, it is impossible to realize a high-performance taking optical system.

If the reflective surface is given so high an optical power as to disregard the lower limit of conditional formula (B5), it produces too large coma to be corrected for by the other surfaces. This makes it impossible to achieve high performance. If the reflective surface is eccentric, it produces too large eccentric coma. This makes it impossible to achieve high performance. By contrast, if the reflective surface is made responsible for so low an optical power as to disregard the upper limit of conditional formula (B5), it is possible to reduce coma, but it is difficult to achieve slimness. Thus, out of the conditional range defined by conditional formula (B5), it is impossible to achieve high performance and slimness in the taking optical system.

It is preferable that conditional formula (B5a) below be fulfilled, and it is further preferable that conditional formula (B5b) below be fulfilled.

$$0.5<|fREFL2/fall|<20.0 \qquad (B5a)$$

$$1<|fREFL2/fall|<5.0 \qquad (B5b)$$

These conditional formulae (B5a) and (B5b) define, within the conditional range defined by conditional formula (B5) above, further preferable conditional ranges out of the above-stated and other considerations.

Moreover, with regard to the optical power of the optical aperture surface, it is preferable that the optical aperture be disposed on one of the at least three reflective surfaces and that the reflective surface on which the optical aperture is disposed have a positive optical power. On the optical aperture surface, the ray height is the smallest, and thus the influence of the aberrations produced by this surface is small. Thus, giving a positive optical power to the reflective surface on which the optical aperture is disposed makes it possible to reduce the optical power distributed to the other surfaces while maintaining the optical power of the entire system.

It is preferable that the optical aperture be disposed on or near the second reflective surface as counted in order of incidence of the rays from the object side (the second reflective surface S3 in the embodiments). A surface responsible for much of the optical power of the entire system has a sharp curvature, and this sharp curvature causes the reflective surface large aberrations. If the reflective surface is eccentric, it also produces large aberrations peculiar thereto. To reduce such aberrations, it is preferable to dispose such a sharp-curvature surface near the optical aperture. This helps reduce the ray height and thereby reduce the aberrations produced even with a strong optical power. The second reflective surface produces, in particular, large coma. In particular, if eccentric coma occurs, it greatly degrades imaging performance, and is difficult to correct for with the other surfaces. Thus, to reduce coma while giving the second reflective surface a sharp curvature, it is preferable, for high performance, that the optical aperture be disposed on or near the second reflective surface.

With regard to the entrance surface (the first surface S1 in the embodiments), it is preferable that conditional formula (B6) be fulfilled.

$$0.1 < |fREFR1/fall| < 30.0 \tag{B6}$$

where
fREFR1 represents the focal length of the entrance surface; and
fall represents the focal length of the entire system.

Conditional formula (B6) defines a conditional range that should preferably be fulfilled with regard to the optical power of the entrance surface. A refractive surface, unlike a reflective surface, produces, in particular, chromatic aberration. If a refractive surface is used as the entrance surface, it greatly influences lateral chromatic aberration. If lateral chromatic aberration occurs, color bleeding or the like occurs on the image surface; that is, different wavelengths are imaged at different positions, and this makes it impossible to obtain a clean image. Moreover, since the entrance surface is located farthest from the optical aperture on the object side thereof, and thus it also influences distortion. If distortion occurs, it deforms the image. By giving the entrance surface a proper optical power, it is possible to realize a taking optical system in which lateral chromatic aberration and distortion are satisfactorily corrected for.

If the entrance surface is given so high an optical power as to disregard the lower limit of conditional formula (B6), the reflective surface produces too large lateral chromatic aberration to be properly corrected for by the exit surface (the last prism surface S5 in the embodiments). This makes it impossible to obtain high performance. Moreover, distortion is overcorrected, and this deforms the image obtained. By contrast, if the upper limit of conditional formula (B6) is disregarded, the entrance surface has too low an optical power to properly refract rays. This makes the taking optical system as a whole too large to be made slim. Thus, out of the conditional range defined by conditional formula (B6), it is impossible to achieve high performance and slimness in the taking optical system.

It is preferable that conditional formula (B6a) below be fulfilled, and it is further preferable that conditional formula (B6b) below be fulfilled.

$$0.5 < |fREFR1/fall| < 20.0 \tag{B6a}$$

$$1.0 < |fREFR1/fall| < 5.0 \tag{B6b}$$

These conditional formulae (B6a) and (B6b) define, within the conditional range defined by conditional formula (B6) above, further preferable conditional ranges out of the above-stated and other considerations.

It is preferable that the entrance surface (the first surface S1 in the embodiments) have a positive optical power. This permits the entrance surface to make rays converge, and is therefore advantageous for making the taking optical system slim. It is advantageous also in terms of the optical power through the entire system, because it helps reduce the optical power distributed to the reflective surfaces. Thus, it is possible to reduce the eccentric astigmatism, eccentric coma, eccentric distortion, etc. produced by an eccentric reflective surface, and thereby to achieve high performance. It should be noted that, in the numerical examples presented later, the reference curvature of the first surface S1 has a negative value, but the free-form curved surface coefficients are given assuming that the first surface S1 has a positive optical power.

In the embodiments, the first to fifth surfaces S1 to S5 are free-form curved surfaces. In this way, in an optical prism having a plurality of reflective surfaces, it is preferable to use, as its prism surfaces, free-form curved surfaces, and it is further preferable that the curved surfaces that form the reflective surfaces of the optical prism be free-form curved surfaces. An eccentric curved surface produces aberrations peculiar to eccentricity, for example eccentric distortion, eccentric coma, and eccentric astigmatism. These aberrations can be corrected for only with a surface that has an asymmetric curvature with respect to the direction of eccentricity of the eccentric curved surface. Moreover, by setting different curvatures (including the sign thereof) in the direction of eccentricity and in the direction perpendicular thereto, it is possible to correct for aberrations attributable to eccentricity.

Let the most object-side reflective surface as counted in order of incidence of the rays from the object side be called the first reflective surface (the second surface S2 in the embodiments), then it is preferable that the first reflective surface have a negative optical power and fulfill conditional formula (B7) below.

$$0.05 < |\phi REFL1y/\phi REFL1x| < 20.0 \tag{B7}$$

where
$\phi REFL1x$ represents the optical power that the first reflective surface has in the horizontal direction at the intersection thereof with the base ray; and
$\phi REFL1y$ represents the optical power that the first reflective surface has in the vertical direction at the intersection thereof with the base ray.

Conditional formula (B7) defines a conditional range that should preferably be fulfilled with regard to the power anamorphic ratio (the ratio between the optical powers in the x- and y-directions) of the first reflective surface. In a taking optical system including eccentric optically acting surfaces, the optically acting surfaces often have different optical powers between in two directions (for example, the x- and y-directions). Even then, it is preferable that the optical power through the entire system be approximately equal between in the two directions. This helps properly locate imaging points on the image surface, and helps make the magnification equal in the different directions. However, since the individual optically acting surfaces are eccentric, they exert different aberration-correcting effects. The first reflective surface is more eccentric in the y-direction than in x-direction, and thus produces larger eccentric astigmatism and eccentric distortion in the y-direction. However, if the optical powers are set with attention paid only to the eccentric aberrations in the y-direction, the optical power through the entire system becomes anamorphic, which is undesirable for the taking optical system as a whole. Thus, it is preferable to properly set the relationship between the optical powers in the x- and y-directions. This makes it possible, while correcting for eccentric astigmatism and eccentric distortion, to prevent the optical power of the entire system from becoming anamorphic.

If the lower limit of conditional formula (B7) is disregarded, the optical powers in the x- and y-directions differ so much as to result in undercorrection of eccentric astigmatism and eccentric distortion. By contrast, disregarding the upper limit of the conditional formula (B7) results in overcorrection. Moreover, out of the conditional range defined by conditional formula (B7), the optical powers of the entire system between in the horizontal (x-) and vertical (y-) directions differ so much as to be anamorphic. This makes it impossible to build the taking optical system. Thus, out of the conditional range defined by conditional formula (B7), it is impossible to achieve high performance in the taking optical system, and it is thus impossible to realize the taking optical system as a whole.

It is preferable that conditional formula (B7a) below be fulfilled, and it is further preferable that conditional formula (B7b) below be fulfilled.

$$0.1 < |\phi REFL1y/\phi REFL1x| < 10.0 \quad (B7a)$$

$$0.5 < |\phi REFL1y/\phi REFL1x| < 5.0 \quad (B7b)$$

These conditional formulae (B7a) and (B7b) define, within the conditional range defined by conditional formula (B7) above, further preferable conditional ranges out of the above-stated and other considerations.

Let the second reflective surface as counted in order of incidence of the rays from the object side be called the second reflective surface (the third surface S3 in the embodiments), then it is preferable that the second reflective surface have a positive optical power and fulfill conditional formula (B8) below.

$$0.05 < |\phi REFL2y/\phi REFL2x| < 20.0 \quad (B8)$$

where
$\phi REFL2x$ represents the optical power that the second reflective surface has in the horizontal direction at an intersection thereof with the base ray; and
$\phi REFL2y$ represents the optical power that the second reflective surface has in the vertical direction at the intersection thereof with the base ray.

Conditional formula (B8) defines a conditional range that should preferably be fulfilled with regard to the power anamorphic ratio (the ratio between the optical powers in the x- and y-directions) of the second reflective surface. The second reflective surface produces large eccentric coma in the y-direction. On the other hand, if the optical powers are defined with attention paid only to the eccentric aberrations in the y-direction, the optical power through the entire system becomes anamorphic, giving an undesirable optical power to the taking optical system as a whole. Thus, it is preferable to properly set the relationship between the optical powers in the x- and y-directions. This makes it possible, while correcting for eccentric astigmatism, to prevent the optical power of the entire system from becoming anamorphic.

If the lower limit of conditional formula (B8) is disregarded, the optical powers in the x- and y-directions differ so much as to result in undercorrection of coma. By contrast, disregarding the upper limit of the conditional formula (B8) results in overcorrection. Moreover, out of the conditional range defined by conditional formula (B8), the optical powers of the entire system between in the horizontal (x-) and vertical (y-) directions differ so much as to be anamorphic. This makes it impossible to build the taking optical system. Thus, out of the conditional range defined by conditional formula (B8), it is impossible to achieve high performance in the taking optical system, and it is thus impossible to realize the taking optical system as a whole.

It is preferable that conditional formula (B8a) below be fulfilled, and it is further preferable that conditional formula (B8b) below be fulfilled.

$$0.1 < |\phi REFL2y/\phi REFL2x| < 10.0 \quad (B8a)$$

$$0.1 < |\phi REFL2y/\phi REFL2x| < 3.0 \quad (B8b)$$

These conditional formulae (B8a) and (B8b) define, within the conditional range defined by conditional formula (B8) above, further preferable conditional ranges out of the above-stated and other considerations.

Let the third reflective surface as counted in order of incidence of the rays from the object side be called the third reflective surface (the fourth surface S4 in the embodiments), then it is preferable that the third reflective surface have a negative optical power and fulfill conditional formula (B9) below.

$$0.05 < |\phi REFL3y/\phi REFL3x| < 20.0 \quad (B9)$$

where
$\phi REFL3x$ represents the optical power that the third reflective surface has in the horizontal direction at an intersection thereof with the base ray; and
$\phi REFL3y$ represents the optical power that the third reflective surface has in the vertical direction at the intersection thereof with the base ray.

Conditional formula (B9) defines a conditional range that should preferably be fulfilled with regard to the power anamorphic ratio (the ratio between the optical powers in the x- and y-directions) of the third reflective surface. The third reflective surface produces large eccentric astigmatism in the y-direction. On the other hand, if the optical powers are defined with attention paid only to the eccentric aberrations in the y-direction, the optical power through the entire system becomes anamorphic, giving an undesirable optical power to the taking optical system as a whole. Thus, it is preferable to properly set the relationship between the optical powers in the x- and y-directions. This makes it possible, while correcting for eccentric astigmatism, to prevent the optical power of the entire system from becoming anamorphic.

If the lower limit of conditional formula (B9) is disregarded, the optical powers in the x- and y-directions differ so much as to result in undercorrection of eccentric astigmatism. By contrast, disregarding the upper limit of the conditional formula (B9) results in overcorrection. Moreover, out of the conditional range defined by conditional formula (B9), the optical powers of the entire system between in the horizontal (x-) and vertical (y-) directions differ so much as to be anamorphic. This makes it impossible to build the taking optical system. Thus, out of the conditional range defined by conditional formula (B9), it is impossible to achieve high performance in the taking optical system, and it is thus impossible to realize the taking optical system as a whole.

It is preferable that conditional formula (B9a) below be fulfilled, and it is further preferable that conditional formula (B9b) below be fulfilled.

$$0.1 < |\phi REFL3y/\phi REFL3x| < 10.0 \quad (B9a)$$

$$0.5 < |\phi REFL3y/\phi REFL3x| < 5.0 \quad (B9b)$$

These conditional formulae (B9a) and (B9b) define, within the conditional range defined by conditional formula (B9)

above, further preferable conditional ranges out of the above-stated and other considerations.

It is preferable that the entrance surface (the first surface S1 in the embodiments) have a positive optical power and fulfills conditional formula (B10) below.

$$0.05 < |\phi REFR1y/\phi REFR1x| < 20.0 \quad (B10)$$

where
- $\phi REFR1x$ represents the optical power that the entrance surface has in the horizontal direction at the intersection thereof with the base ray; and
- $\phi REFR1y$ represents the optical power that the entrance surface has in the vertical direction at the intersection thereof with the base ray.

Conditional formula (B10) defines a conditional range that should preferably be fulfilled with regard to the power anamorphic ratio (the ratio between the optical powers in the x- and y-directions) of the entrance surface (the first surface S1), which is a transmissive surface. The entrance surface produces distortion and lateral chromatic aberration. In particular, the distortion here relates to the correction by the optically acting surfaces disposed behind. In particular, in the y-direction, eccentricity produces eccentric distortion, and, to achieve a proper balance therewith, it is necessary to set proper optical powers. However, if the optical powers are defined with attention paid only to the distortion in the y-direction, the optical power through the entire system becomes anamorphic, giving an undesirable optical power to the taking optical system as a whole. Thus, it is preferable to properly set the relationship between the optical powers in the x- and y-directions. This makes it possible, while correcting for eccentric distortion, to prevent the optical power of the entire system from becoming anamorphic.

If the lower limit of conditional formula (B10) is disregarded, the optical powers in the x- and y-directions differ so much as to result in undercorrection of eccentric distortion. By contrast, disregarding the upper limit of the conditional formula (B10) results in overcorrection. Moreover, out of the conditional range defined by conditional formula (B10), the optical powers of the entire system between in the horizontal (x-) and vertical (y-) directions differ so much as to be anamorphic. This makes it impossible to build the taking optical system. Thus, out of the conditional range defined by conditional formula (B10), a deformed image is produced, and moreover it is impossible to realize the taking optical system as a whole.

It is preferable that conditional formula (B10a) below be fulfilled, and it is further preferable that conditional formula (B10b) below be fulfilled.

$$0.1 < |\phi REFR1y/\phi REFR1x| < 10.0 \quad (B10a)$$

$$0.5 < |\phi REFR1y/\phi REFR1x| < 5.0 \quad (B10b)$$

These conditional formulae (B10a) and (B10b) define, within the conditional range defined by conditional formula (B10) above, further preferable conditional ranges out of the above-stated and other considerations.

It is preferable that conditional formula (B11) below be fulfilled.

$$0.5 < NAy(+)/NAy(-) < 1.5 \quad (B11)$$

where
- $NAy(+)$ represents the numerical aperture (NA) on the positive side in the vertical direction (y-direction) at the center of the image surface; and
- $NAy(-)$ represents the numerical aperture (NA) on the negative side in the vertical direction (y-direction) at the center of the image surface.

Conditional formula (B11) defines a conditional range that should preferably be fulfilled with regard to the ratio of brightness in the y-direction on the image surface. An optical system including an eccentric curved surface is asymmetric with respect to the direction of eccentricity. In an optical system eccentric in the vertical direction, how rays converge on the image surface is asymmetric between in the positive and negative directions. As this asymmetry increases, the brightness of the image becomes uneven, making it impossible to obtain a clean image. Thus, by defining the ratio of brightness between those two directions, it is possible to form a clean image. Out of the conditional range defined by conditional formula (B11), the unevenness of brightness is so great that it is impossible to form a clean image.

It is preferable that conditional formula (B11a) below be fulfilled, and it is further preferable that conditional formula (B11b) below be fulfilled.

$$0.7 < NAy(+)/NAy(-) < 1.3 \quad (B11a)$$

$$0.8 < NAy(+)/NAy(-) < 1.2 \quad (B11b)$$

These conditional formulae (B11a) and (B11b) define, within the conditional range defined by conditional formula (B11) above, further preferable conditional ranges out of the above-stated and other considerations.

It is preferable that conditional formula (B12) below be fulfilled.

$$0.5 < NAx/NAy < 1.8 \quad (B12)$$

where
- $NAx$ represents the average of the numerical apertures on the positive and negative sides in the horizontal (x-) direction at the center of the image surface; and
- $NAy$ represents the average of the numerical apertures on the positive and negative sides in the vertical (y-) direction at the center of the image surface.

Conditional formula (B12) defines a conditional range that should preferably be fulfilled with regard to the ratio of brightness between in the x- and y-directions on the image surface. In an eccentric optical system, rays have different brightness between in the horizontal and vertical directions. As this difference increases, the brightness of the image becomes uneven, leading to degraded image quality. Thus, by defining the ratio of brightness between those directions, it is possible to form a clean image. Out of the conditional range defined by conditional formula (B12), the unevenness of brightness is so conspicuous that it is impossible to obtain an acceptable image.

It is further preferable that conditional formula (B12a) below be fulfilled.

$$0.7 < NAx/NAy < 1.5 \quad (B12a)$$

This conditional formula and (B12a) defines, within the conditional range defined by conditional formula (B12) above, a further preferable conditional range out of the above-stated and other considerations.

It is preferable that the reflective surfaces include a reflective surface that does not totally reflect, and it is further preferable that the reflective surfaces include no reflective surface that totally reflects. The embodiments all include a reflective surface that does not totally reflect. Designing a reflective surface to totally reflect light is advantageous in terms of cost, because doing so eliminates the need to lay a reflective coat for that reflective surface. However, for a reflective surface to totally reflect light, the light needs to be shone on it at a large angle of incidence. The larger the angle of incidence, the larger the aberrations produced. To correct these aberrations, an additional optical surface becomes necessary. This is rather disadvantageous in terms of cost. Thus, to realize a high-performance taking optical system at low cost, it is necessary to use a reflective surface that is not a total-reflection surface that requires a large angle of incidence.

It is preferable that the surfaces forming the optical prism include no surface that both transmits and reflects (for example a TIR—total internal reflection—surface). The embodiments all include no surface that both transmits and reflects. To make a surface both transmit and reflect, it is necessary, for example, to use a louver optical element or to exploit the total reflection effect. Using a louver optical element or the like leads to higher cost and reduces the overall amount of light. Exploiting the total reflection effect leads to higher cost as described above and makes it difficult to achieve high performance. Thus, to achieve high performance and low cost, it is necessary not to use a surface that both transmits and reflects.

Let the second reflective surface as counted in order of incidence of the rays from the object side be called the second reflective surface (the third surface S3 in the embodiments), and let the third reflective surface as counted in order of incidence of the rays from the object side be called the third reflective surface (the fourth surface S4 in the embodiments), then it is preferable, as in the embodiments, that the rays incident on the second reflective surface cross the rays leaving the third reflective surface. For example, it is preferable, as in the embodiments, that the base ray BL incident on the second reflective surface crosses the base ray BL leaving the third reflective surface (see FIG. 11).

An effective way to make the taking optical system slim is to bend the optical path and, in addition, make the rays incident on the second reflective surface and the rays leaving the third reflective surface cross each other somewhere along their path. Making the rays cross each other somewhere on the object side of the taking optical system leads to a large beam diameter, and thus makes the taking optical system rather large, disadvantageously in terms of slimness. Thus, a further effective way to make the taking optical system slim is to make the rays cross each other on a reflective surface close to the image side.

It is preferable that the angle at which the base ray crosses itself fulfill conditional formula (B13) below (see FIG. 11).

$$30 < \theta < 80 \tag{B13}$$

where $\theta$ represents the smaller angle (degrees) at which the base ray crosses itself.

As described above, by bending rays and making them cross themselves, it is possible to make the taking optical system slim. However, making the rays cross themselves perpendicularly requires a wide space, and is therefore disadvantageous in terms of slimness. To make the taking optical system slim, it is necessary to design the reflective surfaces such that the angle at which the base ray crosses itself fulfills conditional formula (B13). By properly setting this crossing angle, it is possible to realize a slim taking optical system that offers high performance.

If the upper limit of conditional formula (B13) is disregarded, the reflective surfaces that permit the base ray to cross itself need to be arranged at right angles. This makes the taking optical system unduly large. By contrast, disregarding the lower limit of conditional formula (B13) is advantageous in terms of slimness, but results in so large an angle of incidence with respect to the reflective surface as to produce large aberration. This makes it difficult to achieve high performance in the taking optical system. Moreover, for the correction of aberrations, an additional optical surface becomes necessary, making the taking optical system larger.

It is preferable, as in the embodiments, that the optical prism have only three reflective surfaces. To make the optical prism slim inexpensively and efficiently, it is advantageous to give it as few reflective surfaces as possible. However, too few reflective surfaces require a strong optical power to be distributed to each surface. This causes each surface to produce large aberrations, and thus makes it impossible to achieve high performance. Increasing the number of reflective surfaces is advantageous in terms of performance, but leads to higher cost and a larger size. By providing three reflective surfaces and using them as main elements, it is possible to achieve slimness while maintaining high performance.

In a case where, as in the embodiments, the optical prism has only three reflective surfaces, let the first reflective surface as counted in order of incidence of the rays from the object side be called the first reflective surface (the second surface S2 in the embodiments), and let the third reflective surface as counted in order of incidence of the rays from the object side be called the third reflective surface (the fourth surface S4 in the embodiments), it is preferable that conditional formula (B14) below be fulfilled (see FIG. 11).

$$0.1 < \theta2/\theta4 < 10.0 \tag{B14}$$

where $\theta2$ represents the angle (degrees) between the base ray and the normal to the first reflective surface at the intersection therebetween; and $\theta4$ represents the angle (degrees) between the base ray and the normal to the third reflective surface at the intersection therebetween.

Conditional formula (B14) defines a conditional range that should preferably be fulfilled with regard to the relative angle between the first and third reflective surfaces. In a case where there are provided only three prism surfaces, the first reflective surface reflects the rays that have just passed through the entrance surface (the first surface S1), and the third reflective surface reflects the rays toward the exit surface (the fifth surface S5). These optical surfaces are disposed in positions eccentric relative to each other, and their being so arranged provides an effect of canceling the aberrations resulting from eccentricity (in particular, eccentric distortion and eccentric coma) between themselves. Setting a proper angular relationship to fulfill conditional formula (B14) makes it possible to realize a taking optical system in which eccentric distortion and eccentric coma are satisfactorily corrected. Out of the conditional range defined by conditional formula (B14), eccentric distortion is large, and so is coma resulting from eccentricity.

It is preferable that conditional formula (B14a) below be fulfilled, and it is further preferable that conditional formula (B14b) below be fulfilled.

$$0.5 < \theta2/\theta4 < 5.0 \tag{B14a}$$

$$1.0 < \theta2/\theta4 < 3.0 \tag{B14b}$$

These conditional formulae (B14a) and (B14b) define, within the conditional range defined by conditional formula (B14)

above, further preferable conditional ranges out of the above-stated and other considerations.

It is preferable that conditional formula (B15) below be fulfilled.

$$Tall/fall<2.0 \tag{B15}$$

where
- Tall represents the thickness from the entrance surface to the light-receiving surface of the image sensor (for example, the distance from the intersection between the entrance surface and the base ray to the image-sensing surface); and
- fall represents the focal length of the entire system (the average of the focal lengths in the horizontal and vertical directions).

Conditional formula (B15) indicates the degree of slimness brought by the bending effect as observed in the focal length. The degree of slimness achieved in the taking optical system is evaluated in terms of the focal length thereof. The longer the focal length, the larger the total length. Thus, it is impossible, simply by evaluating the thickness, to evaluate the degree of slimness achieved; it should better be evaluated in terms of the ratio between the thickness and the focal length. If the upper limit of conditional formula (B15) is disregarded, the bending effect is too small to make the taking optical system satisfactorily slim.

It is preferable that conditional formula (B15a) below be fulfilled, and it is further preferable that conditional formula (B15b) below be fulfilled.

$$Tall/fall<1.5 \tag{B15a}$$

$$Tall/fall<1.0 \tag{B15b}$$

These conditional formulae (B15a) and (B15b) define, within the conditional range defined by conditional formula (B15) above, further preferable conditional ranges out of the above-stated and other considerations.

It is preferable, as in the embodiments, that the optical prism have an odd number of reflective surfaces. In a case where the optical aperture is disposed on or near a reflective surface, disposing other reflective surfaces symmetrically with respect to that reflective surface permits the coma, distortion, etc. produced by the other reflective surfaces to be canceled out. This makes it possible to achieve high performance in the taking optical system. For this purpose, it is preferable that there be provided an odd number of reflective surfaces. Incidentally, reflecting an image an odd number of times produces a mirror image of the original. The mirror image can easily be reversed wherever an image sensor is used.

In a case where the optical prism has only three reflective surfaces, let the most object-side reflective surface as counted in order of incidence of the rays from the object side be called the first reflective surface (the second surface S2 in the embodiments), then it is preferable that the first reflective surface have a negative optical power and fulfills conditional formula (B16) below (see FIG. 11).

$$5.0<\theta REFL1<70.0 \tag{B16}$$

where
- $\theta REFL1$ represents the angle (degrees) of reflection at which the base ray is reflected on the first reflective surface.

Conditional formula (B16) defines a conditional range that should preferably be fulfilled with regard to the angle of reflection on the first reflective surface. The first reflective surface plays an important role in greatly bending the direction of the incident rays and thereby producing an effect of folding the optical path. To increase the folding effect, it is preferable to bend the optical path as close to perpendicularly as possible. This, however, produces large eccentric distortion and eccentric astigmatism, and makes it impossible to improve imaging performance. Thus, it is difficult to achieve high performance. On the other hand, too small a bending angle makes it impossible to make the taking optical system slim. To achieve slimness while realizing high imaging performance, it is preferable to set the angle of reflection on the first reflective surface to fulfill conditional formula (B16).

If the angle of reflection is so small as to disregard the lower limit of the conditional formula (B16), the optical path up to the next reflective surface is too short for making the taking optical system slim, and thus diminishes the folding effect. By contrast, if the angle of reflection is so large as to disregard the upper limit of the conditional formula (B16), the first reflective surface produces so large eccentric aberrations as to make it difficult to correct for, in particular, the eccentric distortion and eccentric astigmatism. This makes it impossible to achieve high performance.

It is preferable that conditional formula (B16a) below be fulfilled, and it is further preferable that conditional formula (B16b) below be fulfilled.

$$10.0<\theta REFL1<60.0 \tag{B16a}$$

$$20.0<\theta REFL1<40.0 \tag{B16b}$$

These conditional formulae (B16a) and (B16b) define, within the conditional range defined by conditional formula (B16) above, further preferable conditional ranges out of the above-stated and other considerations.

In a case where the optical prism has only three reflective surfaces, let the second reflective surface as counted in order of incidence of the rays from the object side be called the second reflective surface (the third surface S3 in the embodiments), then it is preferable, as in the embodiments, that the optical aperture be disposed on the second reflective surface, and that no part of the base ray is approximately parallel to the base ray incident on the second reflective surface.

In a case where the optical prism is composed of three reflective surfaces, and the second reflective surface serves also as the optical aperture, it is effective for slimness to set the angle of the base ray from the first reflective surface to the second reflective surface close to perpendicular to the base ray incident on the entrance surface from the object side. By lengthening the optical path in the direction of this base ray, it is possible to realize a slim taking optical system while securing a satisfactory focal length. However, adding further rays in that direction with a view to lengthening the optical path eventually requires that reflective surfaces be disposed parallel to each other, and thus make it difficult to make the taking optical system slim. Thus, to make the taking optical system slim, it is necessary that only one bunch of rays be approximately parallel to the rays incident on the second reflective surface.

In a case where the optical prism has only three reflective surfaces, let the second reflective surface as counted in order of incidence of the rays from the object side be called the second reflective surface (the third surface S3 in the embodiments), then it is preferable, as in the embodiments, that the optical aperture be disposed on the second reflective surface, and that no part of the base ray be approximately parallel to the base ray leaving the second reflective surface.

In a case where the optical prism is composed of three reflective surfaces, and the second reflective surface serves also as the optical aperture, the base ray leaving the second reflective surface has an angle close to 45 degrees relative to the base ray incident on the entrance surface from the object side. Lengthening the optical path of those rays is naturally disadvantageous in terms of slimness. Thus, having more than one part of the base ray running approximately parallel to those rays is disadvantageous in terms of slimness.

In a case where the optical prism has only three reflective surfaces, let the second reflective surface as counted in order of incidence of the rays from the object side be called the second reflective surface, then it is preferable that conditional formula (B17) below be fulfilled (see FIG. 11).

$$5.0 < \theta REFL2 < 70.0 \tag{B17}$$

where

θREFL2 represents the angle (degrees) of reflection at which the base ray is reflected on the second reflective surface.

Conditional formula (B17) defines a conditional range that should preferably be fulfilled with regard to the angle of reflection on the second reflective surface located at or near the optical aperture surface. The second reflective surface is responsible for much of the optical power of the entire system. A large angle of reflection here contributes to the taking optical system exerting a folding effect, and thus makes it possible to achieve further slimness. However, a large angle of reflection produces large aberrations. In particular, this surface produces so large eccentric distortion and eccentric astigmatism, and therefore a large angle of reflection here degrades imaging performance and makes it impossible to achieve high performance in the taking optical system. Setting the angle of reflection on the second reflective surface to fulfill conditional formula (B17) makes it possible to realize a slim taking optical system that offers high performance.

If the angle of reflection is so large as to disregard the upper limit of the conditional formula (B17), the eccentric distortion and eccentric astigmatism produced are too large to be corrected for by the other optical surfaces. By contrast, if the angle of reflection is so small as to disregard the lower limit of the conditional formula (B17), the first and third reflective surfaces are so close to each other that it is necessary to secure a space accordingly. This makes it impossible to make the taking optical system slim.

It is preferable that conditional formula (B17a) below be fulfilled, and it is further preferable that conditional formula (B17b) below be fulfilled.

$$10.0 < \theta REFL2 < 60.0 \tag{B17a}$$

$$20.0 < \theta REFL2 < 40.0 \tag{B17b}$$

These conditional formulae (B17a) and (B17b) define, within the conditional range defined by conditional formula (B17) above, further preferable conditional ranges out of the above-stated and other considerations.

It is preferable, as in the embodiments, that the entrance surface not be eccentric relative to the base ray. The rays from the object side are refracted by the entrance surface when they enter the optical prism, and thus chromatic aberration occurs in the rays. An eccentric surface also produces, as chromatic aberration, eccentric lateral chromatic aberration, which cannot be corrected for with an eccentric reflective surface, since a reflective surface produces no chromatic aberration. For this reason, it is necessary to minimize eccentric lateral chromatic aberration. Thus, to achieve high performance in the taking optical system, it is necessary that the entrance surface not be eccentric.

It is preferable that the optical prism have only three surfaces and fulfill conditional formula (B18) below.

$$0.1 < Sfront/Srear < 10.0 \tag{B18}$$

where

Sfront represents the optical distance from the entrance surface of the optical prism to the optical aperture surface along the base ray; and Srear represents the optical distance from the optical aperture surface to the exit surface of the optical prism along the base ray.

Conditional formula (B18) defines a conditional range that should preferably be fulfilled with regard to the ratio between the optical distances in front of and behind the optical aperture. To realize a high-performance optical system, it is necessary to correct for aberrations as much as possible. One way of correcting for aberrations is to cancel the aberrations occurring at the surfaces located on the object side of the optical aperture with the aberrations occurring at the surfaces located on the image side of the optical aperture. Conditional formula (B18) provides a guideline on what optical distance ratio achieves how high performance in the taking optical system employing the optical prism. Out of the conditional range defined by conditional formula (B18), either the optical distance in front of the optical aperture is too large or the optical distance behind the optical aperture is too large to satisfactorily correct for distortion and coma. This makes it impossible to achieve high performance.

It is preferable that conditional formula (B18a) below be fulfilled, and it is further preferable that conditional formula (B18b) below be fulfilled.

$$0.3 < Sfront/Srear < 5.0 \tag{B18a}$$

$$0.5 < Sfront/Srear < 3.0 \tag{B18b}$$

These conditional formulae (B18a) and (B18b) define, within the conditional range defined by conditional formula (B18) above, further preferable conditional ranges out of the above-stated and other considerations.

It is preferable that a surface of the optical prism on which a reflective surface is formed have a reflective region and a transmissive region. When a prism surface is fabricated, if it is made reflective all over, it produces stray light at the edge, and moreover it leaves no area at which to hold the optical prism. Designing a prism surface to transmit light elsewhere than in a reflective region thereof makes it possible to use only the effective area, and is thus preferable as a measure against stray light. The transmissive region also serves as where the prism is held, and designing the holding portion to cut or absorb light serves as a measure against stray light.

It is preferable that a surface of the optical prism on which a reflective surface is formed have a reflective region and an absorptive region. When a prism surface is fabricated, if it is made reflective all over, it produces stray light at the edge, and moreover it leaves no area at which to hold the optical prism. Designing a prism surface to absorb light elsewhere than in a reflective region thereof makes it possible to use only the effective area, and is thus preferable as a measure against stray light. The absorptive region also serves as where the prism is held.

It is preferable that a surface of the optical prism on which a reflective surface is formed have a reflective region and a light-shielding region. When a prism surface is fabricated, if it is made reflective all over, it produces stray light at the edge, and moreover it leaves no area at which to hold the optical prism. Designing a prism surface to shield light elsewhere than in a reflective region thereof makes it possible to use only the effective area, and is thus preferable as a measure against stray light. The light-shielding region also serves as where the prism is held.

It is preferable that the reflective region be coated with a reflective coat. Coating the reflective region with a reflective coat permits efficient reflection of light. For example, it is preferable that the reflective surface on which the optical aperture is disposed be coated with a reflective coat only within the effective diameter of the optical aperture. This makes it possible to cut light outside the effective diameter of the optical aperture, and thus makes it possible to realize an inexpensive construction without increasing the number of component.

It is preferable that the absorptive or light-shielding region be treated by blackening surface treatment. Blackening surface treatment helps prevent deformation of the surface on which that region is located. Using this surface as a holding portion or measurement reference surface helps keep high accuracy.

It is preferable that the absorptive or light-shielding region is formed by rough grinding. Roughly grinding a surface to make it scatter light makes it possible to reflect light only inside the effective diameter. Moreover, rough grinding permits the target region to be changed easily, and permits inexpensive processing.

It is preferable that the absorptive or light-shielding region be formed into a rough surface. Roughly grinding a surface to make it scatter light makes it possible to reflect light only inside the effective diameter. When a surface is fabricated by polishing or pressing, it is not finished by polishing. Pressing with a die having the relevant portion thereof formed rough permits inexpensive and easy formation of the absorptive or light-shielding region.

It is preferable that the absorptive or light-shielding region have fine pyramid-shaped light-scattering projections. Fabricating fine pyramid-shaped light-scattering projections in the absorptive or light-shielding region makes it possible to attenuate light in that region, and this serves, in particular, as a measure against stray light. If this regions is left transmissive, the light regularly or irregularly reflected on a lens barrel and the like becomes stray light. This makes it necessary to give the region a special shape, or use an additional component. By contrast, fine pyramid-shaped light-scattering projections can be formed inexpensively, for example, by pressing.

It is preferable that the absorptive or light-shielding region be formed by a chemical reaction caused by an organic solvent. It is possible to form the absorptive or light-shielding region by using an organic solvent so that a chemical reaction it causes changes the properties of the region. This can be achieved simply by applying the organic solvent to the region, or by dipping the region in the organic solvent. This permits mass production.

It is preferable that the reflective region be mirror-finished. To reflect light efficiently, it is preferable that the reflective region be mirror-finished. In particular, fine surface irregularities such as ripples lower reflection efficiency and produce stray light. To avoid this, mirror-finishing is preferable.

It is preferable that the reflective surfaces be coated with a aluminum vapor deposition coat. A coat of aluminum vapor deposition offers high reflectivity, and is easy to process. It is preferable that the reflective surfaces be coated with a aluminum reflection enhancement coat. A aluminum reflection enhancement coat can be formed to offer reflectivity higher than that of an ordinary aluminum vapor deposition coat.

To obtain higher reflectivity, it is preferable that the reflective surfaces be coated with a dielectric coat. A dielectric coat offers extremely high reflectivity. In particular, in a case where there are a plurality of reflective surfaces, it is necessary to minimize the loss of light and, in such a case, a dielectric coat is effective. It is preferable that the reflective surfaces be coated with a silver vapor deposition coat. A silver vapor deposition coat offers extremely high reflectivity. In particular, in a case where there are a plurality of reflective surfaces, it is necessary to minimize the loss of light and, in such a case, a silver vapor deposition coat is effective.

It is preferable that the reflective surfaces of the optical prism mixedly include a surface coated with a aluminum vapor deposition coat, a surface coated with a aluminum reflection enhancement coat, a surface coated with a dielectric coat, and a surface coated with silver vapor deposition coat. In a case where a single optical prism includes a plurality of reflective surfaces, coating all the reflective surfaces with an aluminum vapor deposition coat permits inexpensive fabrication, but may lead to lowered reflectivity. By contrast, coating all the reflective surfaces with an aluminum reflection enhancement coat, a silver vapor deposition coat, or a dielectric coat helps avoid lowered reflectivity, but turns out to be expensive. To achieve low cost while minimizing the lowering of reflectivity, it is preferable to use the four types of coating in a proper balance. It is possible to use only two or three of the four types.

It is preferable that, of the at least three reflective surfaces, at least one has a reflectivity of 80% or more. The reflectivity of the entire system is the multiple of the reflectivities of the individual reflective surfaces. To increase the reflectivity of the entire system, it is necessary to increase the reflectivities of the individual reflective surfaces, and the presence of a single surface with low reflectivity greatly reduces the reflectivity of the entire system. For this reason, it is preferable that at least one reflective surface has a reflectivity of 80% or more.

It is preferable that at least one of the transmissive and reflective surfaces of the optical prism is coated with a coat that absorbs light of a long-wavelength range. The wavelength-dependent imaging performance of the taking optical system is adversely affected by light in a long-wavelength range. Thus, a plane-parallel plate coated with a coat that absorbs light of a long-wavelength range is often disposed in front of the image sensor. Light in a long-wavelength range, however, can be eliminated by absorbing it with a reflective surface of the optical prism. This eliminates the need for a separate member for absorbing light in a long-wavelength range, and thus helps reduce cost.

It is preferable that the optical prism be formed of a plastic material. Using a plastic material makes it possible to build the optical prism inexpensively, and permits mass production thereof by pressing. From different perspectives, it is preferable that the optical prism be formed of a glass material. Using a glass material to form the optical prism permits selection of a material with a high refractive index, and is thus advantageous in terms of slimness and high performance.

In the embodiments, the taking optical system includes refractive lens surfaces, that is, lens surfaces that deflect the rays incident thereon by refraction (that is, lens surfaces in which light is deflected at the interface between two media having different refractive indices). Any of those lens surfaces, however, may be replaced with a lens surface of any other type, for example: a diffractive lens surface, which deflects the rays incident thereon by diffraction; or a refractive-diffractive hybrid lens surface, which deflects the rays incident thereon by the combined effect of refraction and diffraction.

In the embodiments, the taking optical system is designed to be suitable for use as a slim taking optical system in a digital device equipped with an image input capability (for example, a camera-equipped cellular phone). By combining this with an image sensor and other components, it is possible to build a taking lens device that optically captures an image of a subject and then outputs it in the form of an electrical signal. A taking lens device is an optical device used as a main component of a camera used to take a still picture or a moving picture of a subject, and is composed of, from the object (subject) side, for example, a taking optical system that forms an optical image of the object and an image sensor that converts the optical image formed by the taking optical system into an electrical signal.

Used as the image sensor is, for example, a solid-state image sensor such as a CCD (charge-coupled device) or CMOS (complementary metal oxide semiconductor) sensor having a plurality of pixels. The optical image formed by the taking optical system is converted into an electrical signal by the image sensor. The signal produced by the image sensor is subjected to predetermined digital image processing, image compression processing, and the like as required, and is recorded in a memory (such as a semiconductor memory or an optical disk) as a digital video signal; in some cases, the signal is transferred to another apparatus through a cable or after being converted into an infrared signal. Between the taking optical system and the image sensor, an optical filter (such as an optical low-pass filter or an infrared cut filter) is disposed as necessary.

Examples of such cameras include: digital cameras; video cameras; surveillance cameras; vehicle-mounted cameras; cameras for videophones; cameras for intercoms; and cameras incorporated in or externally fitted to digital devices and the like, such as personal computers, mobile computers, cellular phones, personal digital assistants, and peripheral devices for them (such as mouses, scanners, and printers). As these examples tell, it is possible not only to build cameras by the use of taking lens devices, but also to add camera capabilities to various devices by incorporating taking lens devices in them. The camera capability can be realized in a desired form. For example, the taking lens device may be built as a unit so as to be detachably or rotatably attached to the body of a camera, or may be built as a unit so as to be detachably or rotatably attached to a portable data device (such as a cellular phone or PDA).

As will be understood from what has been described hereinbefore, the embodiments described above and the numerical examples presented later include the constructions described below. With these constructions, it is possible to realize low-cost, slim, compact taking optical systems that offer satisfactory optical performance. By applying these taking optical systems to cameras, digital devices, and the like, it is possible to make them high-performance, versatile, low-cost, and compact.

(U1') A taking lens device comprising a taking optical system for forming an optical image and an image sensor for converting the optical image formed by the taking optical system into an electrical signal, the taking optical system comprising: at least one optical prism having an entrance surface, at least three reflective surfaces each curved, and an exit surface, the optical prism receiving rays from the object side through the entrance surface, then reflecting the rays on the at least three reflective surfaces, and then letting out the rays through the exit surface, wherein the optical prism is formed of a medium having a refractive index of 1.2 or more, an optical aperture is disposed on or near one of the at least three reflective surfaces, at least one of the at least three reflective surfaces is an eccentrically disposed rotation-asymmetric surface, and, let the ray traveling from the center of the object through the center of the optical aperture to the center of an image surface be called a base ray, then the base ray incident on the entrance surface is approximately parallel to the base ray leaving the exit surface.

(U2') The taking lens device described at (U1') above, wherein, as the optical prism, there is provided only one optical prism.

(U3') The taking lens device described at (U1') or (U2') above, wherein the most object-side reflective surface as counted in order of incidence of the rays from the object side has a negative optical power.

(U4') The taking lens device described at one of (U1') to (U3') above, wherein the curved surfaces are free-form curved surfaces.

(U5') The taking lens device described at one of (U1') to (U4') above, wherein the most image-surface-side reflective surface as counted in order of incidence of the rays from the object side has a negative optical power.

(U6') The taking lens device described at one of (U1') to (U5') above, wherein the optical aperture is disposed on the second reflective surface as counted in order of incidence of the rays from the object side.

(U7') The taking lens device described at one of (U1') to (U6') above, wherein at least one of conditional formulae (B1) to (B18) and the narrowed versions thereof is fulfilled.

(P1') A camera that includes the taking lens device described at one of (U1') to (U7') above and that is used to take at least either a still picture or a moving picture of a subject.

(P2') The camera described at (P1') above, wherein the camera is a digital camera, a video camera, or a camera incorporated in or externally fitted to a cellular phone, a personal digital assistant, a personal computer, a mobile computer, or a peripheral device therefor.

(D1') A digital device that includes the taking lens device described at one of (U1') to (U7') above so as to be furnished with a capability of taking at least either a still picture or a moving picture of a subject.

(D2') The digital device described at (D1') above, wherein the digital device is a cellular phone, a personal digital assistant, a personal computer, a mobile computer, or a peripheral device therefor.

Construction with Incident Rays Crossing Reflected Rays

What characterizes the embodiments is the provision of at least one optical prism that has an entrance surface, at least three reflective surfaces each curved, and an exit surface, and that receives rays from the object side through the entrance surface, then reflects the rays on those at least three reflective surfaces, and then lets out the rays through the exit surface. This optical prism is formed of a medium having a refractive index of 1.2 or more (that is, an optical material, other than air, having a refractive index of 1.2 or more for the d-lines). The optical aperture is disposed on or near one of the at least three reflective surfaces. One of the at least three reflective surfaces is an eccentrically disposed rotation-asymmetric surface. Let the entrance surface be called the first surface, and let the at least three reflective surfaces that reflect rays incident thereon from the first surface be called the second, the third, and the fourth surface in order of arrangement thereof from the first surface, then the rays incident on the third surface cross the rays reflected from the fourth surface.

Seeking higher performance and higher definition by the use of a conventional straight-type taking optical system requires an increased number of optical elements, and this makes the taking optical system accordingly thick. An effective way to make the taking optical system slim is to bend the optical path. To bend the optical path, it is preferable to use a reflective surface in an optical prism, and, by eccentrically disposing a reflective surface of an optical prism to bend the optical path, it is possible to realize a slimmer taking optical system. Here, the concept meant by the term "eccentric" is not a construction involving only a 45-degree reflective surface as provided in a rectangular prism but one involving optically acting surfaces having varying angles. In particular, with a construction employing only a reflective surface having 45 degrees, it is difficult to make a taking optical system compact by bending the optical path. It is by the use of reflective surfaces disposed eccentrically at varying angles that a taking optical system can be made compact. Such eccentricity produces more complicated aberrations (for example, eccentric coma, eccentric astigmatism, etc.) than does a 45-degree mirror, and these aberrations are more difficult to correct for.

To seek higher definition (that is, larger image-sensing size) with the same angle of view, it is necessary to increase the focal length. Increasing the focal length, however, results in unduly large chromatic aberration in particular. Whereas a reflective surface produces no chromatic aberration, a refractive surface does. To reduce chromatic aberration, it is necessary to reduce the optical power of a refractive surface and increase the optical power of a reflective surface. Disadvantageously, an eccentrically disposed reflective surface produces aberrations alien to a straight-type optical system and peculiar to an eccentrically disposed optical surface. Aberrations peculiar to an eccentrically disposed optical surface include distortion, coma, astigmatism, etc. resulting from eccentricity.

Aberrations can be corrected for, for example, by one of the following methods. The aberrations produced by a surface having a positive optical power may be corrected for with the aberrations produced by a surface having a negative optical power. Aberrations may be designed to occur symmetrically with respect to an optical aperture so as to be canceled out. If the method of correcting for the aberrations produced by a surface having a positive optical power with the aberrations produced by a surface having a negative optical power is adopted, since a taking optical system intrinsically has a positive optical power, aberrations cannot be corrected for satisfactorily with two reflective surfaces alone. In particular, for the purpose of correcting for aberrations peculiar to an eccentric optical surface, two reflective surfaces alone produce large coma due to the positive optical power, and thus make it impossible to obtain high performance. The method of producing aberrations symmetrically with respect to an optical aperture is effective in correcting aberrations. With two reflective surfaces alone, however, aberration comparable with spherical aberration cannot be corrected for satisfactorily. That is, providing at least three reflective surfaces makes it possible to achieve high performance.

It is preferable, as in the embodiments, to use one of the reflective surfaces as an optical aperture, or to dispose an optical aperture near it, and to arrange the reflective surfaces symmetrical with respect to the optical aperture. By giving one of the reflective surfaces the function of an optical aperture, or disposing an optical aperture near it, it is possible to obtain high performance without making the taking optical system unduly large. Moreover, giving a reflective surface the function of an optical aperture helps omit components for an optical aperture, and thus helps effectively achieve low cost and slimness.

In making the taking optical system especially slim, how rays are bent is important. An effective way to achieve slimness is making rays enter the optical prism through the entrance surface (first surface) thereof, then reflecting the rays on the second surface, then bending the direction of the rays from perpendicular to toward the entrance surface side. Moreover, by making the rays incident on the third surface cross the rays leaving the fourth surface, it is possible to give the taking optical system a slim, compact construction. It is with this construction that it is possible to realize a slim, high-performance taking optical system, and to make a taking optical system low-cost and slim while simultaneously achieving high performance that can cope with high definition and wider angles of view.

It is preferable, as in the embodiments, that the taking optical system have only one optical prism. Building a taking optical system with only one optical prism gives the taking optical system the simplest construction. Advantageously, this helps greatly reduce the cost and thickness of the taking optical system. By giving the single optical prism at least three reflective surfaces, it is possible to make one reflective surface exert an optical power and make the other two correct for the aberrations resulting from eccentricity. This gives the taking optical system a high ability to correct aberrations. Moreover, disposing an optical aperture on or near a reflective surface of the single optical prism helps reduce the aberrations produced by that reflective surface even if it is given a strong optical power. Thus, this reflective surface can be made responsible for much of the optical power of the taking optical system. Moreover, giving a reflective surface an optical power produces no chromatic aberration. This helps minimize degradation in performance. Thus, with these features, it is possible, with only one optical prism, to realize a high-performance taking optical system that boasts of a high aberration correcting ability.

With regard to the optical power of the second surface (S2, the first reflective surface S2, the most object-side reflective surface as counted in order of incidence of the rays from the object side), it is preferable that conditional formula (C1) below be fulfilled.

$$0.1 < |f2/\text{fall}| < 30.0 \tag{C1}$$

where
  f2 represents the focal length of the second surface; and
  fall represents the focal length of the entire system.

Conditional formula (C1) defines a conditional range that should preferably be fulfilled with regard to the optical power of the second surface. The second surface serves to bend the light that has entered the taking optical system, and thus influences the size of the taking optical system. Moreover, since the second surface is an optical surface disposed to the object side of the optical aperture, it greatly influences distortion. For these reasons, unless the second surface is given a proper optical power, it is difficult to achieve slimness and high performance (in particular, well-corrected image distortion) in the taking optical system.

If the second surface is given so high an optical power as to disregard the lower limit of conditional formula (C1), it produces too large distortion to be corrected for by the other surfaces. This makes it impossible to achieve high performance. If the second surface is an eccentric surface, it produces too large eccentric distortion. This makes it impossible to achieve high performance. By contrast, if the upper limit of conditional formula (C1) is disregarded, the second surface is responsible for too low an optical power to achieve slimness. Moreover, the second surface does not satisfactorily correct for distortion, nor does it effectively cancel the aberrations produced by the other surfaces. Thus, out of the conditional range defined by conditional formula (C1), it is impossible to achieve high performance and slimness in the taking optical system.

It is preferable that conditional formula (C1a) below be fulfilled, and it is further preferable that conditional formula (C1b) below be fulfilled.

$$1.0<|f2/\text{fall}|<20.0 \tag{C1a}$$

$$5.0<|f2/\text{fall}|<15.0 \tag{C1b}$$

These conditional formulae (C1a) and (C1b) define, within the conditional range defined by conditional formula (C1) above, further preferable conditional ranges out of the above-stated and other considerations.

It is preferable that the second surface (S2, the first reflective surface) have a negative optical power. Image distortion, like imaging performance, is an important factor in performance; that is, distortion makes it impossible to obtain an exact image. Moreover, in a case where the reflective surface is eccentric, eccentric distortion is produced. Giving the second surface a negative optical power is particularly effective in correcting for negative distortion, that is, distortion in the negative direction.

With regard to the optical power of the fourth surface (S4, the third reflective surface S4 it is preferable that conditional formula (C2) below be fulfilled.

$$0.1<|f4/\text{fall}|<30.0 \tag{C2}$$

where f4 represents the focal length of the fourth surface; and fall represents the focal length of the entire system.

Conditional formula (C2) defines a conditional range that should preferably be fulfilled with regard to the optical power of the fourth surface. The fourth surface serves to bend the rays from the previous reflective surface so as to direct them to the exit surface, and thus it greatly influences the image surface. It particularly greatly influences astigmatism, and therefore, unless the fourth surface is given a proper optical power, it is difficult to achieve high performance.

If the fourth surface is given so high an optical power as to disregard the lower limit of conditional formula (C2), it produces too large astigmatism to be corrected for by the other surfaces (in particular, the exit surface). This makes it impossible to achieve high performance. If the fourth surface is an eccentric surface, it produces too large eccentric astigmatism. This makes it impossible to achieve high performance. By contrast, if the upper limit of conditional formula (C2) is disregarded, the fourth surface is responsible for too low an optical power to achieve slimness. Thus, out of the conditional range defined by conditional formula (C2), it is impossible to achieve high performance and slimness in the taking optical system.

It is preferable that conditional formula (C2a) below be fulfilled, and it is further preferable that conditional formula (C2b) below be fulfilled.

$$0.5<|f4/\text{fall}|<20.0 \tag{C2a}$$

$$1.0<|f4/\text{fall}|<5.0 \tag{C2b}$$

These conditional formulae (C2a) and (C2b) define, within the conditional range defined by conditional formula (C2) above, further preferable conditional ranges out of the above-stated and other considerations.

It is preferable that the fourth surface have a negative optical power. If astigmatism is present, it deteriorates imaging performance on the image surface. By giving the fourth surface a negative optical power, it is usually possible to correct for the tendency of the image surface inclining in the negative direction.

With regard to the arrangement of the optical aperture, it is preferable to dispose it on the third surface (S3, the second reflective surface as counted in order of incidence of the rays from the object side), that is, to give the second reflective surface the function of an optical aperture. Disposing the optical aperture on the reflective surface permits the reflective surface to serve also as an optical aperture. This eliminates the need for separate components to build an optical aperture, and thus helps achieve cost reduction. Disposing an optical aperture on the second surface makes it impossible to cancel out aberrations between reflective surfaces disposed in front of and behind the optical aperture, and thus makes it difficult to achieve high performance. Disposing at least one reflective surface in front of a reflective surface that also serves as an optical aperture makes it possible to correct for aberrations between reflective surfaces disposed in front of and behind the optical aperture, and thus makes it possible to achieve high performance.

With regard to the optical power of the optical aperture surface, it is preferable that conditional formula (C3) below be fulfilled.

$$0.1<|f3/\text{fall}|<30.0 \tag{C3}$$

where f3 represents the focal length of the third surface; and fall represents the focal length of the entire system.

Conditional formula (C3) defines a conditional range that should preferably be fulfilled with regard to the optical power of the reflective surface that also serves as the optical aperture (the third surface S3 in the embodiments). Giving an optical power to the reflective surface that also serves as the optical aperture increases flexibility in the correction of the aberrations produced by the taking optical system, and is therefore advantageous in terms of design. The optical power of this surface increases the differences in angle of incidence between upper and lower rays, and consequently influences coma. Thus, unless this reflective surface is given a proper optical power, it is impossible to realize a high-performance taking optical system.

If the reflective surface is given so high an optical power as to disregard the lower limit of conditional formula (C3), it produces too large coma to be corrected for by the other surfaces. This makes it impossible to achieve high performance. If the reflective surface is eccentric, it produces too large eccentric coma. This makes it impossible to achieve high performance. By contrast, if the reflective surface is made responsible for so low an optical power as to disregard the upper limit of conditional formula (C3), it is possible to reduce coma, but it is difficult to achieve slimness. Thus, out of the conditional range defined by conditional formula (C3), it is impossible to achieve high performance and slimness in the taking optical system.

It is preferable that conditional formula (C3a) below be fulfilled, and it is further preferable that conditional formula (C3b) below be fulfilled.

$$0.5<|f3/\text{fall}|<15.0 \tag{C3a}$$

$$1.0<|f3/\text{fall}|<5.0 \tag{C3b}$$

These conditional formulae (C3a) and (C3b) define, within the conditional range defined by conditional formula (C3) above, further preferable conditional ranges out of the above-stated and other considerations.

Moreover, with regard to the optical power of the optical aperture surface, it is preferable that the optical aperture be disposed on the third surface (S3, the second reflective surface), and that the third surface have a positive optical power. On the optical aperture surface, the ray height is the smallest, and thus the influence of the aberrations produced by this surface is small. Thus, giving a positive optical power to the third surface makes it possible to reduce the optical power distributed to the other surfaces while maintaining the optical power of the entire system.

It is preferable that the optical aperture be disposed on or near the third surface. A surface responsible for much of the optical power of the entire system has a sharp curvature, and this sharp curvature causes the reflective surface large aberrations. If the reflective surface is eccentric, it also produces large aberrations peculiar thereto. To reduce such aberrations, it is preferable to dispose such a sharp-curvature surface near the optical aperture. This helps reduce the ray height and thereby reduce the aberrations produced even with a strong optical power. The third surface produces, in particular, large coma. In particular, if eccentric coma occurs, it greatly degrades imaging performance, and is difficult to correct for with the other surfaces. Thus, to reduce coma while giving the third surface a sharp curvature, it is preferable, for high performance, that the optical aperture be disposed on or near the third surface.

With regard to the optical power of the first surface (S1, the entrance surface), it is preferable that conditional formula (C4) be fulfilled.

$$0.1 < |f1/\text{fall}| < 30.0 \tag{C4}$$

where
- f1 represents the focal length of the first surface (entrance surface); and
- fall represents the focal length of the entire system.

Conditional formula (C4) defines a conditional range that should preferably be fulfilled with regard to the optical power of the entrance surface. A refractive surface, unlike a reflective surface, produces, in particular, chromatic aberration. If a refractive surface is used as the entrance surface, it greatly influences lateral chromatic aberration. If lateral chromatic aberration occurs, color bleeding or the like occurs on the image surface; that is, different wavelengths are imaged at different positions, and this makes it impossible to obtain a clean image. Moreover, since the entrance surface is located farthest from the optical aperture on the object side thereof, and thus it also influences distortion. If distortion occurs, it deforms the image. By giving the entrance surface a proper optical power, it is possible to realize a taking optical system in which lateral chromatic aberration and distortion are satisfactorily corrected for.

If the entrance surface is given so high an optical power as to disregard the lower limit of conditional formula (C4), the reflective surface produces too large lateral chromatic aberration to be properly corrected for by the exit surface (the fifth surface S5 in the embodiments). This makes it impossible to obtain high performance. Moreover, distortion is overcorrected, and this deforms the image obtained. By contrast, if the upper limit of conditional formula (C4) is disregarded, the entrance surface has too low an optical power to properly refract rays. This makes the taking optical system as a whole too large to be made slim. Thus, out of the conditional range defined by conditional formula (C4), it is impossible to achieve high performance and slimness in the taking optical system.

It is preferable that conditional formula (C4a) below be fulfilled, and it is further preferable that conditional formula (C4b) below be fulfilled.

$$0.5 < |f1/\text{fall}| < 20.0 \tag{C4a}$$

$$1.0 < |f1/\text{fall}| < 5.0 \tag{C4b}$$

These conditional formulae (C4a) and (C4b) define, within the conditional range defined by conditional formula (C4) above, further preferable conditional ranges out of the above-stated and other considerations.

It is preferable that the first surface (S1, the entrance surface) have a positive optical power. This permits the entrance surface to make rays converge, and is therefore advantageous for making the taking optical system slim. It is advantageous also in terms of the optical power through the entire system, because it helps reduce the optical power distributed to the reflective surfaces. Thus, it is possible to reduce the eccentric astigmatism, eccentric coma, eccentric distortion, etc. produced by an eccentric reflective surface, and thereby to achieve high performance. It should be noted that, in the numerical examples presented later, the reference curvature of the first surface S1 has a negative value, but the free-form curved surface coefficients are given assuming that the first surface S1 has a positive optical power.

In the embodiments, the first to fifth surfaces S1 to S5 are free-form curved surfaces. In this way, in an optical prism having a plurality of reflective surfaces, it is preferable to use, as its prism surfaces, free-form curved surfaces, and it is further preferable that the curved surfaces that form the reflective surfaces of the optical prism be free-form curved surfaces. An eccentric curved surface produces aberrations peculiar to eccentricity, for example eccentric distortion, eccentric coma, and eccentric astigmatism. These aberrations can be corrected for only with a surface that has an asymmetric curvature with respect to the direction of eccentricity of the eccentric curved surface. Moreover, by setting different curvatures (including the sign thereof) in the direction of eccentricity and in the direction perpendicular thereto, it is possible to correct for aberrations attributable to eccentricity.

Let the ray that travels from the center of the object through the center of the optical aperture to the center of the image surface be called the base ray (BL in FIG. 12), then it is preferable that the second surface have a negative optical power and fulfill conditional formula (C5) below.

$$0.05 < |\phi 2y/\phi 2x| < 20.0 \tag{C5}$$

where
- $\phi 2x$ represents the optical power that the second surface has in the horizontal direction at the intersection thereof with the base ray; and
- $\phi 2y$ represents the optical power that the second surface has in the vertical direction at the intersection thereof with the base ray.

Conditional formula (C5) defines a conditional range that should preferably be fulfilled with regard to the power anamorphic ratio (the ratio between the optical powers in the x- and y-directions) of the second surface. In a taking optical system including eccentric optically acting surfaces, the optically acting surfaces often have different optical powers between in two directions (for example, the x- and y-directions). Even then, it is preferable that the optical power through the entire system be approximately equal between in the two directions. This helps properly locate imaging points on the image surface, and helps make the magnification equal in the different directions. However, since the individual optically acting surfaces are eccentric, they exert different aberration-correcting effects. The second surface is more eccentric in the y-direction than in x-direction, and thus produces larger eccentric astigmatism and eccentric distortion in the y-direction. However, if the optical powers are set with attention paid only to the eccentric aberrations in the y-direction, the optical power through the entire system becomes anamorphic, which is undesirable for the taking optical system as a whole. Thus, it is preferable to properly set the relationship between the optical powers in the x- and y-directions. This makes it possible, while correcting for eccentric astigmatism and eccentric distortion, to prevent the optical power of the entire system from becoming anamorphic.

If the lower limit of conditional formula (C5) is disregarded, the optical powers in the x- and y-directions differ so much as to result in undercorrection of eccentric astigmatism and eccentric distortion. By contrast, disregarding the upper limit of the conditional formula (C5) results in overcorrection. Moreover, out of the conditional range defined by conditional formula (C5), the optical powers of the entire system between in the horizontal (x-) and vertical (y-) directions differ so much as to be anamorphic. This makes it impossible to build the taking optical system. Thus, out of the conditional range defined by conditional formula (C5), it is impossible to achieve high performance in the taking optical system, and it is thus impossible to realize the taking optical system as a whole.

It is preferable that conditional formula (C5a) below be fulfilled, and it is further preferable that conditional formula (C5b) below be fulfilled.

$$0.1<|\phi 2y/\phi 2x|<10.0 \tag{C5a}$$

$$0.5<|\phi 2y/\phi 2x|<5.0 \tag{C5b}$$

These conditional formulae (C5a) and (C5b) define, within the conditional range defined by conditional formula (C5) above, further preferable conditional ranges out of the above-stated and other considerations.

It is preferable that the third surface have a positive optical power and fulfill conditional formula (C6) below.

$$0.05<|\phi 3y/\phi 3x|<20.0 \tag{C6}$$

where
- $\phi 3x$ represents the optical power that the third surface has in the horizontal direction at an intersection thereof with the base ray; and
- $\phi 3y$ represents the optical power that the third surface has in the vertical direction at the intersection thereof with the base ray.

Conditional formula (C6) defines a conditional range that should preferably be fulfilled with regard to the power anamorphic ratio (the ratio between the optical powers in the x- and y-directions) of the third surface. The third surface produces large eccentric coma in the y-direction. On the other hand, if the optical powers are defined with attention paid only to the eccentric aberrations in the y-direction, the optical power through the entire system becomes anamorphic, giving an undesirable optical power to the taking optical system as a whole. Thus, it is preferable to properly set the relationship between the optical powers in the x- and y-directions. This makes it possible, while correcting for eccentric astigmatism, to prevent the optical power of the entire system from becoming anamorphic.

If the lower limit of conditional formula (C6) is disregarded, the optical powers in the x- and y-directions differ so much as to result in undercorrection of coma. By contrast, disregarding the upper limit of the conditional formula (C6) results in overcorrection. Moreover, out of the conditional range defined by conditional formula (C6), the optical powers of the entire system between in the horizontal (x-) and vertical (y-) directions differ so much as to be anamorphic. This makes it impossible to build the taking optical system. Thus, out of the conditional range defined by conditional formula (C6), it is impossible to achieve high performance in the taking optical system, and it is thus impossible to realize the taking optical system as a whole.

It is preferable that conditional formula (C6a) below be fulfilled, and it is further preferable that conditional formula (C6b) below be fulfilled.

$$0.1<|\phi 3y/\phi 3x|<10.0 \tag{C6a}$$

$$0.1<|\phi 3y/\phi 3x|<3.0 \tag{C6b}$$

These conditional formulae (C6a) and (C6b) define, within the conditional range defined by conditional formula (C6) above, further preferable conditional ranges out of the above-stated and other considerations.

It is preferable that the fourth surface have a negative optical power and fulfill conditional formula (C7) below.

$$0.05<|\phi 4y/\phi 4x|<20.0 \tag{C7}$$

where
- $\phi 4x$ represents the optical power that the fourth surface has in the horizontal direction at an intersection thereof with the base ray; and
- $\phi 4y$ represents the optical power that the fourth surface has in the vertical direction at the intersection thereof with the base ray.

Conditional formula (C7) defines a conditional range that should preferably be fulfilled with regard to the power anamorphic ratio (the ratio between the optical powers in the x- and y-directions) of the fourth surface. The fourth reflective surface produces large eccentric astigmatism in the y-direction. On the other hand, if the optical powers are defined with attention paid only to the eccentric aberrations in the y-direction, the optical power through the entire system becomes anamorphic, giving an undesirable optical power to the taking optical system as a whole. Thus, it is preferable to properly set the relationship between the optical powers in the x- and y-directions. This makes it possible, while correcting for eccentric astigmatism, to prevent the optical power of the entire system from becoming anamorphic.

If the lower limit of conditional formula (C7) is disregarded, the optical powers in the x- and y-directions differ so much as to result in undercorrection of eccentric astigmatism. By contrast, disregarding the upper limit of the conditional formula (C7) results in overcorrection. Moreover, out of the conditional range defined by conditional formula (C7), the optical powers of the entire system between in the horizontal (x-) and vertical (y-) directions differ so much as to be anamorphic. This makes it impossible to build the taking optical system. Thus, out of the conditional range defined by conditional formula (C7), it is impossible to achieve high performance in the taking optical system, and it is thus impossible to realize the taking optical system as a whole.

It is preferable that conditional formula (C7a) below be fulfilled, and it is further preferable that conditional formula (C7b) below be fulfilled.

$$0.1<|\phi 4y/\phi 4x|<10.0 \tag{C7a}$$

$$0.5<|\phi 4y/\phi 4x|<5.0 \tag{C7b}$$

These conditional formulae (C7a) and (C7b) define, within the conditional range defined by conditional formula (C7)

above, further preferable conditional ranges out of the above-stated and other considerations.

It is preferable that the first surface (the entrance surface) have a positive optical power and fulfill conditional formula (C8) below.

$$0.05<|\phi 1y/\phi 1x|<20.0 \tag{C8}$$

where $\phi 1x$ represents the optical power that the first surface has in the horizontal direction at the intersection thereof with the base ray; and $\phi 1y$ represents the optical power that the first surface has in the vertical direction at the intersection thereof with the base ray.

Conditional formula (C8) defines a conditional range that should preferably be fulfilled with regard to the power anamorphic ratio (the ratio between the optical powers in the x- and y-directions) of the entrance surface (the first surface), which is a transmissive surface. The entrance surface produces distortion and lateral chromatic aberration. In particular, the distortion here relates to the correction by the optically acting surfaces disposed behind. In particular, in the y-direction, eccentricity produces eccentric distortion, and, to achieve a proper balance therewith, it is necessary to set proper optical powers. However, if the optical powers are defined with attention paid only to the distortion in the y-direction, the optical power through the entire system becomes anamorphic, giving an undesirable optical power to the taking optical system as a whole. Thus, it is preferable to properly set the relationship between the optical powers in the x- and y-directions. This makes it possible, while correcting for eccentric distortion, to prevent the optical power of the entire system from becoming anamorphic.

If the lower limit of conditional formula (C8) is disregarded, the optical powers in the x- and y-directions differ so much as to result in undercorrection of eccentric distortion. By contrast, disregarding the upper limit of the conditional formula (C8) results in overcorrection. Moreover, out of the conditional range defined by conditional formula (C8), the optical powers of the entire system between in the horizontal (x-) and vertical (y-) directions differ so much as to be anamorphic. This makes it impossible to build the taking optical system. Thus, out of the conditional range defined by conditional formula (C8), a deformed image is produced, and moreover it is impossible to realize the taking optical system as a whole.

It is preferable that conditional formula (C8a) below be fulfilled, and it is further preferable that conditional formula (C8b) below be fulfilled.

$$0.1<|\phi 1y/\phi 1x|<10.0 \tag{C8a}$$

$$0.5<|\phi 1y/\phi 1x|<5.0 \tag{C8b}$$

These conditional formulae (C8a) and (C8b) define, within the conditional range defined by conditional formula (C8) above, further preferable conditional ranges out of the above-stated and other considerations.

It is preferable that conditional formula (C9) below be fulfilled.

$$0.5<NAy(+)/NAy(-)<1.5 \tag{C9}$$

where

NAy(+) represents the numerical aperture (NA) on the positive side in the vertical direction (y-direction) at the center of the image surface; and NAy(-) represents the numerical aperture (NA) on the negative side in the vertical direction (y-direction) at the center of the image surface.

Conditional formula (C9) defines a conditional range that should preferably be fulfilled with regard to the ratio of brightness in the y-direction on the image surface. An optical system including an eccentric curved surface is asymmetric with respect to the direction of eccentricity. In an optical system eccentric in the vertical direction, how rays converge on the image surface is asymmetric between in the positive and negative directions. As this asymmetry increases, the brightness of the image becomes uneven, making it impossible to obtain a clean image. Thus, by defining the ratio of brightness between those two directions, it is possible to form a clean image. Out of the conditional range defined by conditional formula (C9), the unevenness of brightness is so great that it is impossible to form a clean image.

It is preferable that conditional formula (C9a) below be fulfilled, and it is further preferable that conditional formula (C9b) below be fulfilled.

$$0.7<NAy(+)/NAy(-)<1.3 \tag{C9a}$$

$$0.8<NAy(+)/NAy(-)<1.2 \tag{C9b}$$

These conditional formulae (C9a) and (C9b) define, within the conditional range defined by conditional formula (C9) above, further preferable conditional ranges out of the above-stated and other considerations.

It is preferable that conditional formula (C10) below be fulfilled.

$$0.5<NAx/NAy<1.8 \tag{C10}$$

where

NAx represents the average of the numerical apertures on the positive and negative sides in the horizontal (x-) direction at the center of the image surface; and NAy represents the average of the numerical apertures on the positive and negative sides in the vertical (y-) direction at the center of the image surface.

Conditional formula (C10) defines a conditional range that should preferably be fulfilled with regard to the ratio of brightness between in the x- and y-directions on the image surface. In an eccentric optical system, rays have different brightness between in the horizontal and vertical directions. As this difference increases, the brightness of the image becomes uneven, leading to degraded image quality. Thus, by defining the ratio of brightness between those directions, it is possible to form a clean image. Out of the conditional range defined by conditional formula (C10), the unevenness of brightness is so conspicuous that it is impossible to obtain an acceptable image.

It is further preferable that conditional formula (C10a) below be fulfilled.

$$0.7<NAx/NAy<1.5 \tag{C10a}$$

This conditional formula and (C10a) defines, within the conditional range defined by conditional formula (C10) above, a further preferable conditional range out of the above-stated and other considerations.

It is preferable that the reflective surfaces include a reflective surface that does not totally reflect, and it is further preferable that the reflective surfaces include no reflective surface that totally reflects. The embodiments all include a reflective surface that does not totally reflect. Designing a reflective surface to totally reflect light is advantageous in terms of cost, because doing so eliminates the need to lay a reflective coat for that reflective surface. However, for a reflective surface to totally reflect light, the light needs to be shone on it at a large angle of incidence. The larger the angle of incidence, the larger the aberrations produced. To correct these aberrations, an additional optical surface becomes necessary. This is rather disadvantageous in terms of cost. Thus, to realize a high-performance taking optical system at low cost, it is necessary to use a reflective surface that is not a total-reflection surface that requires a large angle of incidence.

It is preferable that the surfaces forming the optical prism include no surface that both transmits and reflects (for example a TIR—total internal reflection—surface). The embodiments all include no surface that both transmits and reflects. To make a surface both transmit and reflect, it is necessary, for example, to use a louver optical element or to exploit the total reflection effect. Using a louver optical element or the like leads to higher cost and reduces the overall amount of light. Exploiting the total reflection effect leads to higher cost as described above and makes it difficult to achieve high performance. Thus, to achieve high performance and low cost, it is necessary not to use a surface that both transmits and reflects.

Figure 12:
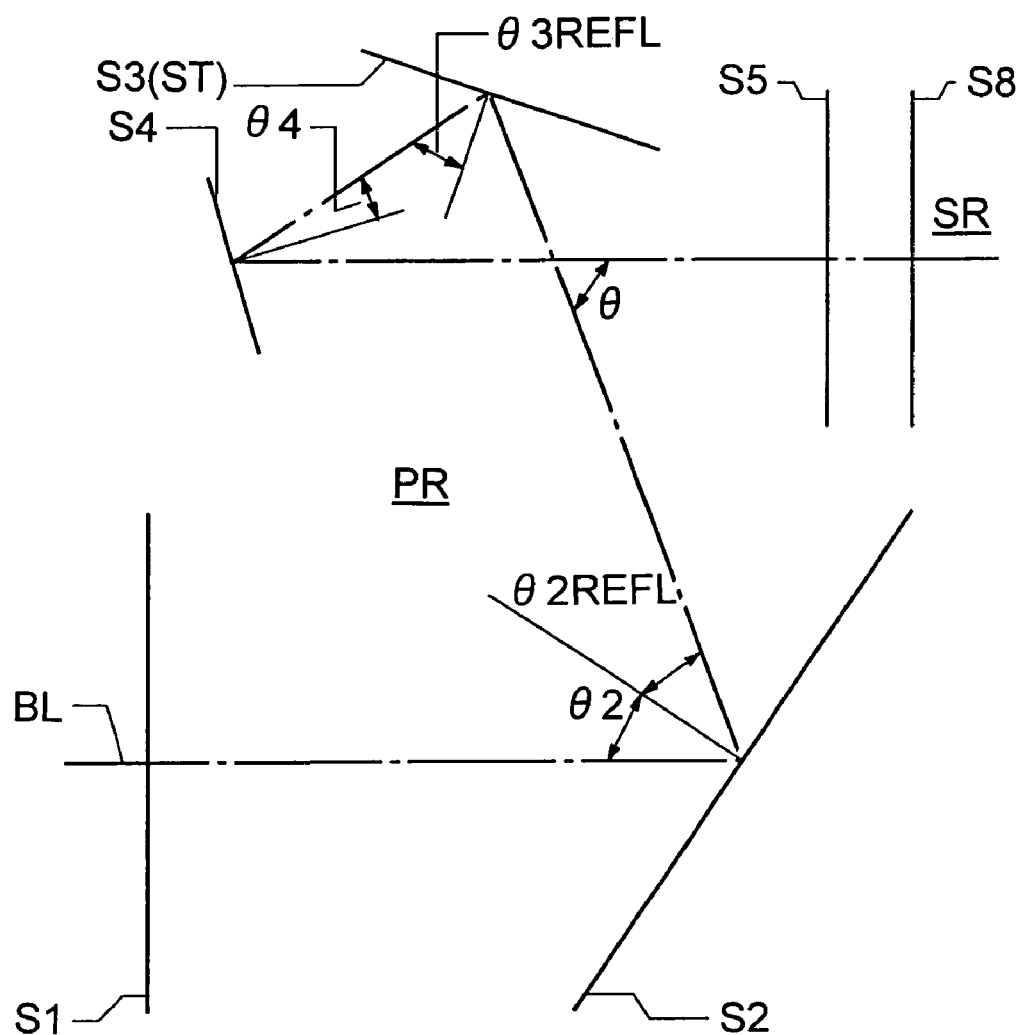

It is preferable that the base ray incident on the third surface crosses the base ray leaving the fourth surface (see the base ray BL in FIG. 12). An effective way to make the taking optical system slim is to bend the optical path and, in addition, make the base rays incident on the third surface and the base rays leaving the fourth surface cross each other somewhere along their path. Making the base rays cross each other somewhere on the object side of the taking optical system leads to a large beam diameter, and thus makes the taking optical system rather large, disadvantageously in terms of slimness. Thus, a further effective way to make the taking optical system slim is to make the base rays cross each other on a reflective surface close to the image side.

It is preferable that the angle at which the base ray crosses itself fulfill conditional formula (C11) below (see FIG. 12).

$$30 < \theta < 80 \quad (C11)$$

where $\theta$ represents the smaller angle (degrees) at which the base ray crosses itself.

As described above, by bending rays and making them cross themselves, it is possible to make the taking optical system slim. However, making the rays cross themselves perpendicularly requires a wide space, and is therefore disadvantageous in terms of slimness. To make the taking optical system slim, it is necessary to design the reflective surfaces such that the angle at which the base ray crosses itself fulfills conditional formula (C11). By properly setting this crossing angle, it is possible to realize a slim taking optical system that offers high performance.

If the upper limit of conditional formula (C11) is disregarded, the reflective surfaces that permit the base ray to cross itself need to be arranged at right angles. This makes the taking optical system unduly large. By contrast, disregarding the lower limit of conditional formula (C11) is advantageous in terms of slimness, but results in so large an angle of incidence with respect to the reflective surface as to produce large aberration. This makes it difficult to achieve high performance in the taking optical system. Moreover, for the correction of aberrations, an additional optical surface becomes necessary, making the taking optical system larger.

It is preferable, as in the embodiments, that the optical prism have only three reflective surfaces. To make the optical prism slim inexpensively and efficiently, it is advantageous to give it as few reflective surfaces as possible. However, too few reflective surfaces require a strong optical power to be distributed to each surface. This causes each surface to produce large aberrations, and thus makes it impossible to achieve high performance. Increasing the number of reflective surfaces is advantageous in terms of performance, but leads to higher cost and a larger size. By providing three reflective surfaces and using them as main elements, it is possible to achieve slimness while maintaining high performance.

In a case where, as in the embodiments, the optical prism has only three reflective surfaces, it is preferable that conditional formula (C12) below be fulfilled (see FIG. 12).

$$0.1 < \theta 2/\theta 4 < 10.0 \quad (C12)$$

where $\theta 2$ represents the angle (degrees) between the base ray and the normal to the second surface at the intersection therebetween; and $\theta 4$ represents the angle (degrees) between the base ray and the normal to the fourth surface at the intersection therebetween.

Conditional formula (C12) defines a conditional range that should preferably be fulfilled with regard to the relative angle between the second and fourth surfaces. In a case where there are provided only three prism surfaces, the second surface reflects the rays that have just passed through the entrance surface (the first surface S1), and the fourth surface reflects the rays toward the exit surface (the fifth surface S5). These optical surfaces are disposed in positions eccentric relative to each other, and their being so arranged provides an effect of canceling the aberrations resulting from eccentricity (in particular, eccentric distortion and eccentric coma) between themselves. Setting a proper angular relationship to fulfill conditional formula (C12) makes it possible to realize a taking optical system in which eccentric distortion and eccentric coma are satisfactorily corrected. Out of the conditional range defined by conditional formula (C12), eccentric distortion is large, and so is coma resulting from eccentricity.

It is preferable that conditional formula (C12a) below be fulfilled, and it is further preferable that conditional formula (C12b) below be fulfilled.

$$0.5 < \theta 2/\theta 4 < 5.0 \quad (C12a)$$

$$1.0 < \theta 2/\theta 4 < 3.0 \quad (C12b)$$

These conditional formulae (C12a) and (C12b) define, within the conditional range defined by conditional formula (C12) above, further preferable conditional ranges out of the above-stated and other considerations.

It is preferable that conditional formula (C13) below be fulfilled.

$$Tall/fall < 2.0 \quad (C13)$$

where

Tall represents the thickness from the first surface (entrance surface) to the light-receiving surface of the image sensor (for example, the distance from the intersection between the first surface and the base ray to the image-sensing surface); and fall represents the focal length of the entire system (the average of the focal lengths in the horizontal and vertical directions).

Conditional formula (C13) indicates the degree of slimness brought by the bending effect as observed in the focal length. The degree of slimness achieved in the taking optical system is evaluated in terms of the focal length thereof. The longer the focal length, the larger the total length. Thus, it is impossible, simply by evaluating the thickness, to evaluate the degree of slimness achieved; it should better be evaluated in terms of the ratio between the thickness and the focal length. If the upper limit of conditional formula (C13) is disregarded, the bending effect is too small to make the taking optical system satisfactorily slim.

It is preferable that conditional formula (C13a) below be fulfilled, and it is further preferable that conditional formula (C13b) below be fulfilled.

$$Tall/fall<1.5 \quad (C13a)$$

$$Tall/fall<1.0 \quad (C13b)$$

These conditional formulae (C13a) and (C13b) define, within the conditional range defined by conditional formula (C13) above, further preferable conditional ranges out of the above-stated and other considerations.

It is preferable, as in the embodiments, that the optical prism have an odd number of reflective surfaces. In a case where the optical aperture is disposed on or near a reflective surface, disposing other reflective surfaces symmetrically with respect to that reflective surface permits the coma, distortion, etc. produced by the other reflective surfaces to be canceled out. This makes it possible to achieve high performance in the taking optical system. For this purpose, it is preferable that there be provided an odd number of reflective surfaces. Incidentally, reflecting an image an odd number of times produces a mirror image of the original. The mirror image can easily be reversed wherever an image sensor is used.

In a case where, as in the embodiments, the optical prism has only three reflective surfaces, it is preferable that the second surface have a negative optical power and fulfill conditional formula (C14) below (see FIG. 12).

$$5.0<\theta 2refl<70.0 \quad (C14)$$

where $\theta 2refl$ represents the angle (degrees) of reflection at which the base ray is reflected on the second surface.

Conditional formula (C14) defines a conditional range that should preferably be fulfilled with regard to the angle of reflection on the second surface. The second surface plays an important role in greatly bending the direction of the incident rays and thereby producing an effect of folding the optical path. To increase the folding effect, it is preferable to bend the optical path as close to perpendicularly as possible. This, however, produces large eccentric distortion and eccentric astigmatism, and makes it impossible to improve imaging performance. Thus, it is difficult to achieve high performance. On the other hand, too small a bending angle makes it impossible to make the taking optical system slim. To achieve slimness while realizing high imaging performance, it is preferable to set the angle of reflection on the second surface to fulfill conditional formula (C14).

If the angle of reflection is so small as to disregard the lower limit of the conditional formula (C14), the optical path up to the next reflective surface is too short for making the taking optical system slim, and thus diminishes the folding effect. By contrast, if the angle of reflection is so large as to disregard the upper limit of the conditional formula (C14), the second surface produces so large eccentric aberrations as to make it difficult to correct for, in particular, the eccentric distortion and eccentric astigmatism. This makes it impossible to achieve high performance.

It is preferable that conditional formula (C14a) below be fulfilled, and it is further preferable that conditional formula (C14b) below be fulfilled.

$$10.0<\theta 2refl<60.0 \quad (C14a)$$

$$20.0<\theta 2refl<40.0 \quad (C14b)$$

These conditional formulae (C14a) and (C14b) define, within the conditional range defined by conditional formula (C14) above, further preferable conditional ranges out of the above-stated and other considerations.

In a case where, as in the embodiments, the optical prism has only three reflective surfaces, it is preferable that the optical aperture be disposed on the third surface and that no part of the base ray is parallel to the base ray incident on the third surface. In a case where the optical prism is composed of three reflective surfaces, and the third surface serves also as the optical aperture, it is effective for slimness to set the angle of the base ray from the second surface to the third surface close to perpendicular to the base ray incident on the entrance surface from the object side. By lengthening the optical path in the direction of this base ray, it is possible to realize a slim taking optical system while securing a satisfactory focal length. However, adding further rays in that direction with a view to lengthening the optical path eventually requires that reflective surfaces be disposed parallel to each other, and thus make it difficult to make the taking optical system slim. Thus, to make the taking optical system slim, it is necessary that only one bunch of rays be approximately parallel to the rays incident on the third surface.

In a case where, as in the embodiments, the optical prism has only three reflective surfaces, it is preferable that the optical aperture be disposed on the third surface, and that no part of the base ray be approximately parallel to the base ray leaving the third surface. In a case where the optical prism is composed of three reflective surfaces, and the third surface serves also as the optical aperture, the base ray leaving the third surface has an angle close to 45 degrees relative to the base ray incident on the entrance surface from the object side. Lengthening the optical path of those rays is naturally disadvantageous in terms of slimness. Thus, having more than one part of the base ray running approximately parallel to those rays is disadvantageous in terms of slimness.

In a case where, as in the embodiments, the optical prism has only three reflective surfaces, it is preferable that conditional formula (C15) below be fulfilled (see FIG. 12).

$$5.0<\theta 3refl<70.0 \quad (C15)$$

where $\theta 3refl$ represents the angle (degrees) of reflection at which the base ray is reflected on the third surface.

Conditional formula (C15) defines a conditional range that should preferably be fulfilled with regard to the angle of reflection on the third surface located at or near the optical aperture surface. The third surface is responsible for much of the optical power of the entire system. A large angle of reflection here contributes to the taking optical system exerting a folding effect, and thus makes it possible to achieve further slimness. However, a large angle of reflection produces large aberrations. In particular, this surface produces so large eccentric distortion and eccentric astigmatism, and therefore a large angle of reflection here degrades imaging performance and makes it impossible to achieve high performance in the taking optical system. Setting the angle of reflection on the third surface to fulfill conditional formula (C15) makes it possible to realize a slim taking optical system that offers high performance.

If the angle of reflection is so large as to disregard the upper limit of the conditional formula (C15), the eccentric distortion and eccentric astigmatism produced are too large to be corrected for by the other optical surfaces. By contrast, if the angle of reflection is so small as to disregard the lower limit of the conditional formula (C15), the second and fourth surfaces are so close to each other that it is necessary to secure a space accordingly. This makes it impossible to make the taking optical system slim.

It is preferable that conditional formula (C15a) below be fulfilled, and it is further preferable that conditional formula (C15b) below be fulfilled.

$$10.0 < \theta 3 refl < 60.0 \quad (C15a)$$

$$20.0 < \theta 3 refl < 40.0 \quad (C15b)$$

These conditional formulae (C15a) and (C15b) define, within the conditional range defined by conditional formula (C15) above, further preferable conditional ranges out of the above-stated and other considerations.

It is preferable, as in the embodiments, that the first surface (entrance surface) not be eccentric relative to the base ray. The rays from the object side are refracted by the entrance surface when they enter the optical prism, and thus chromatic aberration occurs in the rays. An eccentric surface also produces, as chromatic aberration, eccentric lateral chromatic aberration, which cannot be corrected for with an eccentric reflective surface, since a reflective surface produces no chromatic aberration. For this reason, it is necessary to minimize eccentric lateral chromatic aberration. Thus, to achieve high performance in the taking optical system, it is necessary that the entrance surface not be eccentric.

In a case where, as in the embodiments, the optical prism has only three reflective surfaces, it is preferable that conditional formula (C16) below be fulfilled.

$$0.1 < Sfront/Srear < 10.0 \quad (C16)$$

where
Sfront represents the optical distance from the first surface of the optical prism to the optical aperture surface along the base ray; and
Srear represents the optical distance from the optical aperture surface to the exit surface of the optical prism along the base ray.

Conditional formula (C16) defines a conditional range that should preferably be fulfilled with regard to the ratio between the optical distances in front of and behind the optical aperture. To realize a high-performance optical system, it is necessary to correct for aberrations as much as possible. One way of correcting for aberrations is to cancel the aberrations occurring at the surfaces located on the object side of the optical aperture with the aberrations occurring at the surfaces located on the image side of the optical aperture. Conditional formula (C16) provides a guideline on what optical distance ratio achieves how high performance in the taking optical system employing the optical prism. Out of the conditional range defined by conditional formula (C16), either the optical distance in front of the optical aperture is too large or the optical distance behind the optical aperture is too large to satisfactorily correct for distortion and coma. This makes it impossible to achieve high performance.

It is preferable that conditional formula (C16a) below be fulfilled, and it is further preferable that conditional formula (C16b) below be fulfilled.

$$0.3 < Sfront/Srear < 5.0 \quad (C16a)$$

$$0.5 < Sfront/Srear < 3.0 \quad (C16b)$$

These conditional formulae (C16a) and (C16b) define, within the conditional range defined by conditional formula (C16) above, further preferable conditional ranges out of the above-stated and other considerations.

It is preferable that a surface of the optical prism on which a reflective surface is formed have a reflective region and a transmissive region. When a prism surface is fabricated, if it is made reflective all over, it produces stray light at the edge, and moreover it leaves no area at which to hold the optical prism. Designing a prism surface to transmit light elsewhere than in a reflective region thereof makes it possible to use only the effective area, and is thus preferable as a measure against stray light. The transmissive region also serves as where the prism is held, and designing the holding portion to cut or absorb light serves as a measure against stray light.

It is preferable that a surface of the optical prism on which a reflective surface is formed have a reflective region and an absorptive region. When a prism surface is fabricated, if it is made reflective all over, it produces stray light at the edge, and moreover it leaves no area at which to hold the optical prism. Designing a prism surface to absorb light elsewhere than in a reflective region thereof makes it possible to use only the effective area, and is thus preferable as a measure against stray light. The absorptive region also serves as where the prism is held.

It is preferable that a surface of the optical prism on which a reflective surface is formed have a reflective region and a light-shielding region. When a prism surface is fabricated, if it is made reflective all over, it produces stray light at the edge, and moreover it leaves no area at which to hold the optical prism. Designing a prism surface to shield light elsewhere than in a reflective region thereof makes it possible to use only the effective area, and is thus preferable as a measure against stray light. The light-shielding region also serves as where the prism is held.

It is preferable that the reflective region be coated with a reflective coat. Coating the reflective region with a reflective coat permits efficient reflection of light. For example, it is preferable that the reflective surface on which the optical aperture is disposed be coated with a reflective coat only within the effective diameter of the optical aperture. This makes it possible to cut light outside the effective diameter of the optical aperture, and thus makes it possible to realize an inexpensive construction without increasing the number of component.

It is preferable that the absorptive or light-shielding region be treated by blackening surface treatment. Blackening surface treatment helps prevent deformation of the surface on which that region is located. Using this surface as a holding portion or measurement reference surface helps keep high accuracy.

It is preferable that the absorptive or light-shielding region is formed by rough grinding. Roughly grinding a surface to make it scatter light makes it possible to reflect light only inside the effective diameter. Moreover, rough grinding permits the target region to be changed easily, and permits inexpensive processing.

It is preferable that the absorptive or light-shielding region be formed into a rough surface. Roughly grinding a surface to make it scatter light makes it possible to reflect light only inside the effective diameter. When a surface is fabricated by polishing or pressing, it is not finished by polishing. Pressing with a die having the relevant portion thereof formed rough permits inexpensive and easy formation of the absorptive or light-shielding region.

It is preferable that the absorptive or light-shielding region have fine pyramid-shaped light-scattering projections. Fabricating fine pyramid-shaped light-scattering projections in the absorptive or light-shielding region makes it possible to attenuate light in that region, and this serves, in particular, as a measure against stray light. If this regions is left transmissive, the light regularly or irregularly reflected on a lens barrel and the like becomes stray light. This makes it necessary to give the region a special shape, or use an additional component. By contrast, fine pyramid-shaped light-scattering projections can be formed inexpensively, for example, by pressing.

It is preferable that the absorptive or light-shielding region be formed by a chemical reaction caused by an organic solvent. It is possible to form the absorptive or light-shielding region by using an organic solvent so that a chemical reaction it causes changes the properties of the region. This can be achieved simply by applying the organic solvent to the region, or by dipping the region in the organic solvent. This permits mass production.

It is preferable that the reflective region be mirror-finished. To reflect light efficiently, it is preferable that the reflective region be mirror-finished. In particular, fine surface irregularities such as ripples lower reflection efficiency and produce stray light. To avoid this, mirror-finishing is preferable.

It is preferable that the reflective surfaces be coated with a aluminum vapor deposition coat. A coat of aluminum vapor deposition offers high reflectivity, and is easy to process. It is preferable that the reflective surfaces be coated with a aluminum reflection enhancement coat. A aluminum reflection enhancement coat can be formed to offer reflectivity higher than that of an ordinary aluminum vapor deposition coat.

To obtain higher reflectivity, it is preferable that the reflective surfaces be coated with a dielectric coat. A dielectric coat offers extremely high reflectivity. In particular, in a case where there are a plurality of reflective surfaces, it is necessary to minimize the loss of light and, in such a case, a dielectric coat is effective. It is preferable that the reflective surfaces be coated with a silver vapor deposition coat. A silver vapor deposition coat offers extremely high reflectivity. In particular, in a case where there are a plurality of reflective surfaces, it is necessary to minimize the loss of light and, in such a case, a silver vapor deposition coat is effective.

It is preferable that the reflective surfaces of the optical prism mixedly include a surface coated with a aluminum vapor deposition coat, a surface coated with a aluminum reflection enhancement coat, a surface coated with a dielectric coat, and a surface coated with silver vapor deposition coat. In a case where a single optical prism includes a plurality of reflective surfaces, coating all the reflective surfaces with an aluminum vapor deposition coat permits inexpensive fabrication, but may lead to lowered reflectivity. By contrast, coating all the reflective surfaces with an aluminum reflection enhancement coat, a silver vapor deposition coat, or a dielectric coat helps avoid lowered reflectivity, but turns out to be expensive. To achieve low cost while minimizing the lowering of reflectivity, it is preferable to use the four types of coating in a proper balance. It is possible to use only two or three of the four types.

It is preferable that, of the at least three reflective surfaces, at least one has a reflectivity of 80% or more. The reflectivity of the entire system is the multiple of the reflectivities of the individual reflective surfaces. To increase the reflectivity of the entire system, it is necessary to increase the reflectivities of the individual reflective surfaces, and the presence of a single surface with low reflectivity greatly reduces the reflectivity of the entire system. For this reason, it is preferable that at least one reflective surface has a reflectivity of 80% or more.

It is preferable that at least one of the transmissive and reflective surfaces of the optical prism is coated with a coat that absorbs light of a long-wavelength range. The wavelength-dependent imaging performance of the taking optical system is adversely affected by light in a long-wavelength range. Thus, a plane-parallel plate coated with a coat that absorbs light of a long-wavelength range is often disposed in front of the image sensor. Light in a long-wavelength range, however, can be eliminated by absorbing it with a reflective surface of the optical prism. This eliminates the need for a separate member for absorbing light in a long-wavelength range, and thus helps reduce cost.

It is preferable that the optical prism be formed of a plastic material. Using a plastic material makes it possible to build the optical prism inexpensively, and permits mass production thereof by pressing. From different perspectives, it is preferable that the optical prism be formed of a glass material. Using a glass material to form the optical prism permits selection of a material with a high refractive index, and is thus advantageous in terms of slimness and high performance.

In the embodiments, the taking optical system includes refractive lens surfaces, that is, lens surfaces that deflect the rays incident thereon by refraction (that is, lens surfaces in which light is deflected at the interface between two media having different refractive indices). Any of those lens surfaces, however, may be replaced with a lens surface of any other type, for example: a diffractive lens surface, which deflects the rays incident thereon by diffraction; or a refractive-diffractive hybrid lens surface, which deflects the rays incident thereon by the combined effect of refraction and diffraction.

In the embodiments, the taking optical system is designed to be suitable for use as a slim taking optical system in a digital device equipped with an image input capability (for example, a camera-equipped cellular phone). By combining this with an image sensor and other components, it is possible to build a taking lens device that optically captures an image of a subject and then outputs it in the form of an electrical signal. A taking lens device is an optical device used as a main component of a camera used to take a still picture or a moving picture of a subject, and is composed of, from the object (subject) side, for example, a taking optical system that forms an optical image of the object and an image sensor that converts the optical image formed by the taking optical system into an electrical signal.

Used as the image sensor is, for example, a solid-state image sensor such as a CCD (charge-coupled device) or CMOS (complementary metal oxide semiconductor) sensor having a plurality of pixels. The optical image formed by the taking optical system is converted into an electrical signal by the image sensor. The signal produced by the image sensor is subjected to predetermined digital image processing, image compression processing, and the like as required, and is recorded in a memory (such as a semiconductor memory or an optical disk) as a digital video signal; in some cases, the signal is transferred to another apparatus through a cable or after being converted into an infrared signal. Between the taking optical system and the image sensor, an optical filter (such as an optical low-pass filter or an infrared cut filter) is disposed as necessary.

Examples of such cameras include: digital cameras; video cameras; surveillance cameras; vehicle-mounted cameras; cameras for videophones; cameras for intercoms; and cameras incorporated in or externally fitted to digital devices and the like, such as personal computers, mobile computers, cellular phones, personal digital assistants, and peripheral devices for them (such as mouses, scanners, and printers). As these examples tell, it is possible not only to build cameras by the use of taking lens devices, but also to add camera capabilities to various devices by incorporating taking lens devices in them. The camera capability can be realized in a desired form. For example, the taking lens device may be built as a unit so as to be detachably or rotatably attached to the body of a camera, or may be built as a unit so as to be detachably or rotatably attached to a portable data device (such as a cellular phone or PDA).

As will be understood from what has been described hereinbefore, the embodiments described above and the numerical examples presented later include the constructions described below. With these constructions, it is possible to realize low-cost, slim, compact taking optical systems that offer satisfactory optical performance. By applying these taking optical systems to cameras, digital devices, and the like, it is possible to make them high-performance, versatile, low-cost, and compact.

(U1″) A taking lens device comprising a taking optical system for forming an optical image and an image sensor for converting the optical image formed by the taking optical system into an electrical signal, the taking optical system comprising: at least one optical prism having an entrance surface, at least three reflective surfaces each curved, and an exit surface, the optical prism receiving rays from the object side through the entrance surface, then reflecting the rays on the at least three reflective surfaces, and then letting out the rays through the exit surface, wherein the optical prism is formed of a medium having a refractive index of 1.2 or more, an optical aperture is disposed on or near one of the at least three reflective surfaces, at least one of the at least three reflective surfaces is an eccentrically disposed rotation-asymmetric surface, and, let the entrance surface be called the first surface, and let the at least three reflective surfaces that reflect rays incident thereon from the first surface be called the second, the third, and the fourth surface in order of arrangement thereof from the first surface, then the rays incident on the third surface cross the rays reflected from the fourth surface.

(U2″) The taking lens device described at (U1″) above, wherein, as the optical prism, there is provided only one optical prism.

(U3″) The taking lens device described at (U1″) or (U2″) above, wherein the second surface has a negative optical power.

(U4″) The taking lens device described at one of (U1″) to (U3″) above, wherein the curved surfaces are free-form curved surfaces.

(U5″) The taking lens device described at one of (U1″) to (U4″) above, wherein the fourth surface has a negative optical power.

(U6″) The taking lens device described at one of (U1″) to (U5″) above, wherein the optical aperture is disposed on the third surface.

(U7″) The taking lens device described at one of (U1″) to (U6″) above, wherein at least one of conditional formulae (C1) to (C16) and the narrowed versions thereof is fulfilled.

(P1″) A camera that includes the taking lens device described at one of (U1″) to (U7″) above and that is used to take at least either a still picture or a moving picture of a subject.

(P2″) The camera described at (P1″) above, wherein the camera is a digital camera, a video camera, or a camera incorporated in or externally fitted to a cellular phone, a personal digital assistant, a personal computer, a mobile computer, or a peripheral device therefor.

(D1″) A digital device that includes the taking lens device described at one of (U1″) to (U7″) above so as to be furnished with a capability of taking at least either a still picture or a moving picture of a subject.

(D2″) The digital device described at (D1″) above, wherein the digital device is a cellular phone, a personal digital assistant, a personal computer, a mobile computer, or a peripheral device therefor.

EXAMPLES

Hereinafter, numerical examples of taking optical systems embodying the present invention will be presented with reference to their construction data and other data. Examples 1 to 3 presented below are numerical examples corresponding to the first to third embodiments, respectively, described above. Thus, the optical path diagrams (FIGS. 1 to 3) showing the first to third embodiments also show the optical constructions and other features of Examples 1 to 3, respectively.

Tables 1 to 3, Tables 4 to 6, and Tables 7 to 9 show the construction data of Examples 1 to 3, respectively. In the basic construction data shown in Tables 1, 4, and 7 (where i represents the surface number), Si (i=1, 2, 3, . . . ) represents the i-th surface as counted from the object side, ri (i=1, 2, 3, . . . ) represents the radius of curvature (mm) of the surface Si, and Ni and vi represent the refractive index (Nd) for the d-line and the Abbe number (vd) of the optical material filling the axial distance between the i-th surface Si and the (i+1)-th surface Si+1 as counted from the object side.

The arrangement of the individual surfaces Si in Examples 1 to 3 is defined by their vertex coordinates and rotation angles given as surface data in Tables 2, 5, and 8. The surface data are given in terms of a right-hand rectangular coordinate system (X,Y,Z). Let the ray traveling from the center of the object surface to the center of the image surface be called the base ray, then the rectangular coordinate system (X,Y,Z) has its origin (0,0,0) at the intersection between the base ray and the first surface S1, and has its Z-axis running in the direction in which the base ray travels from the center of the object surface to the intersection of the base ray with the first surface S1, this direction being positive. In each optical path diagram (FIGS. 1 to 3), the X-axis direction is perpendicular to the plane of the figure (the direction from in front of the figure to behind it being positive, and the counter-clockwise rotation on the plane of the figure being the positive rotation around the X-axis. The Y-axis direction runs in the direction (parallel to the plane of the figure) that forms a right-hand system along with the X- and Z-axis directions. The position of the vertex of each surface is given as the coordinates (X, Y, and Z coordinates, in mm) of its vertex, and the inclination of each surface is given as rotation angles (X, Y, and Z rotation angles, in degrees) around the X-, Y-, and Z-axes about the vertex of the surface. Here, the counter-clockwise rotation around the positive direction of the X- and Y-axes is the positive rotation around the X- and Y-axes, and the clockwise ration around the positive direction of the Z-axis is the positive rotation around the Z-axis.

In Tables 1, 4, and 7, a surface Si marked with an asterisk (*) is a free-form surface, which is defined by formula (FS) below using a local rectangular coordinate system (x,y,z) having its origin at the vertex of the surface. Tables 3, 6, and 9 show the data of the free-form curved surfaces used in each numerical example. It should be noted that no coefficients that equal zero are shown in the tables (for every free-form curved surface, k=0), and that, for all data, "E-n" stands for "×10$^{-n}$".

$$z = c \cdot h^2 / \left\{1 + \sqrt{1-(1+k)c^2h^2}\right\} + \sum_{j=2}^{66} C_j x^m y^n \quad \text{(FS)}$$

where
z represents the displacement in the z-axis direction at the height h (relative to the vertex);
h represents the height in the direction perpendicular to the z-axis ($h^2=x^2+y^2$);
c represents the paraxial curvature (=the reciprocal of the radius of curvature);
k represents the conic coefficient; and
$C_j$ represents the coefficient.

In the above formula (FS), the free-form curved surface term is given by formula (FC) below.

$$\sum_{j=2}^{66} C_j x^m y^n = C_2 \cdot x + C_3 \cdot y + C_4 \cdot x^2 + C_5 \cdot x \cdot y + C_6 \cdot y^2 + \quad \text{(FC)}$$
$$C_7 \cdot x^3 + C_8 \cdot x^2 \cdot y + C_9 \cdot x \cdot y^2 + C_{10} \cdot y^3 +$$
$$C_{11} \cdot x^4 + C_{12} \cdot x^3 \cdot y + C_{13} \cdot x^2 \cdot y^2 +$$
$$C_{14} \cdot x \cdot y^3 + C_{15} \cdot y^4 + C_{16} \cdot x^5 + C_{17} \cdot x^4 \cdot y +$$
$$C_{18} \cdot x^3 \cdot y^2 + C_{19} \cdot x^2 \cdot y^3 + C_{20} \cdot x \cdot y^4 +$$
$$C_{21} \cdot y^5 + C_{22} \cdot x^6 + C_{23} \cdot x^5 \cdot y + C_{24} \cdot x^4 \cdot y^2 +$$
$$C_{25} \cdot x^3 \cdot y^3 + C_{26} \cdot x^2 \cdot y^4 + C_{27} \cdot x \cdot y^5 +$$
$$C_{28} \cdot y^6 + \ldots$$

Table 10 shows the focal length f (mm) and the f-number FNO of the entire system in each numerical example. Shown together are the radius (mm) of the optical aperture ST, the half angle of view (degrees), and the size (mm) of the image-sensing surface. The half angle of view and the size of the image-sensing surface are each given in both the X-direction (in the direction of the longer sides of the image) and the Y-direction (in the direction of the shorter sides of the image). Tables 11 to 13 show the values of the conditional formulae as actually observed in each numerical example.

FIGS. 4A to 4F and 5A to 5F, FIGS. 6A to 6F and 7A to 7F, and FIGS. 8A to 8F and 9A to 9F are lateral aberration diagrams of Examples 1 to 3, respectively. FIGS. FIGS. 4A to 4F, 6A to 6F, and 8A to 8F show the lateral aberration in the X-direction, and FIGS. 5A to 5F, 7A to 7F, and 9A to 9F show the lateral aberration in the Y-direction. Each of these lateral aberration diagrams shows the lateral aberration (mm) for the d-line as observed at the image height (mm) indicated in rectangular coordinates (x,y,z) in the figure. The scale of each lateral aberration is from −0.050 to 0.050 along the vertical axis and from −1.0 to 1.0 along the horizontal axis.

TABLE 1

Example 1

| Si | ri[mm] | Ni | vi | Symbol |
|---|---|---|---|---|
| S1* | −8.637 | 1.583 | 30.2 | PR |
| S2* | 11.365(Reflective) | 1.583 | 30.2 | |
| S3* | −8.098(Reflective) | 1.583 | 30.2 | ST |

TABLE 1-continued

Example 1

| Si | ri[mm] | Ni | vi | Symbol |
|---|---|---|---|---|
| S4* | −4.345(Reflective) | 1.583 | 30.2 | |
| S5* | −21.078 | Air | | |
| S6 | ∞ | 1.517 | 64.2 | PT |
| S7 | ∞ | Air | | |
| S8 | ∞(Image Surface) | | | SR |

TABLE 2

Example 1

| | Vertex Coordinates | | | Rotation Angles | | |
|---|---|---|---|---|---|---|
| Si | X | Y | Z | X Rotation | Y Rotation | Z Rotation |
| S1 | 0 | 0 | 0 | 0 | 0 | 0 |
| S2 | 0 | 0 | 3.933 | −39.00 | 0 | 0 |
| S3 | 0 | 7.360 | 1.473 | 258.55 | 0 | 0 |
| S4 | 0 | 5.888 | 0 | 205.94 | 0 | 0 |
| S5 | 0 | 5.709 | 4.400 | 0 | 0 | 0 |
| S6 | 0 | 5.788 | 4.600 | 0 | 0 | 0 |
| S7 | 0 | 5.788 | 4.900 | 0 | 0 | 0 |
| S8 | 0 | 5.788 | 5.146 | 0 | 0 | 0 |

TABLE 3

Example 1

Free-form Curved Surface Coefficients of S1

| C4 | 1.018E−01 | C6 | 1.008E−01 | C8 | 4.493E−04 |
|---|---|---|---|---|---|
| C10 | 4.032E−05 | C11 | 2.330E−04 | C13 | 3.612E−04 |
| C15 | 1.150E−05 | | | | |

Free-form Curved Surface Coefficients of S2

| C3 | −5.670E−02 | C4 | −4.208E−02 | C6 | −3.947E−02 |
|---|---|---|---|---|---|
| C8 | 3.297E−04 | C10 | 4.353E−04 | C11 | −7.757E−05 |
| C13 | −1.158E−04 | C15 | −4.773E−05 | C17 | −6.743E−06 |
| C19 | 3.942E−06 | C21 | 5.549E−06 | C22 | −9.182E−07 |
| C24 | −2.566E−06 | C26 | −1.312E−06 | C28 | −8.584E−08 |

Free-form Curved Surface Coefficients of S3

| C3 | −6.614E−03 | C4 | 7.499E−02 | C6 | 8.861E−02 |
|---|---|---|---|---|---|
| C8 | −2.457E−04 | C10 | −8.436E−04 | C11 | 1.595E−04 |
| C13 | 4.688E−04 | C15 | 4.798E−04 | C17 | 4.363E−06 |
| C19 | −5.217E−05 | C21 | −8.696E−05 | C22 | 2.605E−05 |
| C24 | 1.300E−04 | C26 | 8.276E−05 | C28 | 3.894E−05 |

Free-form Curved Surface Coefficients of S4

| C3 | 1.383E−02 | C4 | 9.418E−02 | C6 | 1.191E−01 |
|---|---|---|---|---|---|
| C8 | −1.281E−02 | C10 | −1.342E−03 | C11 | 1.419E−02 |
| C13 | 2.830E−03 | C15 | 1.983E−03 | C17 | 4.282E−05 |
| C19 | 1.254E−05 | C21 | −3.943E−04 | C22 | 5.873E−05 |
| C24 | 1.600E−04 | C26 | 1.101E−04 | C28 | 1.728E−04 |

Free-form Curved Surface Coefficients of S5

| C3 | −2.864E−02 | C4 | −4.597E−02 | C6 | −2.333E−02 |
|---|---|---|---|---|---|
| C8 | −4.300E−03 | C10 | −3.968E−03 | C11 | 3.251E−03 |
| C13 | 9.018E−03 | C15 | 7.666E−03 | C17 | 2.450E−04 |
| C19 | −1.427E−03 | C21 | 8.508E−04 | C22 | 8.356E−05 |
| C24 | 8.189E−06 | C26 | −6.080E−04 | C28 | 2.948E−03 |
| C37 | −5.374E−06 | C45 | −1.962E−05 | C56 | −2.252E−06 |
| C66 | −1.144E−04 | | | | |

TABLE 4

Example 2

| Si | ri[mm] | Ni | vi | Symbol |
|---|---|---|---|---|
| S1* | −8.636 | 1.734 | 51.5 | PR |
| S2* | 11.388(Reflective) | 1.734 | 51.5 | |
| S3* | −8.024(Reflective) | 1.734 | 51.5 | S |
| S4* | −4.367(Reflective) | 1.734 | 51.5 | |
| S5* | −41.607 | | Air | |
| S6 | ∞ | 1.517 | 64.2 | PT |
| S7 | ∞ | | Air | |
| S8 | ∞(Image Surface) | | | SR |

TABLE 5

Example 2

| | Vertex Coordinates | | | Rotation Angles | | |
|---|---|---|---|---|---|---|
| Si | X | Y | Z | X Rotation | Y Rotation | Z Rotation |
| S1 | 0 | 0 | 0 | 0 | 0 | 0 |
| S2 | 0 | 0 | 3.794 | −39.00 | 0 | 0 |
| S3 | 0 | 7.345 | 1.399 | 258.53 | 0 | 0 |
| S4 | 0 | 5.866 | 0 | 206.03 | 0 | 0 |
| S5 | 0 | 5.744 | 4.200 | 0 | 0 | 0 |
| S6 | 0 | 5.814 | 4.400 | 0 | 0 | 0 |
| S7 | 0 | 5.814 | 4.700 | 0 | 0 | 0 |
| S8 | 0 | 5.814 | 5.100 | 0 | 0 | 0 |

TABLE 6

Example 2

Free-form Curved Surface Coefficients of S1

| C3 | −1.006E−04 | C4 | 9.961E−02 | C6 | 9.976E−02 |
|---|---|---|---|---|---|
| C8 | 5.455E−04 | C10 | 1.486E−05 | C11 | 2.260E−04 |
| C13 | 3.503E−04 | C15 | 2.149E−05 | C17 | 2.044E−07 |
| C19 | 2.109E−07 | C21 | −3.792E−09 | C22 | 4.118E−09 |
| C24 | 4.208E−08 | C26 | 6.373E−08 | C28 | −2.034E−09 |

Free-form Curved Surface Coefficients of S2

| C3 | −5.295E−02 | C4 | −4.218E−02 | C6 | −3.938E−02 |
|---|---|---|---|---|---|
| C8 | 3.780E−04 | C10 | 4.393E−04 | C11 | −7.912E−05 |
| C13 | −1.175E−04 | C15 | −4.769E−05 | C17 | −7.480E−06 |
| C19 | 4.630E−06 | C21 | 5.365E−06 | C22 | −9.332E−07 |
| C24 | −2.432E−06 | C26 | −1.087E−06 | C28 | −7.176E−08 |

Free-form Curved Surface Coefficients of S3

| C3 | −6.320E−03 | C4 | 7.417E−02 | C6 | 8.826E−02 |
|---|---|---|---|---|---|
| C8 | −1.317E−04 | C10 | −6.469E−04 | C11 | 1.131E−04 |
| C13 | 4.485E−04 | C15 | 4.833E−04 | C17 | 1.663E−05 |
| C19 | −1.835E−05 | C21 | −8.119E−05 | C22 | 1.565E−05 |
| C24 | 6.227E−05 | C26 | 5.617E−05 | C28 | 4.093E−05 |

Free-form Curved Surface Coefficients of S4

| C3 | 1.213E−02 | C4 | 9.621E−02 | C6 | 1.194E−01 |
|---|---|---|---|---|---|
| C8 | −1.070E−03 | C10 | −8.601E−04 | C11 | 1.387E−04 |
| C13 | 2.985E−03 | C15 | 2.065E−03 | C17 | 6.197E−05 |
| C19 | 1.309E−05 | C21 | −4.193E−04 | C22 | 6.444E−05 |
| C24 | 1.598E−04 | C26 | 2.443E−05 | C28 | 2.432E−04 |

Free-form Curved Surface Coefficients of S5

| C3 | −3.081E−02 | C4 | −3.058E−02 | C6 | −5.957E−03 |
|---|---|---|---|---|---|
| C8 | −1.533E−03 | C10 | −5.849E−03 | C11 | 2.192E−03 |
| C13 | 5.444E−03 | C15 | 4.364E−03 | C17 | 1.593E−04 |
| C19 | −8.487E−04 | C21 | 1.338E−03 | C22 | 1.250E−04 |
| C24 | 1.088E−04 | C26 | −1.605E−04 | C28 | 2.342E−03 |
| C37 | −5.936E−07 | C45 | −1.173E−04 | C56 | −1.979E−06 |
| C66 | −1.103E−04 | | | | |

TABLE 7

Example 3

| Si | ri[mm] | Ni | vi | Symbol |
|---|---|---|---|---|
| S1* | −8.635 | 1.583 | 30.2 | PR |
| S2* | 11.373(Reflective) | 1.583 | 30.2 | |
| S3* | −8.080(Reflective) | 1.583 | 30.2 | ST |
| S4* | −4.349(Reflective) | 1.583 | 30.2 | |
| S5* | −24.029 | | Air | |
| S6 | ∞ | 1.517 | 64.2 | PT |
| S7 | ∞ | | Air | |
| S8 | ∞(Image Surface) | | | SR |

TABLE 8

Example 3

| | Vertex Coordinates | | | Rotation Angles | | |
|---|---|---|---|---|---|---|
| Si | X | Y | Z | X Rotation | Y Rotation | Z Rotation |
| S1 | 0 | 0 | 0 | 0 | 0 | 0 |
| S2 | 0 | 0 | 3.827 | −39.00 | 0 | 0 |
| S3 | 0 | 7.370 | 1.380 | 259.00 | 0 | 0 |
| S4 | 0 | 5.914 | 0 | 206.14 | 0 | 0 |
| S5 | 0 | 5.729 | 4.200 | 0 | 0 | 0 |
| S6 | 0 | 5.835 | 4.400 | 0 | 0 | 0 |
| S7 | 0 | 5.835 | 4.700 | 0 | 0 | 0 |
| S8 | 0 | 5.835 | 5.253 | 0 | 0 | 0 |

TABLE 9

Example 3

Free-form Curved Surface Coefficients of S1

| C3 | 4.720E−03 | C4 | 1.000E−01 | C6 | 9.943E−02 |
|---|---|---|---|---|---|
| C8 | 5.049E−04 | C10 | 4.068E−06 | C11 | 2.256E−04 |
| C13 | 3.243E−04 | C15 | 7.619E−06 | C17 | −1.199E−06 |
| C19 | −3.880E−07 | C21 | 1.004E−06 | C22 | 2.569E−08 |
| C24 | 5.480E−07 | C26 | −8.883E−08 | C28 | −1.674E−07 |

Free-form Curved Surface Coefficients of S2

| C3 | −5.425E−02 | C4 | −4.213E−02 | C6 | −3.940E−02 |
|---|---|---|---|---|---|
| C8 | 3.288E−04 | C10 | 4.407E−04 | C11 | −7.407E−05 |
| C13 | −1.185E−04 | C15 | −4.778E−05 | C17 | −7.652E−06 |
| C19 | 5.042E−06 | C21 | 5.506E−06 | C22 | −9.984E−07 |
| C24 | −2.631E−06 | C26 | −1.155E−06 | C28 | −1.069E−07 |

Free-form Curved Surface Coefficients of S3

| C3 | −4.867E−03 | C4 | 7.478E−02 | C6 | 8.850E−02 |
|---|---|---|---|---|---|
| C8 | −1.764E−04 | C10 | −7.147E−04 | C11 | 7.681E−05 |
| C13 | 4.154E−04 | C15 | 4.574E−04 | C17 | 3.686E−05 |
| C19 | −2.367E−05 | C21 | −6.383E−05 | C22 | 1.246E−05 |
| C24 | 1.506E−04 | C26 | 7.894E−05 | C28 | 3.722E−05 |

Free-form Curved Surface Coefficients of S4

| C3 | 1.090E−02 | C4 | 9.521E−02 | C6 | 1.186E−01 |
|---|---|---|---|---|---|
| C8 | −1.041E−03 | C10 | −1.046E−03 | C11 | 1.335E−04 |
| C13 | 2.777E−03 | C15 | 1.998E−03 | C17 | 8.092E−05 |
| C19 | −2.159E−05 | C21 | −4.443E−04 | C22 | 5.205E−05 |
| C24 | 1.842E−04 | C26 | 7.677E−05 | C28 | 2.157E−04 |

Free-form Curved Surface Coefficients of S5

| C3 | −2.372E−02 | C4 | −4.260E−02 | C6 | −1.671E−02 |
|---|---|---|---|---|---|
| C8 | −3.239E−03 | C10 | −8.648E−03 | C11 | 3.498E−03 |
| C13 | 8.097E−03 | C15 | 7.011E−03 | C17 | 4.246E−04 |
| C19 | −1.277E−03 | C21 | 1.531E−03 | C22 | 1.021E−04 |
| C24 | 9.280E−05 | C26 | −3.519E−04 | C28 | 2.426E−03 |
| C37 | −1.623E−06 | C45 | −1.110E−04 | C56 | −1.682E−06 |
| C66 | −1.050E−04 | | | | |

TABLE 10

| Ex. | f (mm) | FNO | Aperture Radius (mm) | Half Angle of View (°) X-Dir. (Horizontal Dir.) | Half Angle of View (°) Y-Dir. (Vertical Dir.) | Image-Sensing Surface Size(mm) X-Dir. | Image-Sensing Surface Size(mm) Y-Dir. |
|---|---|---|---|---|---|---|---|
| 1 | 6.0 | 2.9 | 0.79 | 25.54 | 19.7 | 5.74 | 4.3 |
| 2 | 6.0 | 2.8 | 0.79 | 25.54 | 19.7 | 5.74 | 4.3 |
| 3 | 6.0 | 3.0 | 0.79 | 25.54 | 19.7 | 5.74 | 4.3 |

TABLE 11

| | Conditional Formula | Example 1 | Example 2 | Example 3 |
|---|---|---|---|---|
| (A1) | |fREFL1/fall| | 10.80 | 10.70 | 11.16 |
| (A2) | |fREFL3/fall| | 2.90 | 1.65 | 3.01 |
| (A3) | |fREFL2/fall| | 1.56 | 1.56 | 1.59 |
| (A4) | |fREFR1/fall| | 3.28 | 2.71 | 3.40 |
| (A5) | |φREFL1y/φREFL1x| | 3.58 | 3.98 | 3.76 |
| (A6) | |φREFL2y/φREFL2x| | 2.68 | 2.87 | 2.70 |
| (A7) | |φREFL3y/φREFL3x| | 0.19 | 0.30 | 0.19 |
| (A8) | |φREFR1y/φREFR1x| | 0.98 | 1.00 | 0.99 |
| (A9) | NAy(+)/NAy(−) | 1.08 | 1.08 | 1.07 |
| (A10) | NAx/NAy | 1.35 | 1.35 | 1.34 |
| (A11) | θ | 72.27 | 72.75 | 72.36 |
| (A12) | θ2/θ4 | 1.43 | 1.42 | 1.41 |
| (A13) | Tall/fall | 0.85 | 0.85 | 0.87 |
| (A14) | θREFL1 | 35.75 | 35.97 | 35.79 |
| (A15) | θREFL2 | 29.56 | 29.16 | 29.04 |
| (A16) | Sfront/Srear | 1.81 | 1.85 | 1.87 |

TABLE 12

| | Conditional Formula | Example 1 | Example 2 | Example 3 |
|---|---|---|---|---|
| (B1) | |θie| | 0.007 | 0.004 | 0.008 |
| (B2) | |θep| | 89.993 | 89.996 | 89.992 |
| (B3) | |fREFL1/fall| | 10.80 | 10.70 | 11.16 |
| (B4) | |fREFL3/fall| | 2.90 | 1.65 | 3.01 |
| (B5) | |fREFL2/fall| | 1.56 | 1.56 | 1.59 |
| (B6) | |fREFR1/fall| | 3.28 | 2.71 | 3.40 |
| (B7) | |φREFL1y/φREFL1x| | 3.58 | 3.98 | 3.76 |
| (B8) | |φREFL2y/φREFL2x| | 2.68 | 2.87 | 2.70 |
| (B9) | |φREFL3y/φREFL3x| | 0.19 | 0.30 | 0.19 |
| (B10) | |φREFR1y/φREFR1x| | 0.98 | 1.00 | 0.99 |
| (B11) | NAy(+)/NAy(−) | 1.08 | 1.08 | 1.07 |
| (B12) | NAx/NAy | 1.35 | 1.35 | 1.34 |
| (B13) | θ | 72.27 | 72.75 | 72.36 |
| (B14) | θ2/θ4 | 1.43 | 1.42 | 1.41 |
| (B15) | Tall/fall | 0.85 | 0.85 | 0.87 |
| (B16) | θREFL1 | 35.75 | 35.97 | 35.79 |
| (B17) | θREFL2 | 29.56 | 29.16 | 29.04 |
| (B18) | Sfront/Srear | 1.81 | 1.85 | 1.87 |

TABLE 13

| | Conditional Formula | Example 1 | Example 2 | Example 3 |
|---|---|---|---|---|
| (C1) | |f2/fall| | 10.80 | 10.70 | 11.16 |
| (C2) | |f4/fall| | 2.90 | 1.65 | 3.01 |
| (C3) | |f3/fall| | 1.56 | 1.56 | 1.59 |
| (C4) | |f1/fall| | 3.28 | 2.71 | 3.40 |
| (C5) | |φ2y/φ2x| | 3.58 | 3.98 | 3.76 |
| (C6) | |φ3y/φ3x| | 2.68 | 2.87 | 2.70 |
| (C7) | |φ4y/φ4x| | 0.19 | 0.30 | 0.19 |
| (C8) | |φ1y/φ1x| | 0.98 | 1.00 | 0.99 |
| (C9) | NAy(+)/NAy(−) | 1.08 | 1.08 | 1.07 |
| (C10) | NAx/NAy | 1.35 | 1.35 | 1.34 |
| (C11) | θ | 72.27 | 72.75 | 72.36 |
| (C12) | θ2/θ4 | 1.43 | 1.42 | 1.41 |
| (C13) | Tall/fall | 0.85 | 0.85 | 0.87 |

TABLE 13-continued

| | Conditional Formula | Example 1 | Example 2 | Example 3 |
|---|---|---|---|---|
| (C14) | θ2refl | 35.75 | 35.97 | 35.79 |
| (C15) | θ3refl | 29.56 | 29.16 | 29.04 |
| (C16) | Sfront/Srear | 1.81 | 1.85 | 1.87 |

What is claimed is:

1. A taking optical system for forming an optical image of an object on a light-receiving surface of an image sensor, comprising:
    at least one optical prism having an entrance surface, at least three reflective surfaces each curved, and an exit surface,
    said optical prism receiving rays from an object side through said entrance surface, then reflecting the rays on said at least three reflective surfaces, and then letting out the rays through said exit surface,
    wherein
    said optical prism is formed of a medium having a refractive index of 1.2 or more,
    an optical aperture is disposed on or near one of said at least three reflective surfaces,
    at least one of said at least three reflective surfaces is an eccentrically disposed rotation-asymmetric surface, and
    let a ray traveling from a center of the object through a center of said optical aperture to a center of an image surface be called a base ray, then intersections of said base ray with said entrance surface, each of said reflective surfaces, and said exit surface all lie approximately on a same plane.

2. The taking optical system of claim 1, wherein the following conditional formula is fulfilled:

$$0.1 < |fREFL1/fall| < 30.0$$

where
    fREFL1 represents a focal length of a most object-side reflective surface as counted in order of incidence of the rays from the object side; and
    fall represents a focal length of the entire system.

3. The taking optical system of claim 1, wherein
    a most image-surface-side reflective surface as counted in order of incidence of the rays from the object side has a negative optical power.

4. The taking optical system of claim 1, wherein
    said optical aperture is disposed on one of said at least three reflective surfaces, and
    the following conditional formula is fulfilled:

$$0.1 < |fREFL2/fall| < 30.0$$

where
    fREFL2 represents a focal length of the reflective surface on which said optical aperture is disposed; and
    fall represents a focal length of the entire system.

5. The taking optical system of claim 1, wherein
    said optical aperture is disposed on one of said at least three reflective surfaces, and
    the reflective surface on which said optical aperture is disposed has a positive optical power.

6. The taking optical system of claim 1, wherein the following conditional formula is fulfilled:

$$0.1 < |fREFL1/fall| < 30.0$$

where
    fREFR1 represents a focal length of said entrance surface; and
    fall represents a focal length of the entire system.

7. The taking optical system of claim 1, wherein
let a most object-side reflective surface as counted in order of incidence of the rays from the object side be called a first reflective surface, then said first reflective surface has a negative optical power and fulfills the following conditional formula:

$0.05<|\phi REFL1y/\phi REFL1x|<20.0$ where
$\phi REFL1x$ represents an optical power that said first reflective surface has in a horizontal direction at an intersection thereof with the base ray; and
$\phi REFL1y$ represents an optical power that said first reflective surface has in a vertical direction at the intersection thereof with the base ray.

8. The taking optical system of claim 1, wherein
said entrance surface has a positive optical power and fulfills the following conditional formula:

$0.05<|\phi REFL1y/\phi REFL1x|<20.0$ where
$\phi REFR1x$ represents an optical power that said entrance surface has in a horizontal direction at an intersection thereof with the base ray; and
$\phi REFR1y$ represents an optical power that said entrance surface has in a vertical direction at the intersection thereof with the base ray.

9. The taking optical system of claim 1, wherein
the following conditional formula is fulfilled:

$0.5<Nay(+)/Nay(-)<1.5$ where
$NAy(+)$ represents a numerical aperture on a positive side in a vertical direction (y-direction) at the center of the image surface; and
$NAy(-)$ represents a numerical aperture on a negative side in a vertical direction (y-direction) at the center of the image surface.

10. The taking optical system of claim 1, wherein
let a first reflective surface as counted in order of incidence of the rays from the object side be called a first reflective surface, and let a third reflective surface as counted in order of incidence of the rays from the object side be called a third reflective surface, then the following conditional formula is fulfilled:

$0.1<\theta 2/\theta 4<10.0$ where
$\theta 2$ represents an angle (degrees) between the base ray and a normal to said first reflective surface at an intersection therebetween; and
$\theta 4$ represents an angle (degrees) between the base ray and a normal to said third reflective surface at an intersection therebetween.

11. The taking optical system of claim 1, wherein
the optical prism has, as said at least three reflective surfaces, only three reflective surfaces, and let a most object-side reflective surface as counted in order of incidence of the rays from the object side be called a first reflective surface, then said first reflective surface has a negative optical power and fulfills the following conditional formula:

$5.0<\theta REFL1<70.0$ where
$\theta REFL1$ represents an angle (degrees) of reflection at which said base ray is reflected on said first reflective surface.

12. A taking optical system for forming an optical image of an object on a light-receiving surface of an image sensor, comprising:
at least one optical prism having an entrance surface, at least three reflective surfaces each curved, and an exit surface,
said optical prism receiving rays from the object side through said entrance surface, then reflecting the rays on said at least three reflective surfaces, and then letting out the rays through said exit surface,
wherein
said optical prism is formed of a medium having a refractive index of 1.2 or more,
an optical aperture is disposed on or near one of said at least three reflective surfaces,
at least one of said at least three reflective surfaces is an eccentrically disposed rotation-asymmetric surface, and
let a ray traveling from a center of the object through a center of said optical aperture to a center of an image surface be called a base ray, then said base ray incident on said entrance surface is approximately parallel to said base ray leaving said exit surface.

13. The taking optical system of claim 12, wherein the following conditional formula is fulfilled:

$|\theta ie|<5.0$ where
$\theta ie$ represents an angle between said base ray incident on said entrance surface and said base ray leaving said exit surface.

14. The taking optical system of claim 12, wherein the following conditional formula is fulfilled:

$80.0<|\theta ep|<100.0$ where
$\theta ep$ represents an angle between said base ray leaving said exit surface and the light-receiving surface of the image sensor.

15. The taking optical system of claim 12, wherein
a most object-side reflective surface as counted in order of incidence of the rays from the object side has a negative optical power.

16. The taking optical system of claim 12, wherein
said optical aperture is disposed on one of said at least three reflective surfaces, and the reflective surface on which said optical aperture is disposed has a positive optical power.

17. The taking optical system of claim 12, wherein
the following conditional formula is fulfilled:

$0.1<|fREFR1/fall|<30.0$ where
fREFR1 represents a focal length of said entrance surface; and
fall represents a focal length of the entire system.

18. The taking optical system of claim 12, wherein
let a second reflective surface as counted in order of incidence of the rays from the object side be called a second reflective surface, then said second reflective surface has a positive optical power and fulfills the following conditional formula:

$0.05<|\phi REFL2y/\phi REFL2x|<20.0$ where
$\phi REFL2x$ represents an optical power that said second reflective surface has in a horizontal direction at an intersection thereof with the base ray; and φREFL2y represents an optical power that said second reflective surface has in a vertical direction at the intersection thereof with the base ray.

19. The taking optical system of claim 12, wherein let a second reflective surface as counted in order of incidence of the rays from the object side be called a second reflective surface, and let a third reflective surface as counted in order of incidence of the rays from the object side be called a third reflective surface, then said base ray incident on said second reflective surface crosses said base ray leaving said third reflective surface.

20. The taking optical system of claim 12, wherein let a first reflective surface as counted in order of incidence of the rays from the object side be called a first reflective surface, and let a third reflective surface as counted in order of incidence of the rays from the object side be called a third reflective surface, then the following conditional formula is fulfilled:

0.1<θ2/θ4<10.0 where
θ2 represents an angle (degrees) between the base ray and a normal to said first reflective surface at an intersection therebetween; and
θ4 represents an angle (degrees) between the base ray and a normal to said third reflective surface at an intersection therebetween.

21. The taking optical system of claim 12, wherein the optical prism has, as said at least three reflective surfaces, only three reflective surfaces, and let a second reflective surface as counted in order of incidence of the rays from the object side be called a second reflective surface, then said optical aperture is disposed on said second reflective surface, and no part of said base ray is approximately parallel to said base ray incident on said second reflective surface.

22. A taking optical system for forming an optical image of an object on a light-receiving surface of an image sensor, comprising:
at least one optical prism having an entrance surface, at least three reflective surfaces each curved, and an exit surface,
said optical prism receiving rays from the object side through said entrance surface, then reflecting the rays on said at least three reflective surfaces, and then letting out the rays through said exit surface,
wherein
said optical prism is formed of a medium having a refractive index of 1.2 or more,
an optical aperture is disposed on or in one of said at least three reflective surfaces,
at least one of said at least three reflective surfaces is an eccentrically disposed rotation-asymmetric surface, and
wherein said entrance surface is a first surface, and said at least three reflective surfaces that reflect rays incident thereon from said first surface are a second, a third, and a fourth surface in order of incidence from said first surface, where rays incident on said third surface cross rays reflected from said fourth surface.

23. The taking optical system of claim 22, wherein as said optical prism, there is provided only one optical prism.

24. The taking optical system of claim 22, wherein the following conditional formula is fulfilled:

0.1<|f4/fall|<30.0 where
f4 represents a focal length of said fourth surface; and
fall represents a focal length of the entire system.

25. The taking optical system of claim 22, wherein said optical aperture is disposed on or in said third surface.

26. The taking optical system of claim 22, wherein a ray traveling from a center of the object through a center of said optical aperture to a center of an image surface is a base ray, said second surface has a negative optical power, and the following conditional formula is fulfilled:

0.05<|φ2y/φ2x|<20.0 where
φ2x represents an optical power that said second surface has in a horizontal direction at an intersection thereof with the base ray; and
φ2y represents an optical power that said second surface has in a vertical direction at the intersection thereof with the base ray.

27. The taking optical system of claim 22, wherein a ray traveling from a center of the object through a center of said optical aperture to a center of an image surface is a base ray and an angle at which said base ray crosses itself fulfills the following conditional formula:

30<θ<80 where
θ represents a smaller angle (degrees) at which said base ray crosses itself.

28. The taking optical system of claim 22, wherein a ray traveling from a center of the object through a center of said optical aperture to a center of an image surface is a base ray and the following conditional formula is fulfilled:

0.1<θ2/θ4<10.0 where
θ2 represents an angle (degrees) between the base ray and a normal to said second surface at an intersection therebetween; and
θ4 represents an angle (degrees) between the base ray and a normal to said fourth surface at an intersection therebetween.

29. The taking optical system of claim 22, wherein the following conditional formula is fulfilled:

Tall/fall<2.0 where
Tall represents a thickness from said first surface to the light-receiving surface of the image sensor; and
fall represents a focal length of the entire system (an average of focal lengths in a horizontal and a vertical direction).

30. The taking optical system of claim 22, wherein the optical prism has, as said at least three reflective surfaces, only three reflective surfaces, and wherein a ray traveling from a center of the object through a center of said optical aperture to a center of an image surface is a base ray, said optical aperture is disposed in said third surface, and no part of said base ray is approximately parallel to said base ray incident on said third surface.

31. The taking optical system of claim 22, wherein a ray traveling from a center of the object through a center of said optical aperture to a center of an image surface is a base ray, then said first surface is coaxial with the base ray.

32. The taking optical system of claim 22, wherein the optical prism has, as said at least three reflective surfaces, only three reflective surfaces, and wherein a ray traveling from a center of the object through a center of said optical aperture to a center of an image surface is a base ray, then the following conditional formula is fulfilled:

0.1<Sfront/Srear<10.0 where
- Sfront represents an optical distance from said first surface of said optical prism to an optical aperture surface along said base ray; and
- Srear represents an optical distance from the optical aperture surface to the exit surface of the optical prism along said base ray.

* * * * *